(12) United States Patent
Torrisi et al.

(10) Patent No.: US 9,718,972 B2
(45) Date of Patent: Aug. 1, 2017

(54) FUNCTIONAL INKS BASED ON LAYERED MATERIALS AND PRINTED LAYERED MATERIALS

(71) Applicant: Cambridge Enterprise Limited, Cambridge (GB)

(72) Inventors: Felice Torrisi, Cambridge (GB); Tawfique Hasan, Cambridge (GB); Francesco Bonaccorso, Messina (IT); Andrea Carlo Ferrari, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 57 days.

(21) Appl. No.: 14/437,173

(22) PCT Filed: Oct. 22, 2013

(86) PCT No.: PCT/GB2013/052747
§ 371 (c)(1),
(2) Date: Apr. 20, 2015

(87) PCT Pub. No.: WO2014/064432
PCT Pub. Date: May 1, 2014

(65) Prior Publication Data
US 2015/0337145 A1 Nov. 26, 2015

Related U.S. Application Data

(60) Provisional application No. 61/717,744, filed on Oct. 24, 2012.

(30) Foreign Application Priority Data

Oct. 22, 2012 (GB) .................................. 1218952.8

(51) Int. Cl.
| | |
|---|---|
| C09D 11/52 | (2014.01) |
| C09D 11/037 | (2014.01) |
| C09D 11/322 | (2014.01) |
| C08K 3/08 | (2006.01) |
| C09D 11/02 | (2014.01) |

(52) U.S. Cl.
CPC ............... *C09D 11/02* (2013.01); *C08K 3/08* (2013.01); *C09D 11/037* (2013.01); *C09D 11/322* (2013.01); *C08K 2003/0806* (2013.01); *Y10T 428/24901* (2015.01)

(58) Field of Classification Search
CPC ..... C09D 11/037; C09D 11/322; C09D 11/52; C08K 3/08; C08K 2003/0837; C08K 2003/0862; C08K 2003/0887; Y10T 428/24901
USPC ........................................ 106/31.92; 428/207
See application file for complete search history.

(56) References Cited

U.S. PATENT DOCUMENTS

| | | | |
|---|---|---|---|
| 7,662,321 B2 | 2/2010 | Guo | |
| 8,535,553 B2 * | 9/2013 | Kong | B82Y 30/00 216/83 |
| 2008/0279756 A1 | 11/2008 | Zhamu | |
| 2009/0028777 A1 * | 1/2009 | Zhamu | B82Y 30/00 423/448 |
| 2009/0028778 A1 * | 1/2009 | Zhamu | B82Y 30/00 423/448 |
| 2009/0072185 A1 * | 3/2009 | Raksha | B82Y 30/00 252/62.51 R |
| 2010/0000441 A1 | 1/2010 | Jang | |
| 2010/0303706 A1 | 12/2010 | Wallace | |
| 2011/0037033 A1 * | 2/2011 | Green | B03D 3/00 252/510 |
| 2011/0086965 A1 * | 4/2011 | Zhi | C01B 21/0648 428/220 |
| 2012/0101457 A1 | 4/2012 | Kato | |
| 2012/0127236 A1 | 5/2012 | Endoh | |
| 2012/0241690 A1 | 9/2012 | Janowska | |
| 2013/0040124 A1 * | 2/2013 | Koo | C09D 11/52 428/220 |
| 2013/0330477 A1 * | 12/2013 | Blair | C01B 31/043 427/343 |
| 2014/0083752 A1 * | 3/2014 | Walczak | C09D 11/52 252/511 |
| 2014/0193575 A1 * | 7/2014 | Hosmane | C09D 11/52 252/502 |
| 2016/0016796 A1 * | 1/2016 | Hersam | C04B 35/522 423/290 |

FOREIGN PATENT DOCUMENTS

| | | |
|---|---|---|
| CN | 102173414 | 9/2011 |
| CN | 102464313 | 5/2012 |

(Continued)

OTHER PUBLICATIONS

International Search Report and Written Opinion dated Dec. 13, 2013 for International Application No. PCT/GB2013/052747.

(Continued)

*Primary Examiner* — Helene Klemanski
(74) *Attorney, Agent, or Firm* — Swanson & Bratschun, L.L.C.

(57) ABSTRACT

An ink disclosed herein comprises a carrier liquid with a dispersion of flakes derived from a layered material. The thickness of each flake depends on the number of layers of the layered material in the flake. The thickness distribution of the flakes includes: at least 20% by number of single layer flakes; at least 40% by number cumulatively of single, double and triple layer flakes; or not more than 40% by number of flakes having ten or more layers. The layered material is selected from one or more of elemental materials such as graphene (typically derived from pristine graphite), metals (e.g., NiTe2, VSe2), semi-metals (e.g., $WTa_2$, $TcS_2$), semiconductors (e.g., $WS_2$, $WSe_2$, $MoS_2$, $MoTe_2$, $TaS_2$, $RhTe_2$, $PdTe_2$), insulators (e.g., h-BN, $HfS_2$), superconductors (e.g., $NbS_2$, $NbSe_2$, $NbTe_2$, $TaSe_2$) and topological insulators and thermo-electrics (e.g., $Bi_2Se_3$, $Bi_2Te_3$). Also disclosed are methods of manufacturing suitable inks and uses of the inks.

22 Claims, 31 Drawing Sheets

(56) References Cited

FOREIGN PATENT DOCUMENTS

| | | |
|---|---|---|
| CN | 102827315 | 12/2012 |
| EP | 2570462 | 3/2013 |
| GB | 2483288 | 3/2012 |
| WO | WO 2011/016172 A1 * | 2/2011 |
| WO | WO 2011/055039 A1 * | 5/2011 |
| WO | WO 2011/136478 | 11/2011 |
| WO | WO 2012/101457 | 8/2012 |
| WO | WO 2012/138632 | 10/2012 |
| WO | WO 2013/036272 | 3/2013 |

OTHER PUBLICATIONS

Ahir, et al. (2008) Polymer 49:3841-3854, "Polymers with aligned carbon nanotubes: Active composite materials".

Arnold, et al. (2005) Nano Letters 5(4):713-718, "Enrichment of Single-Walled Carbon Nanotubes by Diameter in Density Gradients".

Arnold, et al., (2006) Nature Nanotechnology 1:60-65, "Sorting carbon nanotubes by electronic structure using density differentiation".

Berger, et al. (2004) J. Phys. Chem. B 108:19912-19916, "Ultrathin Epitaxial Graphite: 2D Electron Gas Properties and a Route toward Graphene-based Nanoelectronics".

Bonaccorso, et al. (2010).

Coleman, et al. (2011) Science 331:568-571, "Two-Dimensional Nanosheets Produced by Liquid Exfoliation of Layered Materials".

Crochet, et al. (2007) J. Am. Chem. Soc. 129:8058-8059, "Quantum Yield Heterogeneities of Aqueous Single-Wall Carbon Nanotube Suspensions".

Cunningham, et al. (2012) ACS Nano 6(4):3468-3480, "Solvent Exfoliation of Transition Metal Dichalcogeneides: Dispersibility of Exfoliated Nanosheets Varies Only Weakly between Compounds".

Derby and Reis (2003) MRS Bulletin 28:815, "Inkjet Printing of Highly Loaded Particulate Suspensions".

Dua, et al. (2010) Angew. Chem. Int. Ed. 49:2154-2157, "All-Organic Vapor Sensor Using Inkjet-Printed Reduced Graphene Oxide".

Fromm (1984) J. Res. Develop. 28(3):322, "Numerical Calculation of the Fluid Dynamics of Drop-on-Demand Jets".

Green and Hersam (2009) Nano Letters 9(12):4031-4036, "Solution Phase Production of Graphene with Controlled Thickness via Density Differentiation".

Hamaker (1937) Physica IV 10 4:1058-1072, "The London-Van Der Waals Attraction between Sphyerical Particles".

Hasan, et al. (2007) J. Phys. Chem. C. 111:12594-12602, "Stabilization and "Debundling" of Single-Wall Carbon Nanotube Dispersions in N-Methyl-2-pyrrolidone (NMP) by Polyvinylpyrrolidone (PVP)".

Hasan, et al. (2010) Physica Status Solidi B 247(11-12):2953-2857, "Solution-Phase exfoliation of graphite for ultrafast photonics".

Hernandez, et al. (2008) Nature Nanotechnology 3:563-568, "High-yield production of graphene by liquid-phase exfoliation of graphite".

Hummers and Offeman (1958) J. Am. Chem. Soc. 80:1339, "Preparation of Graphite Oxide".

Jang, et al. (2009) Langmuir 25:2629-2635, "Influence of Fluid Physical Properties on Ink-Jet Printability".

Khan, et al. (2010) Small 6(7):864-871, "High-Concentration Solvent Exfoliation of Graphene".

King, et al. (2010) ACS Nano 4(7):4238-4246, "Improvement of Transparent Conducting Nanotube Films by Addition of Small Quantities of Graphene".

Li, et al. (2009) Science 324:1312, "Large-Area Synthesis of High-Quality and Uniform Graphene Films on Copper Foils".

Lotya, et al. (2009) JACS 131:3611-3620, "Liquid Phase Production of Graphene by Exfoliation of Graphite in Surfactant/Water Solutions".

Luechinger, et al. (2008) Nanotechnology 19:445201, "Graphene-stabilized copper nanoparticles as an air-stable substitute for silver and gold in low-cost ink-jet printable electronics".

Marago, et al. (2010) ACS Nano 4(12):7515-7523, "Brownian Motion of Graphene".

Ha, et al. (2010) ACS Nano 4(8):4388-4395, "Printed, Sub-3V Digital Circuits on Plastic from Aqueious Carbon Nanotube Inks".

Novoselov, et al. (2005) Proc. Natl. Accad. Sci.102:10451-10453, "Two Dimensional Atomic Crystals".

O'Connell, et al. (2001) Chemical Physics Letters 342:265-271, "Reversible water-solubilization of single-walled carbon nanotubes by polymer wrapping".

Padday (1971) Philosophical Transactions of the Royal Society of London. Series A, Mathematical and Physical Sciences 269(1197):265-293, "The Profiles of Axially Symmetric Menisci".

Sasaki, et al. (1995) Colloids and Surfaces B: Biointerfaces 5:241-247, "The adsorption behavior of four bile salt species on graphite in water-evaluation of effective hydrophobicity of bile acids".

Shafrin and Zisman (1967) J. Phys. Chem. 71(5):1309-1316, "Critical Surface Tension for Spreading on a Liquid Substrate".

Shin, et al. (2011) Microelectronics Reliability 51:797-804, "Control of droplet formation for low viscosity fluid by double waveforms applied to a piezoelectric inkjet nozzle".

Singh, et al. (2010) Advanced Materials 22:673-685, "Inkjet Printing-Process and Its Applications".

Thomas, et al. (1996) J. Electrochem. Soc. 143(1):643-648, "Wettablility of Polished Silicon Oxide Surfaces".

Valles, et al. (2008) JACS 130:15804, "Solutions of Negatively Charged Graphene Sheets and Ribbons".

Van Osch, et al. (2008) Advanced Materials 20:343-345, "Inkjet Printing of Narrow Conductive Tracks on Untreated Polymeric Substrates".

Wang, et al. (2010) Nano Letters 10:92-98, "High Mobility, Printable, and Solution-Processed Graphene Electronics".

May, et al. (2012) Journal of Materials Chemistry 22:1278-1282, "Approaching the theoretical limit for reinforcing polymers with graphene".

* cited by examiner

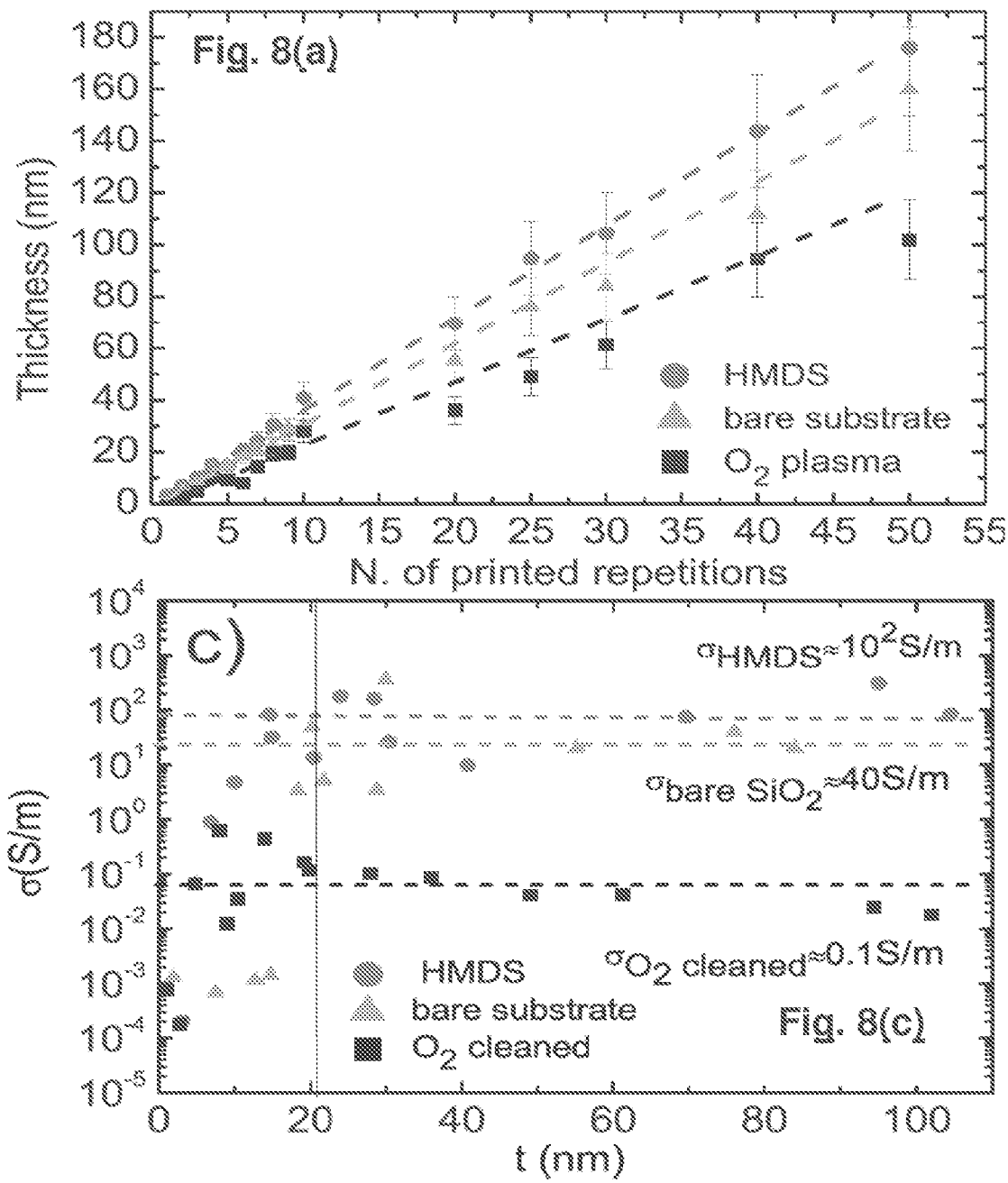

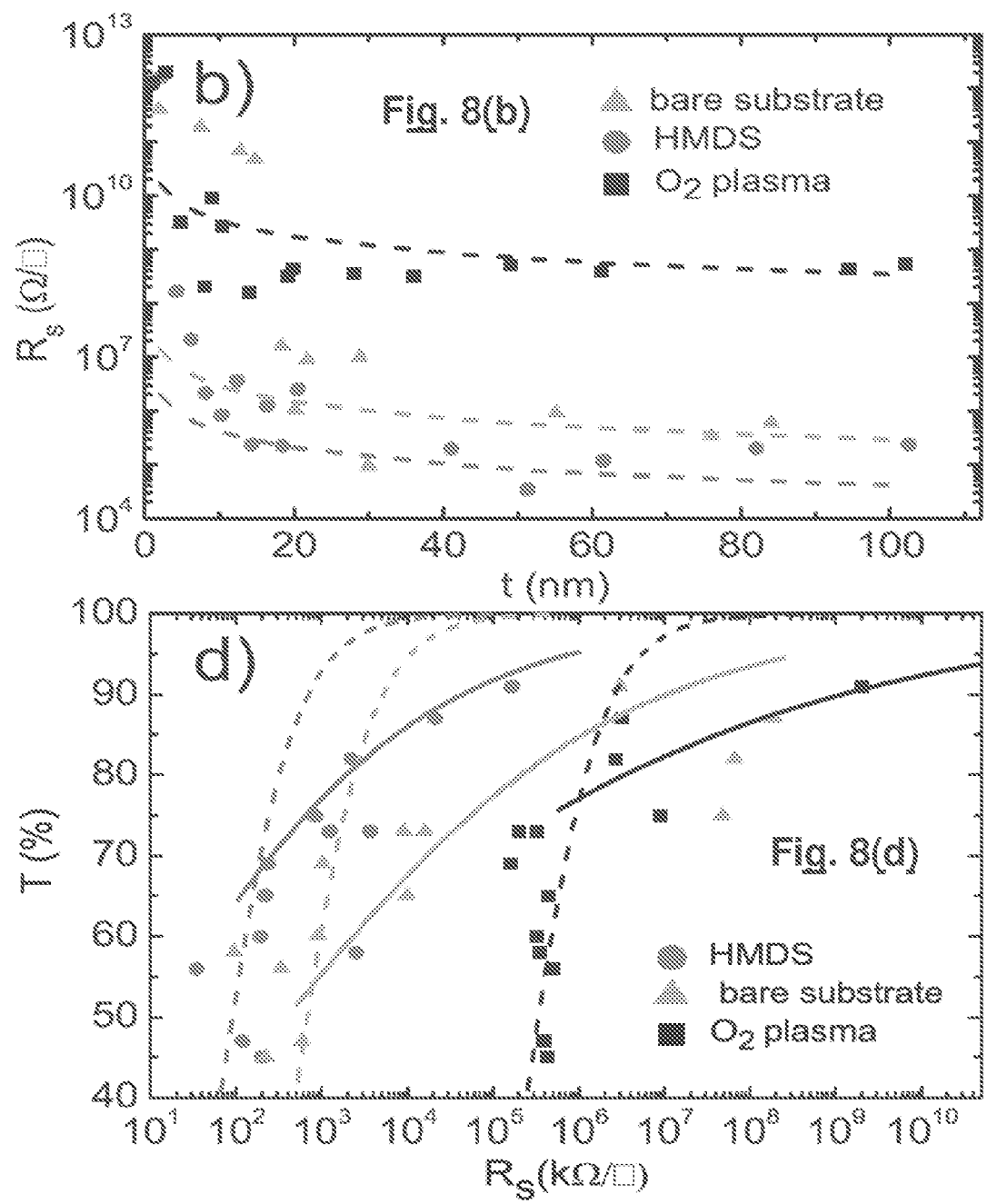

FUNCTIONAL INKS BASED ON LAYERED MATERIALS AND PRINTED LAYERED MATERIALS

RELATED APPLICATIONS

This application is a 35 U.S.C. §371 national phase application of PCT/GB2013/052747 (WO 2014/064432), filed on Oct. 22, 2013, entitled "Functional Inks Based on Layered Materials and Printed Layered Materials", which application claims the benefit of Great Britain Application No. 1218952.8, filed Oct. 22, 2012 and of U.S. Provisional Application Ser. No. 61/717,744, filed Oct. 24, 2012, each of which applications are incorporated herein by reference in their entirety for all matters disclosed therein.

The work leading to this invention has received funding from the European Research Council under the European Community's Seventh Framework Programme (FP7/2007-2013)/ERC grant agreement n° 208948.

BACKGROUND TO THE INVENTION

Field of the Invention

The present invention relates to inks based on layered materials, methods of manufacture of such inks, methods of printing using such inks, and the resultant printed materials and devices. The invention is of particular, but not exclusive, application to functional (e.g. conductive, insulating) and/or light-transmissive printed material and/or inks.

Related Art

Flexible electronics is a rapidly expanding research area. Applications include touch screens, electronic paper (e-paper), sensors, radio frequency tags, photovoltaic cells, light-emitting diodes and electronic textiles. To date, it mainly relies on two fabrication strategies: one in which substrates bearing field-effect transistors (FETs) are bonded to plastic by transfer printing, or pick-and-place methods; another in which FETs are prepared directly on the target substrate by several coating, curing, and lithographic steps. Techniques such as rubber stamping, embossing, roll to roll processes such as screen, inkjet, gravure and flexo printing, web or slot die coating reduce the number of such fabrication steps.

Roll to roll printing or coating processes are promising techniques for large-area fabrication of flexible plastic electronics. A range of components can be printed, such as transistors, photovoltaic devices, organic light-emitting diodes (OLEDs), and displays. Roll to roll printing processes are versatile, involve a limited number of process steps, are amenable for mass production, and can deposit controlled amounts of material. In particular drop-on-demand inkjet printing has progressed from printing text and graphics to a tool for rapid manufacturing, being now a well-established technique to print thin-film transistors (TFTs) based on organic conducting and semiconducting inks. However, their mobilities, $\mu<0.5$ $cm^2V^{-1}$ $s^{-1}$ are still much lower than standard silicon technology. Several approaches aim to improve these results, such as the use of polysilicon, zinc oxide nanoparticles and carbon nanotubes (CNTs). Metal nanoparticle inks are considered not to be stable in ordinary solvents, such as deionized (DI) water, acetone, isopropyl alcohol, N-methylpyrrolidone (NMP), or tetrahydrofuran [References Singh et al (2010) and Luechinger et al (2008)]. Therefore they need to be chemically modified in order to be dispersed via the use of stabilizers, which usually degrade in a couple of years. Metal nanoparticles also tend to oxidize after the printing process [Reference Singh et al (2010)]. Inkjet printed CNT-TFTs have been reported with $\mu$ up to 50 $cm^2V^{-1}$ $s^{-1}$ and an ON/OFF ratio of about $10^3$ [Reference Ha et al (2010)].

Graphene is the two-dimensional (2d) building block for $sp^2$ carbon allotropes. Near-ballistic transport and high mobility make it an ideal material for nanoelectronics, especially for high frequency applications. Furthermore, its optical and mechanical properties are ideal for micro- and nanomechanical systems, thin-film transistors, transparent and conductive composites and electrodes, and photonics. A review of graphene photonics and optoelectronics is set out in Reference Bonaccorso et al. (2010).

It is known that graphene can be isolated by micromechanical exfoliation of graphite [Reference Novoselov et al (2005)]. This technique gives good results in terms of purity, defects, mobility, and optoelectronic properties. However, large scale production approaches are needed for widespread application. Attempts have been made to provide large-scale production methods by chemical vapour deposition (CVD) [Reference Li et al. (2009)], sublimation of Si atoms by heat treatment of silicon carbide [Reference Berger et al. (2004)], segregation from metal substrates and liquid phase exfoliation (LPE) [References Hernandez et al (2008), Lotya, et al (2009), Valles et al (2008) and Hasan et al (2010)]. Among these, the present inventors consider that LPE is the best candidate for producing printable inks.

Graphite can be exfoliated by chemical wet dispersion followed by ultrasonication, both in aqueous and nonaqueous solvents. Dispersions can be achieved by mild sonication of graphite in water with dispersants (e.g. surfactants, polymers etc), followed by sedimentation based ultracentrifugation [References Hernandez et al. (2008), Hasan et al (2010) and Marago et al (2010)]. In particular, bile salt surfactants are reported to allow the isolation of flakes with controlled thickness, when combined with density gradient ultracentrifugation [Green and Hersam (2009)]. Exfoliation of graphite-intercalated compounds and expandable graphite has also been reported.

LPE was first achieved through sonication of graphite oxide, following the Hummers method [Reference Hummers and Offeman (1958)]. The oxidation of graphite in the presence of acids and oxidants disrupts the $sp^2$ network and introduces hydroxyl or epoxide groups, with carboxylic or carbonyl groups attached to the edge. These make graphene oxide (GO) sheets readily dispersible in water and several other solvents. Although large GO flakes can be produced, these are intrinsically defective and electrically insulating. Despite attempts by several workers, reduced GO (RGO) does not fully regain the pristine graphene properties, including electrical conductivity. It is thus important to distinguish between dispersion-processed graphene flakes retaining the electronic properties of graphene, and insulating GO dispersions. Several groups have reported GO-based inks. Reference Dua et al (2010) reported inkjet printed RGO films for sensor applications, while Reference Luechinger et al (2008) produced RGO-stabilized Cu nanoparticles as low temperature metal colloids, to replace standard metal nanoparticle inks, which require high-temperature sintering post-processing. Mobilities up to 90 $cm^2V^{-1}$ $s^{-1}$ have been achieved for highly reduced GO films by inkjet printing [Reference Wang et al (2009)], with an ON/OFF ratio up to 10.

US 2010/0000441 discloses a conductive ink based on nano graphene platelets. The nano graphene platelets are formed by dispersing graphite in a liquid medium such as water, alcohol or acetone, adding a dispersing agent or surfactant and subjecting the suspension to direct ultrasonication. The ink was used for printing using an inkjet printer. A resistivity for a single print layer of as low as 75 kΩ/square was measured.

US 2008/0279756 provides a similar disclosure to US 2010/0000441, but additionally suggests the processing of other layered materials than graphite, such as transition metal dichalcogenides.

SUMMARY OF THE INVENTION

The present inventors have found that the prior art disclosures of the manufacture of printable conductive inks are unsatisfactory. For example, in the case of US 2010/0000441, the disclosure of a resistivity of 75 kΩ/square for a single print layer indicates that the individual nano graphene platelets have a large thickness, for example a high proportion of the nano graphene platelets would have thickness of greater than 100 nm. We note that US 2010/0000441 does not disclose the optical characteristics of the printed films. The result is that the printed layer is unlikely to be suitable for applications in which light transmittance through the printed layer is required. Also, due to the absence of ultracentrifugation and filtration procedures, we expect a high population of thick flakes >50 nm.

Furthermore, the present inventors have realised that careful consideration is required of the properties of functional inks such as conductive inks in order to provide inks that are tailored to be suitable for different printing processes, such as inkjet printing, screen printing, gravure printing, etc. Failure to give suitable consideration to these issues, and take corresponding steps to address them, leads to unsatisfactory printing outcomes, such as incomplete printing or damage to the printing apparatus. Other suitable functional inks that are considered here include insulating inks, thermal inks, memory inks, energy storage inks, semi-conducting inks amongst others.

The present invention has been devised in order to address at least one of the above problems. Preferably, the present invention reduces, ameliorates, avoids or overcomes at least one of the above problems.

Accordingly, in a first preferred aspect, the present invention provides an ink comprising a carrier liquid with a dispersion of flakes derived from a layered material, wherein the thickness of each flake depends on the number of layers of the layered material in the flake, and wherein the thickness distribution of the flakes includes:
  at least 20% by number of single layer flakes;
  at least 40% by number cumulatively of single, double and triple layer flakes; or
  not more than 40% by number of flakes having ten or more layers.

A suitable technique for determining the number of layers of the layered material in a flake is set out below.

In a second preferred aspect, the present invention provides a method of manufacturing an ink for thermal, energy, optical, radio frequency, electronic and/or optoelectronic applications, the method including the steps of:
  exfoliation of a layered material in a liquid by ultrasonication to form a first population of flakes from the layered material, wherein the thickness of each flake depends on the number of layers of the layered material in the flake; and
  ultracentrifugation of the first population of flakes to isolate a second population of flakes from the first population, wherein the second population of flakes has a more restricted thickness distribution than the first population of flakes.

In a third preferred aspect, the present invention provides an ink obtained by or obtainable by the method of the second aspect.

In a fourth preferred aspect, the present invention provides an ink consisting of at least 90 wt %, based on the weight of the ink, of:
  a carrier liquid;
  a dispersion of flakes derived from a layered material;
  optionally, one or more surfactant;
  optionally, one or more surface energy modifier; and
  optionally, one or more viscosity modifier,
  optionally, one or more dopants and nanomaterial additives,
wherein the thickness of each flake depends on the number of layers of the layered material in the flake, and wherein the thickness distribution of the flakes includes:
  at least 20% by number of single layer flakes;
  at least 40% by number cumulatively of single, double and triple layer flakes; or
  not more than 40% by number of flakes having ten or more layers.

In a fifth preferred aspect, the present invention provides a composite ink formed from an ink according to the first aspect, third aspect or fourth aspect and further including a nanomaterial.

In a sixth preferred aspect, the present invention provides a composite layered material formed by sequential deposition of flakes derived from different layered materials, the flakes differing in terms of flake thickness and/or flake composition.

In a seventh preferred aspect, the present invention provides a printed layer obtained by or obtainable by printing using an ink according to any one of the first, third, fourth or fifth aspect.

In an eighth preferred aspect, the present invention provides a method for printing a printed layer in which an ink according to any one of the first, third, fourth or fifth aspect is applied to a surface and allowed to dry.

In a ninth preferred aspect, the present invention provides a use of an ink according to any one of the first, third, fourth or fifth aspect, or of a composite layered material according to the sixth aspect, or of a printed layer according to the seventh aspect, in one or more electronic application, one or more optoelectronic application, one or more optical application, one or more thermal application, one or more energy application, and/or one or more radio frequency application.

In a tenth preferred aspect, the present invention provides a device incorporating at least one composite layered material according to the sixth aspect or at least one printed layer according to the seventh aspect, the device being an electronic device, an optoelectronic device, an optical device, a thermal device, an energy device, and/or a radio frequency device.

The first, second, third, fourth, fifth, sixth, seventh, eighth, ninth and/or tenth aspects of the invention may be combined with one or more of each other. Furthermore, any aspect of the invention may have any one or, to the extent that they are compatible, any combination of the following optional features.

As indicated above, the thickness distribution of the flakes may include at least 20% by number of single layer flakes. More preferably, the thickness distribution of the flakes includes at least 30% by number, at least 40% by number, at least 50% by number or at least 60% by number of single layer flakes.

As indicated above, the thickness distribution of the flakes may include at least 40% by number cumulatively of single, double and triple layer flakes. More preferably, the thickness distribution of the flakes includes at least 40% by number cumulatively, at least 50% by number cumulatively, at least 60% by number cumulatively, at least 70% by number cumulatively, at least 80% by number cumulatively or at least 90% by number cumulatively of single, double and triple layer flakes. In some embodiments, the thickness distribution of the flakes may include at least 95% by number cumulatively of single, double and triple layer flakes. In some embodiments, the thickness distribution of the flakes may include at least 99% by number cumulatively of single, double and triple layer flakes.

Furthermore, preferably, the thickness distribution of the flakes may include at least 30% by number cumulatively of single and double layer flakes. More preferably, the thickness distribution of the flakes may include at least 30% by number cumulatively, at least 40% by number cumulatively, at least 50% by number cumulatively, at least 60% by number cumulatively, at least 70% by number cumulatively or at least 80% by number cumulatively of single and double layer flakes.

As indicated above, the thickness distribution of the flakes may include not more than 40% by number of flakes having ten or more layers. More preferably, the thickness distribution of the flakes includes not more than 30% by number, not more than 20% by number, not more than 10% by number, or not more than 5% by number of flakes having ten or more layers.

The thickness distribution of the flakes is determined using transmission electron microscopy (TEM) analysis of 20 flakes selected at random.

For some layered materials such as graphene, further information on the structure of the flakes can be obtained by additionally carrying out selected area electron diffraction and assessing the intensity ratio $I_{1010}/I_{2110}$. Where $I_{1010}/I_{2110}>1$, the flake is determined to be single layer graphene, this being confirmed by image analysis of the flake edge. Where $I_{1010}/I_{2110}<1$, image analysis of the flake edge is used to distinguish double layer flakes, triple layer flakes and flakes of greater thickness. Bi-layer (BLG), triple layer (TLG) flakes and flakes of greater thickness can be identified by looking at the phase interference of folded flakes at the edge. The analysis of the edges gives reliable information on the number of layers and can be used to investigate a large number of flakes, from zoomed-in high-resolution edge images. Additionally, the thickness distribution of the flakes can be validated using Raman spectroscopy by looking at the shape of the 2D peak, and the ratio of 2D peak intensity and area with respect to the G peak as explained in more detail below.

The term "single layer" is intended to include a layer which is only a single atom thick, as is the case for elemental layered materials such as graphene formed from graphite. However, where the layered material is a compound, the term "single layer" also includes the thickness of the layer which repeats through the structure of the layered material. In some cases, this thickness may be less than the thickness of the unit cell of the crystal structure, because stacking offsets may cause the unit cell thickness to be two or more times the thickness of the repeating layer.

Suitable layered materials include elemental materials such as graphene (typically derived from pristine graphite), metals (e.g., $NiTe_2$, $VSe_2$), semi-metals (e.g., $WTa_2$, $TcS_2$), semiconductors (e.g., $WS_2$, $WSe_2$, $MoS_2$, $MoTe_2$, $TaS_2$, $RhTe_2$, $PdTe_2$), insulators (e.g., h-BN, $HfS_2$), superconductors (e.g., $NbS_2$, $NbSe_2$, $NbTe_2$, $TaSe_2$) and topological insulators, or thermoelectric materials (e.g., $Bi_2Se_3$, $Bi_2Te_3$).

Preferably, the flakes have at least one lateral dimension, assessed as a number average, of at least 200 nm. More preferably, the flakes have at least one lateral dimension, assessed as a number average, of at least 300 nm. Still more preferably, this lateral dimension limitation applies to the single layer flakes. It is typical for thicker flakes to have relatively larger lateral dimensions than single layer flakes.

Preferably, the flakes have a footprint area (i.e. the area of one of the larger faces of the flakes when viewed in plan view), assessed as a number average, of at least 0.1 $\mu m^2$. More preferably, the flakes have a footprint area of at least 0.5 $\mu m^2$, more preferably at least 1 $\mu m^2$. Still more preferably, this footprint area limitation applies to the single layer flakes. It is typical for thicker flakes to have relatively larger footprint area than single layer flakes.

Preferably, the carrier liquid has a surface energy which differs from the surface energy of the layered material by not more than plus or minus 15%. We measure the relevant surface energy by contact angle. References Cunningham et al. (2012) and Coleman et al. (2011) show graphs with valid surface energy ranges for graphene and layered materials.

Preferably, the carrier liquid is selected from one or more of water, alcohol, N-methylpyrrolidone, chloroform, benzene, toluene, di-chlorobenzene, iso-propyl alcohol, ethanol and/or other organic solvents.

The ink may include one or more modifiers. Suitable modifiers may be added in order to adjust the surface energy ($\gamma$) of the ink. For example, one or more surfactants may be added. Bile salt surfactants are considered to be particularly suitable. Suitable modifiers may include viscosity modifiers, for adjusting the viscosity (q) of the ink either upwards or downwards, depending on the intended printing technique to be employed.

Preferably, the surface energy of the ink is in the range 30-55 $mN \cdot m^{-1}$ at 20° C.

In some embodiments, the viscosity of the ink is in the range 1-10 mPa·s at 20° C. Achieving this may require the addition of a viscosity modifier such as ethyl alcohol to reduce the viscosity to this level. In other embodiments, the viscosity of the ink may be higher (e.g. greater than 10 mPa·s or greater than 100 mPa·s at 20° C.). Achieving this may require the addition of a viscosity modifier such as polyvinyl alcohol, glycerol, ethylene glycol to increase the viscosity to this level.

For inkjet printing, preferably the ink has a value for Z=1/Oh in the range 1-100, where Oh is the Ohnesorge number and Oh=$(We)^{1/2}$/Re, where Re is the Reynolds number and We is the Weber number, Re=$\upsilon \rho a/\eta$ and We=$\cup^2 \rho a/\gamma$, so that Oh=$(We)^{1/2}$/Re=$\eta/(\gamma \rho a)^{1/2}$, where $\cup$[m/s] is the drop velocity, $\eta$ [mPa s] is the viscosity of the ink, $\gamma$ [$mJm^{-2}$] is the surface energy of the ink, $\rho$ [g $cm^{-3}$] is the density of the ink, and a [$\mu m$] is the nozzle diameter of the inkjet printing apparatus. More preferably, Z is in the range 1-14. The reason for this is to avoid, where possible, the creation of secondary (satellite) droplets during the formation of the primary droplet in inkjet printing.

For inkjet printing, preferably the flakes have a lateral size which is $\frac{1}{20}$ or less of the nozzle diameter of the inkjet printing apparatus. More preferably, the flakes have a lateral size which is $\frac{1}{50}$ or less of the nozzle diameter of the inkjet printing apparatus. This helps to avoid clogging of the nozzle during printing.

Preferably, the ink has a concentration of flakes at a level of at least 0.01 g/L. More preferably, the ink has a concentration of flakes at a level of at least 0.5 g/L.

The printing technique may be selected from inkjet printing, spin coating, Langmuir-Blodgett, spray coating, rod coating, screen printing, roll to roll coating, flexographic, gravure printing and slot-dye coating.

In the method of manufacturing the ink, preferably ultracentrifugation is carried out to provide a thickness distribution of the flakes in the second population corresponding to any range identified with respect to the first aspect, or any preferred range set out above.

The ultracentrifugation process may be a sedimentation-based separation (SBS) process.

Alternatively, the ultracentrifugation process may be a density gradient ultracentrifugation (DGU) process. In the DGU process, a density gradient medium is provided and the first population of flakes is placed in the density gradient medium and subjected to centrifugation. Preferably, the second population of flakes is isolated from at or near its isopycnic point.

The difference in rotational speed between the two techniques (SBS and DGU) is related to the different separation mechanisms, and the model of centrifuge used, and can be adjusted accordingly.

Ultracentrifugation preferably takes place for at least 0.5 hours, more preferably at least 5 hours.

After isolation of the second population of flakes from the first population of flakes, the second population of flakes may be subjected to a further process in order to further isolate desirable flakes in a third population of flakes. For example, the second population of flakes may be subjected to a process for isolating flakes of a required lateral width and/or footprint area, e.g. in the ranges set out above. A suitable process may involve filtration. Vacuum filtration has been found to be suitable in order to remove large flakes, e.g. to prepare the ink for inkjet printing.

Preferably, the printed layer is electrically conductive and optically transmissive. This is particularly useful for many applications including display applications.

Preferably, the printed layer has a sheet resistance $R_s$ of not more than $10^3$ kΩ/square. More preferably, the printed layer has a sheet resistance $R_s$ of not more than 1 kΩ/square. In order to achieve a suitably low sheet resistance, in the case where the flakes are graphene flakes, carbon nanotubes may be added to the ink. For example, the ink may further comprise single wall carbon nanotubes.

Preferably, the printed layer has an optical transmittance of not less than 80%, e.g. measured using light of wavelength 550 nm.

Preferably, the thickness of the printed layer is at least 5 nm, more preferably at least 10 nm, still more preferably at least 20 nm.

Preferably, the carrier mobility of the layer, e.g. embodied in a transistor, is at least 10 $cm^2V^{-1} s^{-1}$. More preferably, the carrier mobility of the layer is at least 50 $cm^2V^{-1} s^{-1}$.

Preferably, the printed layer is formed on a flexible substrate, e.g. a flexible polymer substrate. It is preferred that the properties of the printed layer are substantially unaffected by flexing. For example, preferably the printed layer is bendable to a radius of curvature of 5 cm or less with a change in $R_s$ of not more than 20% over 10 bending cycles.

Preferably, where the ink contains one or more dopants and/or nanomaterial additives, these are selected from:
high concentration acids (e.g. hydrochloric acid, nitric acid, sulphuric acid); nitromethane;
nitromethane and high concentration acids (as above);
nobel metal salts such as auric chloride, potassium chloroaurate, etc.; and pre-synthesized or in-situ synthesized gold/silver/copper nanoparticles/nanowires Further optional features of the invention are set out below.

BRIEF DESCRIPTION OF THE DRAWINGS

Embodiments of the invention will now be described by way of example with reference to the accompanying drawings in which:

FIG. 8 shows: (a) Thickness as a function of printing repetitions. (b, c) Sheet resistance $R_s$ and conductivity σ as a function of thickness. (d) T as a function of $R_s$ for HMDS-coated (dots), O$_2$-plasma-treated (triangles), and pristine (squares) substrates.

Figure 1:
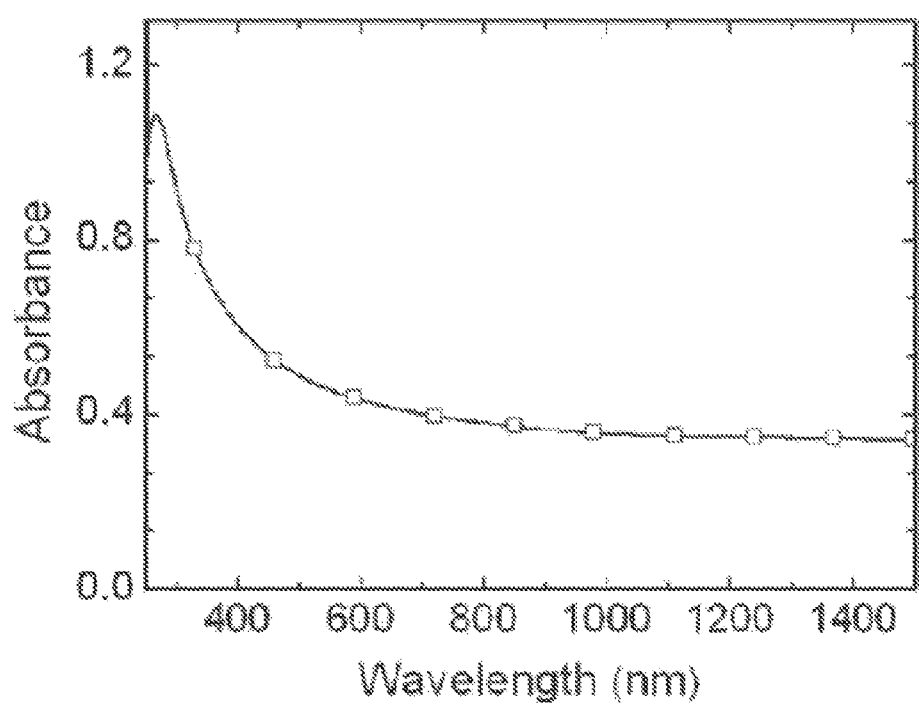
FIG. 1 shows a graph of absorbance of graphene ink diluted to 10%.

DETAILED DESCRIPTION OF THE PREFERRED EMBODIMENTS, AND FURTHER OPTIONAL FEATURES OF THE INVENTION

In this detailed description, various specific conditions, starting materials, processing equipment, analytical equipment, etc., are specified. However, it will be understood by the skilled person that different specific conditions, starting materials, processing equipment, analytical equipment, etc., can be used and yet substantially the same result achieved based on the general teaching provided by this disclosure.

Ink Jet Printing of Graphene

The following discussion relates primarily to ink jet printing of graphene. As indicated above, it is not intended that the present invention is limited either to ink jet printing as a mode of use of the ink, nor to situations in which the ink must contain graphene. However, based on the following discussion, and the remainder of the disclosure of this specification, it will be apparent to the skilled person how to adapt other layered materials for use in the same or different modes of printing.

Exfoliated layered materials (ELMs) as described below can have high specific surface areas. Some are, for example, topological insulators or thermoelectric materials, and as such enable the manufacture of printable batteries, energy storage devices, high speed transistors and heterostructures.

Applications of preferred embodiments of the invention include flexible printed electronics, displays, touch screens, radio frequency tags, electronic textiles, and molecular/chemical sensing. Patterned electronic devices or components can be formed, e.g. transistors, resistors, insulators, interconnects, electrodes and conductive patterns for various device applications as well as active/passive electrical, optical, thermoelectric, energy and magnetic devices.

Different ELM-based printable inks can be mixed (either by mixing of the inks before printing, or more preferably, by sequential printing of the different inks), changing the overall properties of the resultant material and enabling novel heterostructures to be formed. This allows roll to roll mass production of a new generation printable devices.

Ink Requirements

A key property of inks viable for ink jet printing is their ability to generate droplets. Ink viscosity, $\eta$ [mPa s], surface tension, $\gamma$ [mJm$^{-2}$], density, $\rho$ [g cm$^{-3}$], and nozzle diameter, a [µm], influence the spreading of the resulting liquid drops. These can be arranged into dimensionless figures of merit (FOM), such as the Reynolds (Re), Weber (We), and Ohnesorge (Oh) numbers: Re=$\cup\rho a/\eta$; We=$\cup^2\rho a/\gamma$, Oh=(We)$^{1/2}$/Re=$\eta/(\gamma\rho a)^{1/2}$, where $\cup$[m/s] is the drop velocity. During printing, the primary drop may be followed by secondary (satellite) droplets. This needs to be avoided in drop-on-demand printing.

Reference Fromm, (1984) suggested using Z=1/Oh as the FOM to characterize drop formation, Z>2 being required to get single-drop ejection, with no satellite drops. In 2003, Reference Derby and Reis (2003) surveyed commercial drop-on-demand systems, noting that they worked in the range 1<Z<10. More recently, Reference Jang et al (2009) experimentally confined Z between 4 and 14 by considering characteristics such as single-drop formability, position accuracy, and maximum allowable jetting frequency. However, several groups reported stable inkjet printing (i.e., without satellite droplets) even for Z>14 and 2<Z<4. For example Reference Shin et al (2011) demonstrated stable printing with Z=35.5 for an ethylene glycol (EG)-water ink, others with Z=68.5 for a glycerol-water, others with Z from 21 to 91 for polystyrene nanoparticle inks, whereas others with Z as low as 2.7 and 1 for glycerol-water and photoresist inks, respectively. By varying $\eta$, $\gamma$, and $\rho$, the present inventors propose to tune Z across and outside the conventionally assumed optimal range (1<Z<14) in order to optimize suitable inks for the specific chosen printing method, one example of which is drop-on-demand printing.

When inks contain dispersed molecules or nanoparticles, the latter should be smaller than the nozzle diameter, to prevent clogging. Reference Van Osch et al (2008) suggest, as a sufficient condition, that they should be at least 1/50 of the nozzle diameter, in order to exclude any printing instability, such as clustering of the particles at the nozzle edge, which may cause deviation of the drop trajectory, or agglomerates, eventually blocking the nozzle. In the present work, we used a nozzle diameter of about 50 µm; thus we aim for flake sizes less than 1 µm (this safe choice does not exclude the possibility that larger flakes, even 1/20 of the nozzle size, could be printable).

The ejected drop behaviour on the substrate can be described by fluid dynamics. When a liquid droplet lands on a flat surface, partial wetting results in a finite angle between the liquid and the substrate, known as the contact angle, $\theta_c$. The drop size limit is given by s[µm]=a[(We+12)/(3(1−cos $\theta_c$)+(4We/Re$^{1/2}$))]$^{1/2}$. The distance from the substrate must be optimized to guarantee both homogeneous printing and the highest resolution, barring any unusual jetting conditions, such as perturbations from the surrounding environment and diversion of the drop trajectory. Furthermore, a substrate very close to the nozzle causes secondary drops to scatter off during the impact of the primary drop, due to the initial drop jetting pressure, thus affecting the homogeneity of the final printed features. The final assembly of printed nanoparticle inks depends on the substrate surface energy (SE), as well as ink viscosity and surface tension.

When a drop of an ink containing dispersed particles evaporates on a surface, it commonly leaves a dense, ring-like deposit along its perimeter. This is the so-called "coffee ring effect", i.e., a distortion of the drops during solvent drying due to the interplay of ink viscosity and solute transport via solvent motion (arising from surface tension interaction between solvent and substrate). This is one of the most important phenomena affecting the homogeneity of inkjet-printed drops. In order to prevent this, it is necessary to "freeze" the drops' geometry immediately after they form a homogeneous and continuous film on the substrate.

We print on Si/SiO$_2$ (to probe the electrical properties of our ink) and borosilicate (Pyrex 7740-Polished Prime grade) glass substrates (to test the viability of our ink to print transparent and conductive patterns), both with a roughness Rz<15 nm. Our aim is to obtain inkjet-printed drops on a substrate with homogeneous flakes and uniform morphology, i.e., with roughness comparable to the substrate. We obtain this by varying the contact angle and optimizing the substrate wettability.

In order to reduce the coffee ring effect, we need a solvent with both boiling point (Tc [° C.]) and heat of vaporization (V, [kJ/mol]) higher than water and a substrate that promotes adhesion. Thus we use NMP as solvent for exfoliation of graphite for two main reasons. First, it has a higher boiling point (about 202° C.) and heat of vaporization (54.5 kJ/mol) than water (about 100° C. and about 40 kJ/mol). Second, NMP is ideal for high-yield, surfactant-free exfoliation of graphite. We then test several surface treatments to optimize substrate adhesion. After printing, NMP is removed by thermal annealing at 170° C. for 5 min.

Graphene-Based Printable Ink

We prepare the graphene based printable ink as follows. Graphite flakes (NGS Naturgraphit are ultrasonicated in NMP for 9 h. The unexfoliated flakes are left to settle for 10 min after ultrasonication. The decanted dispersions are then ultracentrifuged using a TH-641 swinging bucket rotor in a Sorvall WX-100 ultracentrifuge at 10 000 rpm (about 15000 g) for an hour and filtered to remove flakes >1 µm, which might clog the nozzle. More details about suitable conditions for these steps are set out below.

The resulting ink is characterized by optical absorption spectroscopy (OAS), high-resolution transmission electron microscopy (HRTEM), electron diffraction, and Raman spectroscopy.

A Perkin-Elmer Lambda 950 spectrometer with 1 nm resolution is used for the OAS measurements. OAS can be used to estimate the concentration of graphene via the Beer-Lambert law, according to the relation A=$\alpha$cl, where A is the absorbance, I [m] is the light path length, c [g/L] is the concentration of dispersed graphitic material, and $\alpha$ [L g$^{-1}$ m$^{-1}$] is the absorption coefficient. FIG. 1 plots an OAS spectrum of graphene ink diluted to 10%, to avoid possible scattering losses at higher concentrations. The spectrum in FIG. 1 is mostly featureless, as expected due to linear dispersion of the Dirac electrons, the peak in the UV region being a signature of the van Hove singularity in the graphene density of states. From $\alpha$ of about 1390 L g$^{-1}$ m$^{-1}$ at 660 nm, as for References Hernandez et al (2008) and Hasan et al (2010), we estimate c of about 0.11 (plus or minus 0.02) g/L.

Drops of inks are dispensed on holey carbon TEM grids for analysis using a Tecnai T20 high-resolution electron microscope with an acceleration voltage of 200 kV operating in phase contrast mode.

The thickness distribution of the flakes is determined using transmission electron microscopy (TEM) analysis of 20 flakes selected at random.

Figure 2:
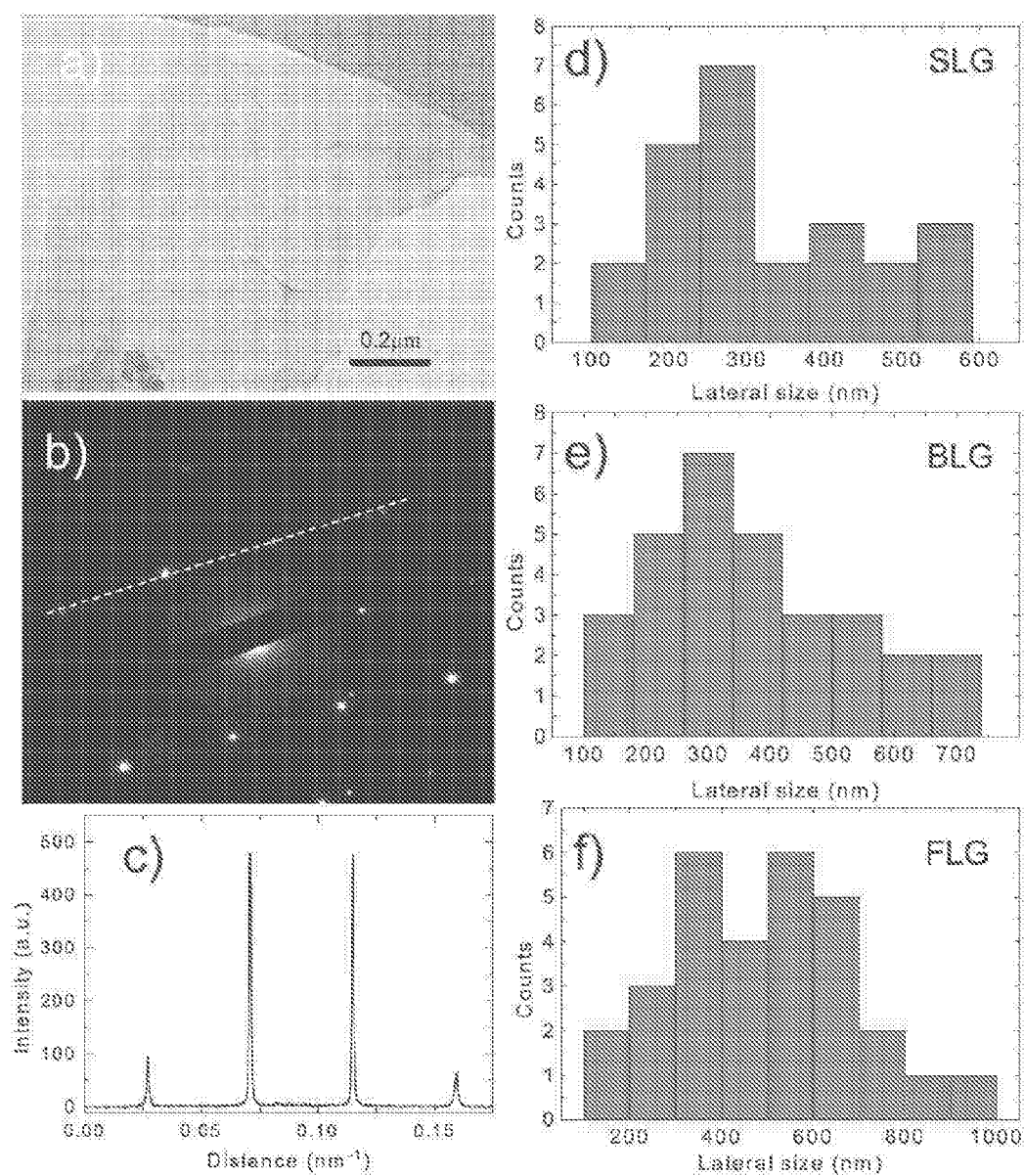
FIG. 2 shows: (a, b) HRTEM image and electron diffraction pattern of dispersion-cast SLG; (c) diffracted intensity along the dashed line in b; statistics of lateral size for (d) SLGs, (e) BLGs, and (f) FLGs.

FIG. 2a is a HRTEM image of a single-layer graphene (SLG) flake from the ink, while FIG. 2b is a normal-incidence electron diffraction of the same flake as FIG. 2a. It shows the expected 6-fold symmetry. The peaks are labelled with the corresponding Miller-Bravais (hkiI) indexes. For few-layer graphene (FLG) flakes with Bernal (AB) stacking, the intensity ratio $I_{1100}/I_{2110}$ is <1, while for SLG $I_{1010}/I_{2110}$>1. We use this to distinguish SLG from FLGs. FIG. 2c plots the diffraction intensity measured along the dashed line section through the (1-210), (0-110), (-1010), and (-2110) axis, shown in FIG. 2b. The inner peaks, (0-110) and (-1010), are about 1.5 times more intense than the outer ones, (1-210) and (-2110), indicating that the flake is SLG. The analysis of the edges also gives reliable information on the number of layers and can be used to investigate a large number of flakes, from zoomed-in high-resolution edge images. If SLG folds or several SLGs stack one on the other, selected area diffraction is used to distinguish contentious cases, in the case of graphene. This method is therefore the preferred route to establish the thickness distribution (in terms of the number of layers) of the flakes derived from layered material.

These combined analyses show that our ink mostly consists of SLGs, bilayers (BLG), and FLGs, with lateral sizes of about 300-1000 nm. We find that about 35% SLGs are larger than 300 nm (FIG. 2d); about 40% BLGs are larger than 350 nm (FIG. 2e); about 55% FLGs are larger than 450 nm (FIG. 2f). In particular, we have 33% SLG with c of about 0.11 g/L. Previous works on LPE of graphene in NMP reported up to about 28% SLG for c of about 0.18 g/L [Reference Hasan et al (2010)] and about 21% for c of about 1.8 g/L [Reference Khan et al (2010)]. Reference Valles et al (2008) also reported exfoliation of intercalated graphite in NMP, with about 20% SLGs for c of about 0.01 g/L. Thus, our ink has higher SLG yield with respect to previous works, but lower c than Reference Khan et al (2010). This higher c was achieved by long time (up to 460 h) ultrasonication. However Reference Khan et al (2010) reported defect formation and reduction of size as a result. Our combination of low-power ultrasonication (<25 W) followed by ultracentrifugation is ideal to obtain a high yield of defect-free SLGs.

Stable dispersions require the Gibbs free energy of mixing, ΔGmix, to be zero or negative, where $\Delta G_{mix}=\Delta H_{mix}-K\Delta S_{mix}$, K being the temperature, $\Delta H_{mix}$ the enthalpy of mixing, and $\Delta S_{mix}$ the entropy change in the mixing process. For graphene and nanotubes, $\Delta S_{mix}$ is small. Therefore, for dispersion and stabilization of graphene in solvents, $\Delta H_{mix}$ needs to be very small. This can be achieved by choosing a solvent whose surface energy is very close to that of graphene. The surface energy of NMP satisfies this requirement and allows efficient exfoliation of graphite. Graphite can also be efficiently exfoliated in water with the use of bile salt surfactants. Some workers have reported about 20% SLGs for c of about 0.3 g/L SLGs, while others report about 60% SLGs for c of about 0.012 g/L. The yield can be increased up to about 80% by density gradient ultracentrifugation. More detail on this is set out below. The flake size of LPE graphene in water-surfactant dispersions is on average smaller (about 200 nm or about 30 nm) than thus far reported for NMP (about 1 μm). The viscosity of NMP at room temperature (1.7 mPa s) is higher than water (about 1 mPa s). Larger flakes dispersed in a higher viscosity medium (such as NMP) experience higher frictional force and sedimentation coefficient, making it more difficult for them to sediment during ultracentrifugation. This reduces the SLG yield in NMP compared to water.

Figure 3:
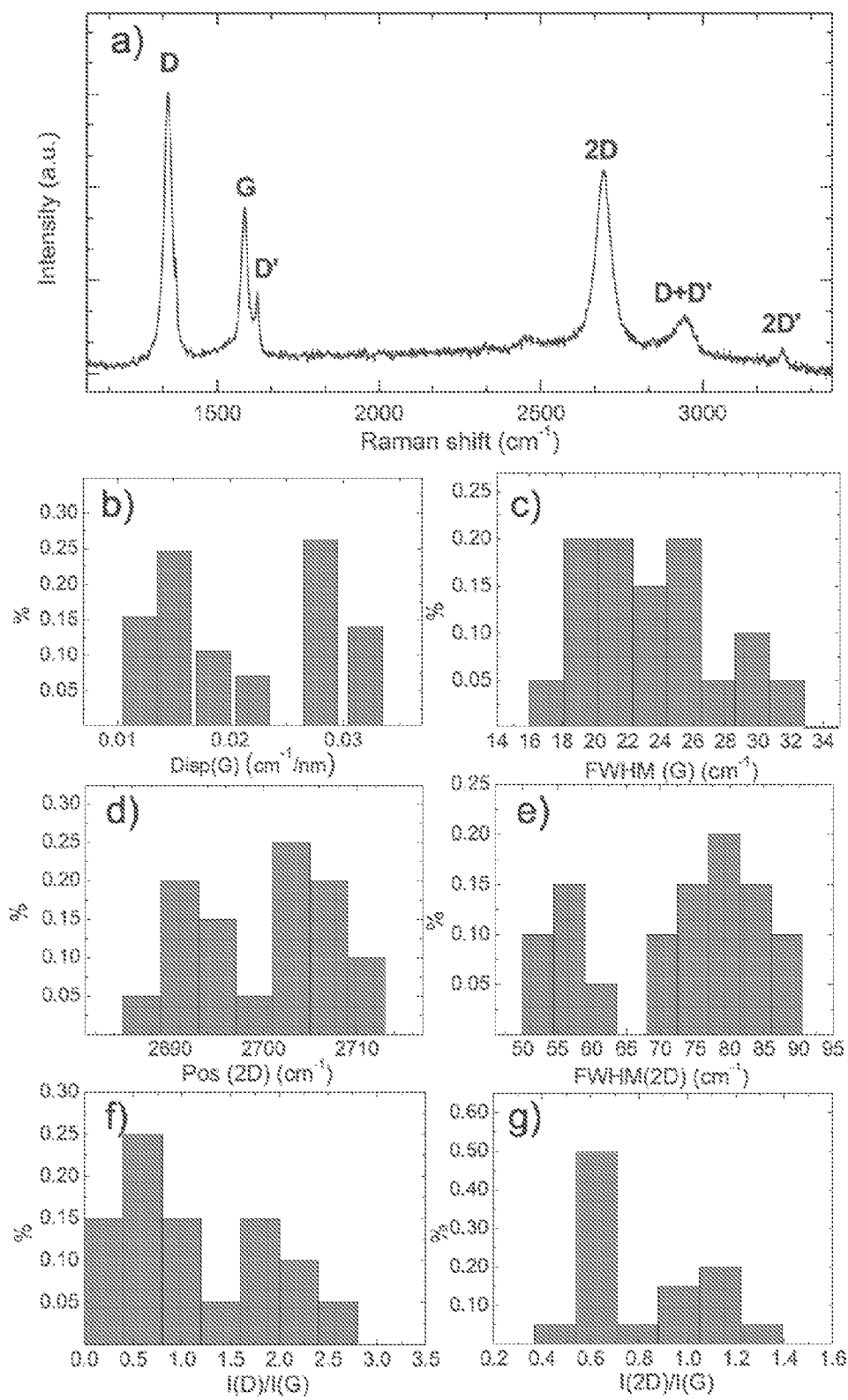
FIG. 3 shows: (a) Raman spectrum of graphene ink deposited on Si/SiO$_2$ and distribution of (b) Disp(G), (c) FWHM(G), (d) Pos(2D), (e) FWHM(2D), (f) I(D)/I(G), and (g) I(2D)/I(G) for 10 measurements.

FIG. 3a plots a typical Raman spectrum of the ink dispensed on Si/SiO$_2$ and annealed at 170° C. to remove NMP. Besides the G and 2D peaks, it shows significant D and D' intensities and the combination mode D+D' at about 2950 cm$^{-1}$. The G peak corresponds to the $E_{2g}$ phonon at the Brillouin zone centre. The D peak is due to the breathing modes of sp$^2$ rings and requires a defect for its activation by double resonance (DR). The 2D peak is the second order of the D peak. This is a single band in SLG, whereas it splits in four in BLG, reflecting the evolution of the band structure. The 2D peak is always seen, even when no D peak is present, since no defects are required for the activation of two phonons with the same momentum, one backscattering from the other. DR can also happen intravalley, i.e., connecting two points belonging to the same cone around K or K'. This gives the D' peak. The 2D' is the second order of the D' peak. We assign the D and D' peaks to the edges of the submicrometer flakes, rather than to the presence of a large amount of disorder within the flakes. This is further supported by the plot of the G peak dispersion, Disp(G) (FIG. 3b). In disordered carbons the G peak position, Pos(G), increases as the excitation wavelength decreases, from IR to UV, thus Disp (G) increases with disorder. The full width at half-maximum of the G peak, FWHM(G), always increases with disorder. Thus, combining the intensity ratio of the D and G peaks, I(D)/I(G), with FWHM(G) and Disp(G) allows us to discriminate between disorder localized at the edges and disorder in the bulk of the samples. In the latter case, a higher I(D)/I(G) would correspond to higher FWHM(G) and Disp (G).

Figure 4:
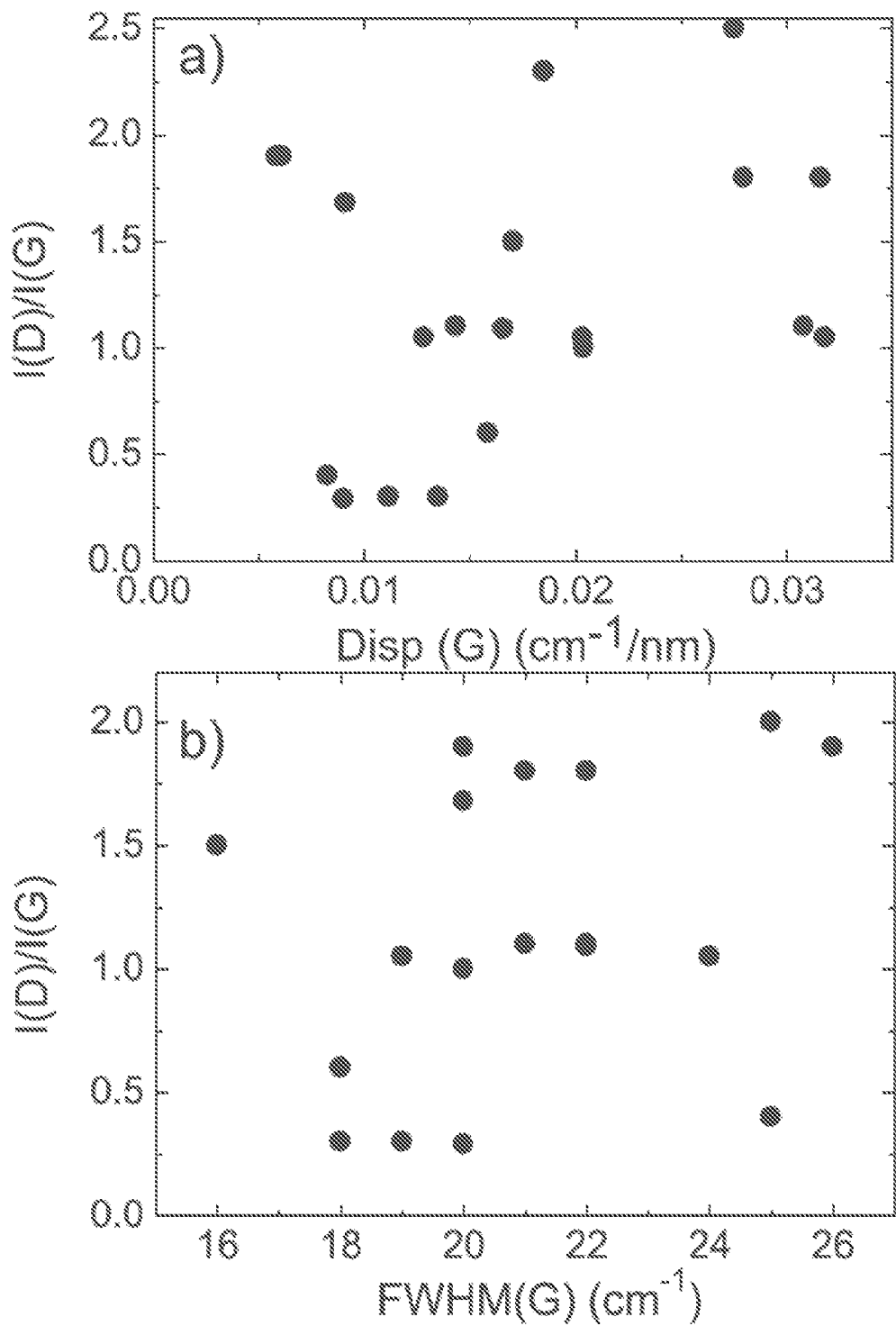
FIG. 4 shows: (a) I(D)/I(G) as a function of Disp(G); (b) I(D)/I(G) as a function of FWHM(G) measured on flakes deposited on Si/SiO$_2$.

FIG. 4a and b show that Disp(G), I(D)/I(G), and FWHM (G) are not correlated, a clear indication that the major contribution to the D peak comes from the sample edges. Also, Disp(G) is nearly zero for all samples, compared to the values larger than 0.1 cm$^{-1}$/nm expected for disordered carbons, another indication of the lack of large structural disorder within our flakes. The distribution of 2D peak position, Pos(2D), FIG. 3d, has two maxima, at about 2692 and 2705 cm$^{-1}$, similar to the FWHM(2D) distribution (FIG. 3e). This is consistent with the samples being a distribution of SLG, BLG, and FLGs, but with a significant fraction of SLGs. We note that for the flakes with the smallest Pos(2D) and FWHM(2D), the ratio of the 2D and G integrated areas, A(2D)/A(G), is at most 3.5, implying a doping of at least 10$^{13}$ cm$^{-2}$.

We derive η of about 1.9 mPa·s from viscometer measurements and γ of about 40 mJ m$^{-2}$ from tensiometer measurements. We estimate ρ of about 1.05 g cm$^{-3}$ by measuring with a micropipette ((2 nL precision) the volume of 1 mg of ink [about 0.952 mm$^3$], at room temperature and pressure. Given these parameters, and our nozzle diameter of about 50 μm, we get Z approximating to $((\gamma\rho a)^{1/2}/\eta)$ of about 24 for the graphene ink, in principle outside the conventionally assumed optimal range for printing. We thus adjust η, ρ, and γ by mixing the ink with EG(η of about 20.5 mPa s, γ of about 46 mJm$^{-2}$, ρ of about 1.09 g cm$^{-3}$) in order to bring Z within a suitable range. We consider two mixtures: EG/graphene ink 20/80 (about 80% graphene ink; about 20% EG) and EG/graphene ink 80/20 (about 20% graphene ink; about 80% EG). We measure q of about 4.2 mPa s, γ of about 42 mJ m$^{-2}$, ρ of about 1.05 g cm$^{-3}$ for EG/graphene ink 20/80 and η of about 18 mPa s, γ of about 46 mJ m$^{-2}$, ρ of about 1.08 g cm$^{-3}$ for EG/graphene ink 80/20. This gives Z of about 11.2 and about 2.8, both within the conventional range.

Figure 5:
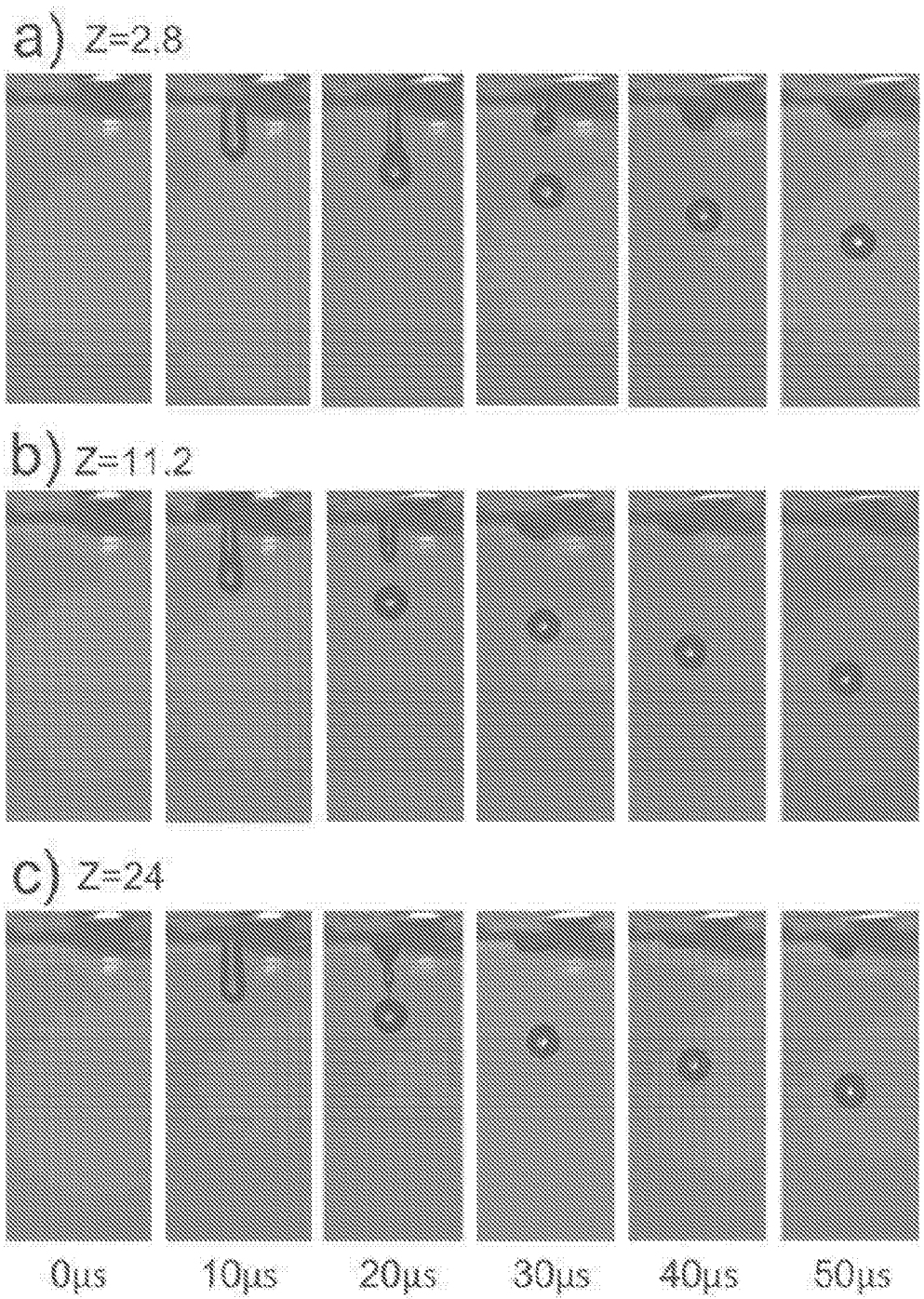
FIG. 5 shows micrographic stills of drop formation in: (a) EG/graphene ink 80/20 (Z=2.8), (b) EG/graphene ink 20/80 (Z=11.2), and (c) pristine graphene ink (Z=24).

We use an Epson Stylus 1500 inkjet printer with a S020049 cartridge under a constant nitrogen flow. A high acquisition speed camera (Sony XCD-X700, with 105 s$^{-1}$ acquisition rate) captures the dynamics of droplet formation. Shown in FIG. 5a and b are drop ejection sequences for EG/graphene ink 80/20 and EG/graphene ink 20/80. These show individual drop ejection in both cases, as expected for inks within 1<Z<14, with no satellite droplets. FIG. 5c is the drop ejection sequence for the pristine graphene ink. Notably, even if Z is about 24, we do not detect any satellite droplet. Hence, although Z is out of the conventionally assumed stable inkjet printing range, FIG. 5c shows that drop-on-demand from pristine graphene ink can be achieved. This shows that 1<Z<14 is a sufficient, but not strictly necessary, condition for drop-on-demand printing. Thus, we will focus on the pristine graphene ink in the subsequent sections.

We note that LPE is a viable technique to achieve liquid dispersion of a range of layered materials (e.g. transition metal dichalcogenides, transition metal oxides, and other two-dimensional compounds such as BN, $MoS_2$, $Bi_2Te_3$, and $Bi_2Se_3$). Therefore, this approach provides a range of printable inks based on layered materials. These can then be mixed or printed to form hybrid heterostructures with novel properties. Further details on such structures are set out below.

Inkjet-Printed Features

The nozzle of our printer is about 1 mm above the substrate. The final layout of printed nanoparticle inks depends on the substrate SE, as well as ink viscosity and surface tension. To investigate the influence of surface treatments, we print on pristine, hexamethyldisilazane (HMDS)-coated, and $O_2$-plasma-treated Si/$SiO_2$. HMDS is deposited by spin coating for 40 s at 1000 rpm, followed by annealing at 80° C. for 2 min. The $O_2$ plasma is generated at 200 W and 4×10$^{-1}$ Torr for 2 min. We use optical micrographs with dark-field imaging to visualize the inkjet-printed drops. These reveal that HMDS constrains the drops to about 90 μm diameter smaller than the other substrates (about 100 and about 150 μm for pristine and plasma-treated $SiO_2$, respectively). As discussed above, we use NMP as solvent to reduce the coffee ring effect compared to low boiling point solvents (e.g., water, chloroform). However, we still observe coffee rings when printing on pristine $SiO_2$, while there is flake uniformity and no coffee rings on HMDS-treated $SiO_2$. Thus, HMDS appears to prevent coffee rings. To understand this, we measure the substrates' SE and investigate the printed stripes' morphology, before and after surface treatment.

We utilize contact angle analysis to estimate the substrate surface tension, and SE. $\theta_c$ depends on the liquid surface tension and the substrate critical surface tension, according to Young's relation $\gamma_{SV} - \gamma_{SL} - \gamma_{LV} \cos \theta_c = 0$, where $\gamma_{SV}$[mJ m$^{-2}$] is the solid-vapour surface tension, $\gamma_{SL}$ the solid-liquid surface tension, and $\gamma_{LV}$ the liquid-vapour surface tension. We have shown the viability of inkjet printing to fabricate complex layouts.

Measurement of $\theta_c$ for water drops printed onto $O_2$ and HMDS-treated Si/$SiO_2$, give $\theta_c$ of about 6° and about 65°, respectively, indicating that the $O_2$-treated substrate SE is modified following HMDS treatment. $\gamma_{LV}$ was measured as about 73 mJ mJ m$^{-2}$ in Reference Shafrin and Zisman (1967) for DI water, whereas γSV of about 116.5 mJm$^{-2}$ and about 40 mJm$^{-2}$ were reported for $O_2$ [Reference Thomas et al (1996)] and HMDS-treated [Reference Glendinning and Helbert (1991)] Si/$SiO_2$ substrates. Consequently, $\gamma_{SL}$ is about 43.9 mJ m$^{-2}$ and about 9.1 mJ m$^{-2}$ for $O_2$ and HMDS treated Si/$SiO_2$. A higher $\gamma_{SL}$ implies a higher SE. Indeed, our $\gamma_{SL}$ correspond to SEs of about 73.9 and about 39.1 mJ m$^{-2}$ for $O_2$ and HMDS-treated Si/$SiO_2$. A small $\theta_c$ results in the rapid drop spreading on the substrate, as for $O_2$-treated $SiO_2$. HMDS provides higher $\theta_c$, since it lowers $\gamma_{SL}$ (thus the substrate SE), therefore reducing the wettability.

When inkjet printing stripes, the interdrop (i.e., centre-to-centre) distance is an important parameter. When the distance is large, individual drops are deposited. As the interdrop distance decreases, these merge into a line. Thus, in order to obtain a continuous line, we need an interdrop distance smaller than the drop diameter. On the other hand, some workers have reported that a very small interdrop distance can result in particle aggregation on the substrate, thus a nonuniform stripe (i.e., irregular edges). We select an interdrop distance suitable to have continuous lines, avoiding at the same time nonuniformities and irregular edges.

We have studied optical images of printed stripes on pristine, $O_2$-plasma-treated and HMDS treated Si/$SiO_2$, and also plotted the respective atomic force microscope (AFM) topographies. For pristine Si/$SiO_2$, the stripe is about 100-110 μm wide, having an average thickness of about 70 nm and an irregular flake distribution, with aggregation of flakes. AFM confirms the presence of voids and irregular flake distribution, with Rz of about 30-40 nm. For $O_2$-plasma-treated Si/$SiO_2$, the stripe is wider (about 130-140 μm), with aggregates at the edges and an average thickness of about 55 nm. For HMDS treated Si/$SiO_2$, the stripe has a more uniform and regular distribution of flakes, having a width of about 85-90 μm width and about 90 nm average thickness. AFM confirms a more homogeneous network with Rz of about 15 nm. The width narrows going from the $O_2$-plasma-treated to the HMDS-treated Si/$SiO_2$, due to the SE decrease. Rz is lower when $\theta_c$ is higher, because the poor wettability of drops with higher $\theta_c$ reduces the stripe width, confining the flakes onto a smaller area. The uniformity of stripes printed on the HMDS-treated substrate corroborates the above considerations on the SE changes. In fact, the presence of silane groups in the molecular structure of HMDS acts as promoter of metallic particle adhesion to the substrate. Analogously, HMDS may promote the adhesion of graphene flakes to the substrate, thus favouring the formation of a regular network.

Figure 6:
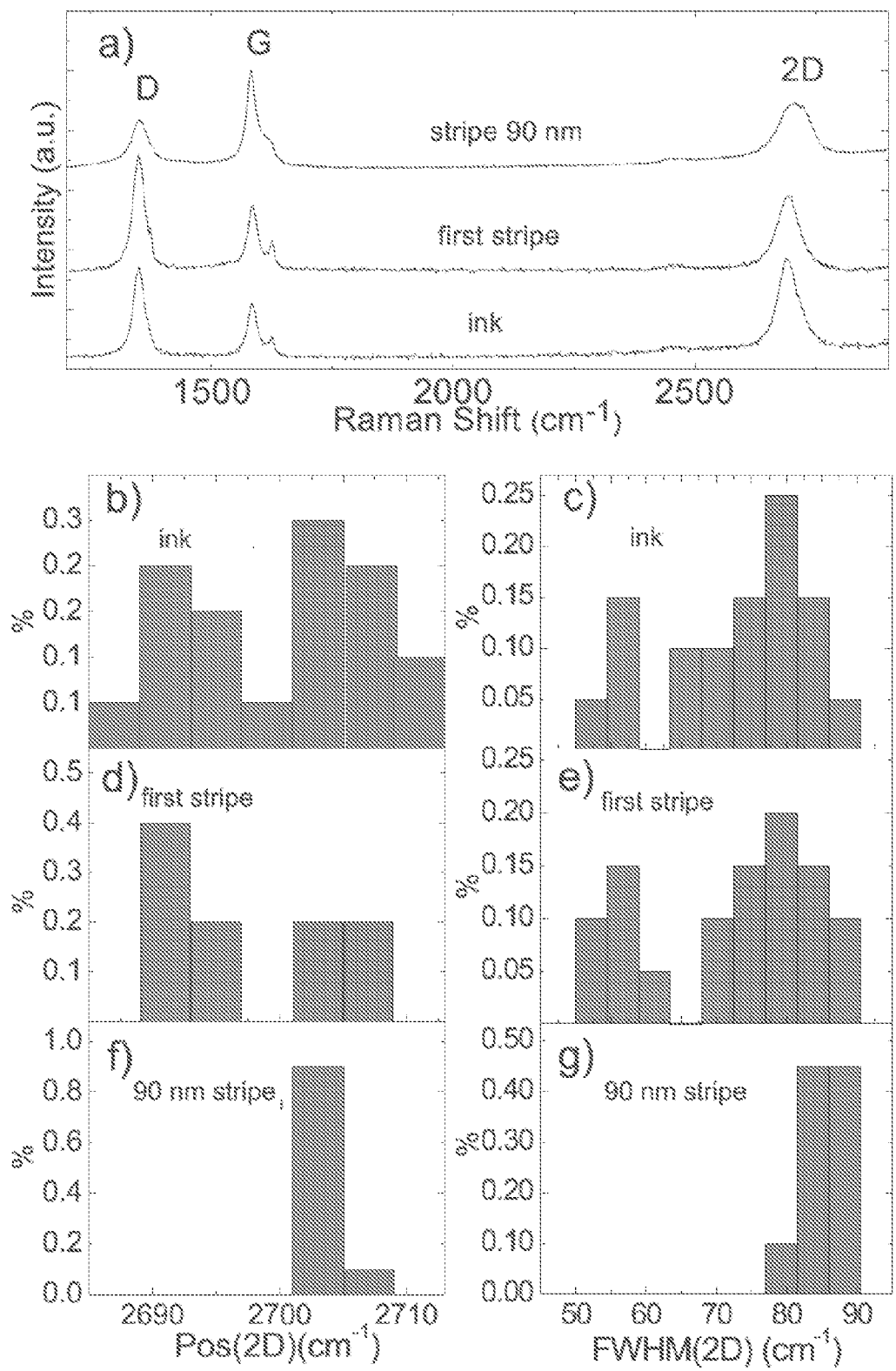
FIG. 6 shows (a) typical Raman spectrum of individual flakes in the ink, compared with spectra measured on the first stripe and on a stripe 90 nm thick. Pos(2D) and FWHM(2D) for (b, c) ink; (d, e) first stripe; and (f, g) 90 nm thick stripe.
Figure 7:
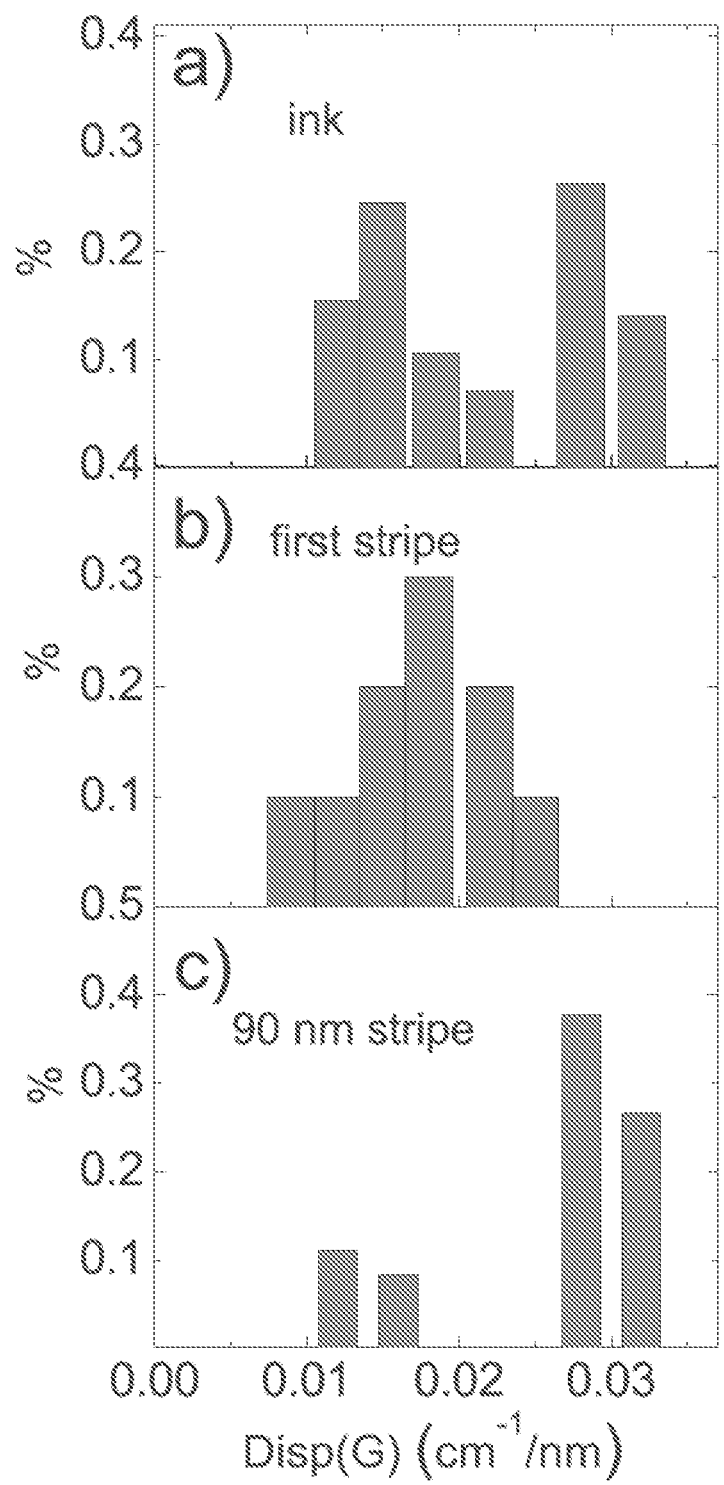
FIG. 7 shows the distribution of Disp(G) for (a) ink; (b) first stripe; and (c) 90 nm thick stripe.

FIG. 6a compares a typical Raman spectrum of a flake in the ink, with a measurement on the first stripe and on a stripe 90 nm thick, after 30 printing repetitions. FIGS. 6b,c,d,e,f,g and FIG. 7 compare the Pos(2D), FWHM(2D), and Disp(G) distributions. The data show that the first stripe has very similar characteristics to the ink, as expected. However, the spectra after 90 repetitions show Pos(2D) and FWHM(2D) distributions more typical of a multilayer sample, having lost any direct signature of SLG. Note, however, that the 2D peak shape, even for the 90 nm stripe, remains distinctly different from that of graphite.

A similar aggregation of flakes was previously observed for thick films derived from graphene dispersions. In all cases Disp(G) remains similar and very low, again showing the lack of large amounts of defects within the flakes.

Transparent and Conductive Patterns

We now investigate the viability of our ink to print transparent and conductive patterns. We characterize the sheet resistance Rs [Ω/square] and transmittance T [%] of our stripes when placed on a transparent substrate. We thus use pristine, $O_2$- and HMDS-treated borosilicate glass, with Rz<15 nm, similar to $SiO_2$ on Si, but with T of about 99% (Pyrex 7740-Polished Prime grade).

FIG. 8a shows that for our stripes the thickness (t [nm]) increases linearly as a function of printing repetitions, with a slope defined by the surface treatment. FIG. 8b plots the four-probe measured $R_s$ (see below for the method of measurement) as a function of t. For large t, $R_s$ is about 34, about 500, and about 105 kΩ/square for HMDS-treated, pristine, and $O_2$-treated glass, respectively. For t<20 nm, $R_s$ increases for all substrates. For a thin film, $R_s=(\sigma t)^{-1}$, where a[S/m] is the conductivity. Thus, from FIG. 11b and $\sigma=(R_s t)^{-1}$, we get the data in FIG. 8c. a is constant for t>20 nm, in the case of HMDS-treated, pristine, and plasma-treated glass, with an average a of about $10^2$, about 30, and about $10^{-1}$ S/m, respectively. Thus, stripes on HMDS treated glass have a higher σ, combined with a more regular network of flakes, compared to the other two substrates. When t<20 nm, σ decreases for all substrates. A similar trend has been reported by others for CNT films on $SiO_2$ (produced by vacuum filtration), inkjet printed CNT patterns on $SiO_2$, graphene films on $SiO_2$, and polyethylene-terephthalate, as well as Ag nanowire films, produced by vacuum filtration on $SiO_2$. The decrease of σ for small t, has been explained as being due to percolation.

The percolation theory predicts a, for a network of conductive particles, to scale as:

$$\sigma \propto (X-X_C)^\beta \qquad \text{Equation A1}$$

where X [μg/mm²] is the concentration of conductive particles per unit area, $X_c$ [μg/mm²] is the critical concentration of flakes corresponding to the percolation threshold, and β is the percolation exponent. Equation A1 can be rewritten in terms of t, rather than X, as:

$$\sigma \propto (t-t_C)^\beta \qquad \text{Equation A2}$$

where $t_c$ is the critical thickness and ∈ is the percolation exponent. FIG. 8c shows two regimes for σ as a function of t: a percolative linear behaviour for t<20 nm and a constant $\sigma_{bulk}$ for t>20 nm. Such regimes can be explained considering that our films stop behaving like bulk materials below a critical thickness ($t_{min}$), entering the percolation region.

Figure 9:
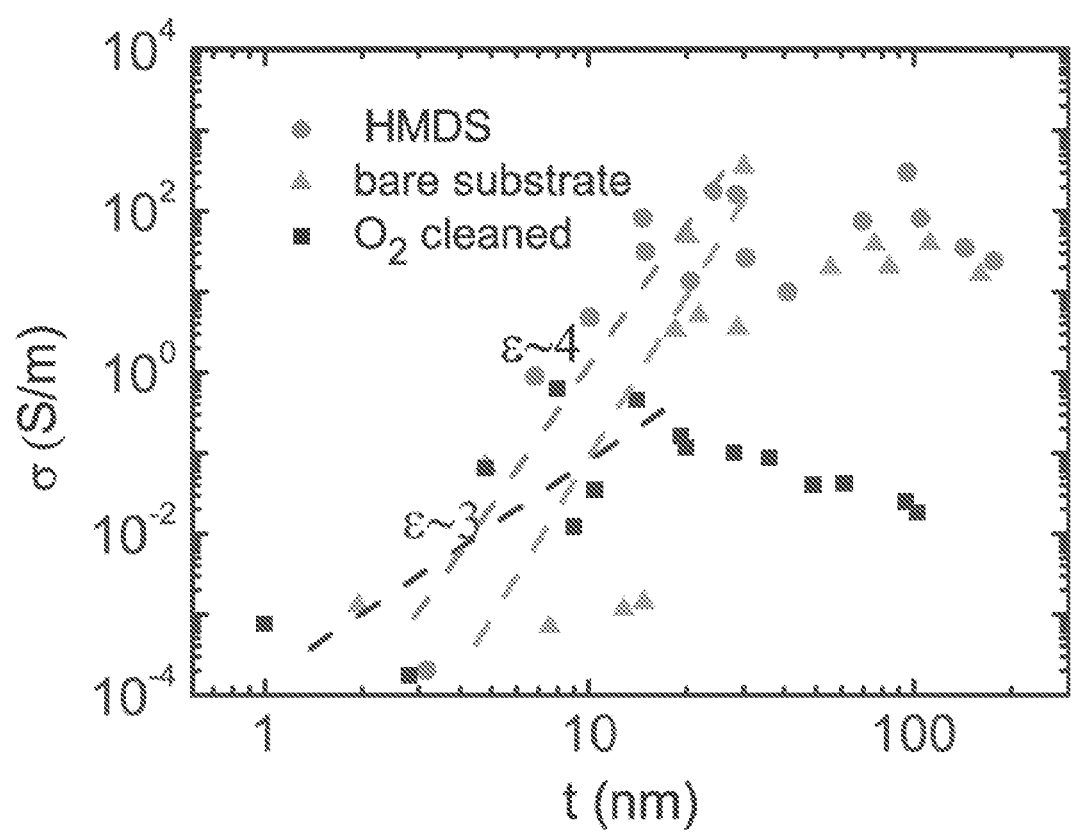
FIG. 9 shows a plot of conductivity σ as a function of film thickness, in logarithmic scale, for stripes printed on HMDS-treated (dots), O$_2$-treated (triangles), and pristine (squares) substrates. Lines are fits in the percolation regime of conductivity.

The exponent ∈ can be estimated by a linear fit of the $\log_{10}$ plot of σ vs t in the percolation region (t<20 nm), FIG. 9. We get ∈ of about 4 for stripes on HMDS treated and pristine glass, while ∈ is about 3 for $O_2$-treated glass. These values indicate percolation, as reported others for networks with various geometries. ∈ is expected to increase with particle size and decrease with $X_c$. Assuming a similar particle size, since the same ink is used for all cases, we deduce that ∈ of about 4 points to a larger $X_c$ than ∈ of about 3. This indicates formation of a more uniform network on HMDS-treated and pristine glass compared to $O_2$-treated glass.

We also determine the minimum concentration necessary to achieve the bulk conductivity regime. To do so, we assume X>>$X_c$, because the bulk regime needs a tight network of interconnected flakes. Given our c of about 0.11 g/L, volume per printed drop of about 10 nL, and a dried drop size on the three substrates of about 90, 100, and 130 μm, we estimate X of about $4\times10^{-2}$, about $10^{-2}$, and about $0.7\times10^{-2}$ μg/mm² for stripes printed on HMDS, pristine, and plasma-treated glass, respectively. Consequently, from Equation A1, a for stripes printed on HMDS-treated glass (a of about $10^2$ S/m) is higher than on pristine (a of about 40 S/m) and plasma treated glass (a of about 0.1 S/m).

FIG. 8d shows T as a function of $R_s$. The dashed lines are a plot of the relation $T=(1+(Z_0 G_0)/(2R_s \sigma_{bulk}))^{-2}$ expected for graphene ink stripes with $\sigma_{bulk}$ conductivity, where $Z_0=377\Omega$ is the free-space impedance and $G_0$ is about $6\times10^{-5}\Omega^{-1}$ is the universal optical conductance of graphene. The solid lines are a plot of $T=[1+(1/\Pi)(Z_0/R_s)^{(1/\in+1)}]^{-2}$ expected for stripes in the percolative regime, where Π is the percolative figure of merit $\Pi=2[(\sigma_{bulk}/G_0)/(Z_0 t_{min} G_0)^\in]^{(1/\in+1)}$. Our experimental T deviates from the dashed lines for T>75%. We assign this to the percolative regime, with $\sigma_{DC}$ deviating from a bulk-like behaviour. Also in this case, printing on HMDS-treated glass gives the highest T for a given $R_s$.

Inkjet-Printed Devices

Here we report preliminary work on non-optimised devices. It is anticipated that the skilled person will be able to work from this disclosure in order to produce devices with superior performance without undue effort.

Inkjet-printed TFTs based on organic semiconducting polymers have been widely investigated. The present state of the art devices have μ ranging from 0.01 to about 0.5 cm² $V^{-1}$ $s^{-1}$, with ON/OFF ratios up to $10^5$. Several inkjet-printed TFTs using various carbon nanomaterials have been reported. For example, fullerene-based TFTs have been reported, with μ up to 0.01 cm² $V^{-1}$ $s^{-1}$, and ON/OFF ratio of <10. TFTs printed from CNT based inks have been presented by several groups. The highest μ reported thus far is about 50 cm² $V^{-1}$ $s^{-1}$, combined with an ON/OFF ratio of $10^3$, but measured at $10^{-6}$ Torr. Inkjet-printed TFTs from GO-based inks have been disclosed, with μ up to about 90 cm² $V^{-1}$ $s^{-1}$, for an ON/OFF ratio of 10 (measured at room conditions), after GO reduction.

We printed graphene-TFTs by inkjet printing graphene ink onto $Si/SiO_2$. Contacts were formed from chromium-gold source and drain pads. A layer of poly[5,5'-bis(3-dodecyl-2-thienyl)-2,2'-bithiophene] (PQT-12) is printed on top.

The output characteristics (shown in FIG. 10a) are measured at $V_{gs}=-2$, −5, and −20 V, and transfer characteristics (shown in FIG. 10b) are measured (at room conditions) at different drain voltages (Vds=−2, −4, and −8 V). μ is derived from the slope of the transfer characteristic according to $\mu=(L/WC_i V_{ds})/(dI_d/dV_{gs})$, where L [μm] and W [μm] are the channel length and width, respectively, and $C_i$ is the gate dielectric capacitance (about 10 nF/cm²). The geometry for all the printed TFTs is L of about 500 μm, W of about 80 μm, and thickness of about 25 nm.

We investigated how processing parameters such as inter-drop distance, TFT channel thickness, surface treatment, and annealing temperature affect μ and ON/OFF ratio, in order to optimize the fabrication process for printed graphene-based TFTs. When varying the interdrop distance in a 25 nm thick graphene-TFT printed on a HMDS-treated substrate annealed at 170° C., μ has a maximum for an interdrop (centre-to-centre) distance of about 40 μm. This is consistent with the intuitive idea that optimized devices are obtained when the interdrop distance is roughly equal to the average drop diameter. When varying channel thickness (for a graphene-TFT printed on a HMDS treated substrate with a 40 μm interdrop distance, annealed at 170° C.), μ rapidly increases up to 95 cm² $V^{-1}$ $s^{-1}$ for about 25 nm channel thickness, and then stays roughly constant, until decreasing for thicknesses larger than 40 nm. This behaviour is expected, since we have shown in FIG. 8 that percolation is reached for thicknesses >20 nm. On the other hand, the field effect modulation becomes less effective when the channel is too thick. The post-annealing treatment improves mobilities and ON/OFF ratios with a plateau above 160° C. However, we do not wish to increase too much the post-annealing temperature to avoid possible sample damage. We then considered how surface treatments of the substrate ($O_2$-plasma-treated, HMDS-treated, and pristine $Si/SiO_2$) affect μ and ON/OFF ratio for a 25 nm graphene-TFT, printed with a 40 μm interdrop distance and annealed at 170° C. We obtain μ of about 95 $cm^2$ $V^{-1}$ $s^{-1}$ with an ON/OFF ratio of about 10 for the HMDS-treated substrate and worse performances for the other two substrates. This is yet again expected considering the coffee ring effects of nonoptimized substrates.

We conclude that, in this particular experiment, the optimal processing parameters to inkjet print graphene-TFT correspond to an interdrop distance of about 40 μm, a channel thickness of about 25 nm, and an annealing temperature of about 170° C. on a substrate treated with HMDS. In this case μ is about 95 $cm^2$ $V^{-1}$ $s^{-1}$ and the ON/OFF ratio is about 10 at $V_{ds}$=−2 V, comparable to those reported for inkjet-printed RGO TFTs. μ in our devices is almost 4 times higher than printed fullerene-based TFTs (for the same ON/OFF ratio of about 10) and more than 2 orders of magnitude higher than inkjet-printed CNTs (for the same ON/OFF ratio of about 10). However, the ON/OFF ratio in our TFTs is lower than the state of the art for CNTs (but measured at $10^{-6}$ Torr) at similar p. We note that inkjet-printed electronics requires high μ at room conditions. To date, CNT inkjet-printed devices measured at room conditions have μ no larger than about 1 $cm^2$ $V^{-1}$ $s^{-1}$ (at an ON/OFF ratio of about 10), which is 2 orders of magnitude smaller than our inkjet-printed TFTs.

Organic semiconducting inks suffer from low μ, limited by variable range hopping of charges between isolated polymer chains. The overall charge conduction in crystalline organic semiconducting thin films is determined by both intrachain and interchain charge transport. The former is much faster than interchain hopping. Many groups have tried to improve interchain hopping, e.g. by a chemical modification of a semiconducting organic ink by electron acceptors, or addition of Au nanoparticles. Embedding CNTs in a semiconducting ink previously allowed us to get μ of about 0.07 $cm^2$ $V^{-1}$ $s^{-1}$ at room conditions.

We combine our graphene ink with one of the most common organic polymers in inkjet printing, Poly(3,3'''-didodecyl quarter thiophene (PQT-12), in order to investigate graphene's viability as an interchain hopping enhancer (similarly to Au nanoparticles and CNTs). PQT-12 is widely used due to its higher environmental stability (up to 300 days at room conditions), with respect to other organic semiconducting inks.

Figure 10:
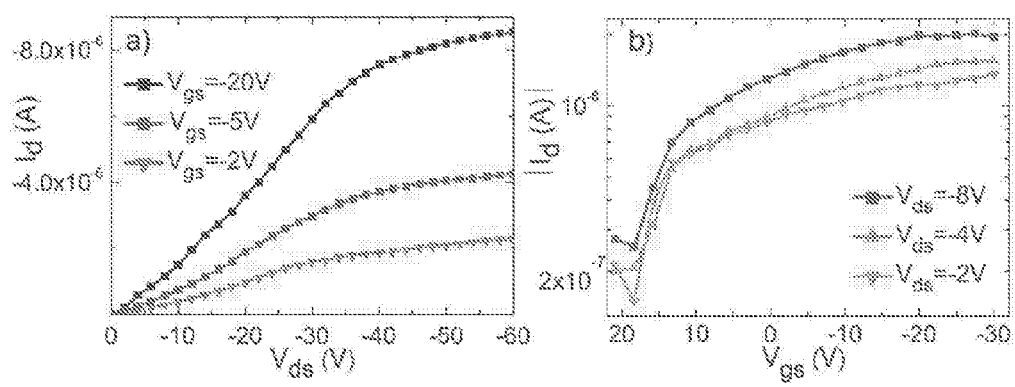
FIG. 10 shows: (a) output and (b) transfer characteristics of an inkjet-printed graphene TFT.

We fabricated a graphene/PQT-12 TFT. FIG. 10a plots its output characteristics at $V_{gs}$=−2, −5, and −20 V. For each $V_{gs}$, $V_{ds}$ is swept from 0 to −60 V in steps of 2 V. At $V_{ds}$=−8 V, we get μ of about 0.1 $cm^2$ $V^{-1}$ $s^{-1}$ and an ON/OFF ratio of about 4×$10^5$. The μ of graphene/PQT-12 TFT is about 10 times that of inkjet-printed CNTs/PQT-12 TFTs at an ON/OFF ratio of about $10^5$. Compared to organic semiconducting polymers, our μ is 10 times that of inkjet-printed PQT-12 and twice the highest reported value for inkjet-printed TFTs made of pure poly(2,5-bis(3-tetradecyllthiophen-2-yl)thieno[3,2-b]thiophene. Thus, the combination of graphene and organic semiconducting inks is promising for high-performance printed electronics.

To summarize, liquid phase exfoliated graphene is an ideal and low-cost material to make printable inks. Our graphene ink was used to print TFTs with μ up to about 95 $cm^2$ $V^{-1}$ $s^{-1}$. It was also combined with PQT-12 to fabricate devices with μ of about 0.1 $cm^2$ $V^{-1}$ $s^{-1}$ and ON/OFF ratios of about 4×$10^5$. This demonstrates its viability for flexible and transparent electronics. Our ink preparation technique can be generalized to a wide range of layered materials (e.g. transition metal dichalcogenides, transition metal oxides, and other two-dimensional compounds such as BN, $MoS_2$, $Bi_2Te_3$, and $Bi_2Se_3$) that can also undergo liquid phase exfoliation. These can then be mixed or printed to form hybrid heterostructures with novel properties.

Large Scale Exfoliation and Sorting of Graphene in Centrifugal Fields

More detail is given here relating to the process of LPE and centrifugation of graphene in order to provide the required thickness distribution for the graphene flakes. As will be apparent to the skilled person, these techniques can be adapted to provide the required thickness distribution for other layered materials.

Graphene dispersions can be purified following different strategies based on preparative ultracentrifugation. This separation technique was historically used for the separation of biological materials in a uniform or density gradient medium (DGM).

Sedimentation based separation (SBS) separates various particles into fractions on the basis of their sedimentation rate, which determines how particles in dispersion sediment out of the fluid in which they are dispersed, in response to a centrifugal force acting on them.

In density gradient ultracentrifugation (DGU), particles are ultracentrifuged in a preformed DGM. During the process, they move along an ultracentrifuge cell, dragged by the centrifugal force, until they reach the corresponding isopycnic point, i.e., the point where their buoyant density equals that of the surrounding DGM. The buoyant density is defined as the density of the medium at the corresponding isopycnic point (measured in $g/cm^3$), which depends on the dispersion, on the type of surfactant and may also be different in diverse gradient media or according to the pH of the environment. Such a process depends only on the buoyant density of the particles and is also known as isopycnic separation. If the ultracentrifugation is stopped before the particles achieve their respective isopycnic points, a zonal separation (ZS) is attained. The latter is dependent on the sedimentation rates of the particles themselves. SBS was introduced in 2002 in the field of carbon-based materials for the separation of individual nanotubes from bundles [Reference O'Connell et al (2001)]. On the other hand, while ZS permits the separation of nanotubes by length, isopycnic separation is used for the sorting of nanotubes by diameter, metallic vs semiconducting, and chirality. Concerning graphene and graphitic flakes, recently, up to about 60% SLG was achieved by low power sonication in water with sodium deoxycholate (SDC) followed by SBS. Bile salt surfactants also allow the isolation of flakes with controlled thickness, when combined with DGU.

High yield of exfoliated graphene can be also obtained via low power sonication of graphite in a di-hydroxy Sodium Deoxycholate (SDC) aqueous solution followed by a separation in a centrifugal field. Both SBS and isopycnic separation can be used to obtain dispersions highly enriched in monolayer and few layer graphene. TEM shows that the flakes (>99%) obtained by SBS have less than 4 layers and about 65% are single-layer, with average size of about 6×$10^{-4}$ $μm^2$. On the other hand, isopycnic separation, besides sorting flakes by number of layers, allows us to obtain larger flakes with respect to SBS. This is also evidenced through micro-Raman. Indeed, we achieved about 60% SLG in the topmost fraction, with average size in the order of about 1 µm². We also show that SDC is a suitable surfactant for sorting graphite flakes by number of layers. We show that this separation is strongly affected by the coverage and clustering (aggregation properties) of the surfactant molecules.

Basic Principles of Separation in Centrifugal Field—Sedimentation Based Separation When a graphene-surfactant complex (GSC) is dispersed in a solvent and subjected to a centrifugal field, three forces act on it. The centrifugal force, $F_s=m_{tot}\omega^2 r$, equal to the product of the mass of the GSC ($m_{tot}$), the square of the angular velocity ($\omega$), and the distance (r) from the rotational axis. The buoyant force, $F_b=-m_0\omega^2 r$, is equal to the weight of fluid displaced ($m_0$) by the GSC (Archimedes' principle). Under the centrifugal force, the GSC will tend to move to the bottom/end of the cell. However, during ultracentrifugation, GSC move through the solution so they will also be subjected to a frictional force, $F_f=-fv$, where f is the frictional coefficient. In general, a particle of known volume and density in a medium of constant density will be accelerated under a centrifugal field, until the net force equals the force resisting its motion through the medium. f depends on shape and size of the particles and increases as the particle geometry moves away from a spherical shape, which means that large or elongated particles experience more frictional drag than compact spherical ones of same mass.

Both $F_b$ and $F_f$ act in the opposite direction to sedimentation. The rate of sedimentation in a centrifugal field, is described by the Svedberg equation:

$$s=v/(\omega^2 r)=m(1-\bar{v}\rho)/f \quad (1)$$

where s is the sedimentation coefficient, commonly reported in Svedberg (S) unit, where 1S corresponds to $10^{-13}$ sec. v is the sedimentation velocity, $\bar{v}$ is the partial specific volume (the volume in mL that each gram of the solute occupies in solution) and µ is the density of the solvent (g/mL). S depends on the properties of the particle and is proportional to the buoyant effective molar weight of the particle, while it is inversely proportional to f. In general, molecules with different weights, shapes or sizes, will move with different velocities in a given centrifugal field. They will thus have different S values. As a function of ultracentrifugation time, the GSC begin to pile up at the bottom of the cuvette. As the concentration of GSC at the cuvette bottom increases, the diffusion process opposes further sedimentation. Equilibrium is reached when sedimentation and diffusion are balanced and the concentration of flakes along the cuvette no longer changes with time. From equation 1, at the equilibrium the sedimentation of GSC only depends on the frictional coefficient and molecular weight. Thus, the SBS of GSC ensures a separation based on their molecular weight and shape.

Basic Principles of Separation in Centrifugal Field—Isopycnic Separation

Isopycnic separation exploits subtle density variation between objects in order to obtain a spatial separation inside an ultracentrifuge cell under a centrifugal force. Reference Arnold et al (2005) first applied this separation technique in the field of carbon-based nanomaterials for the diameter sorting of SWNTs. In this case, the effective density ρ of a nanotube, with radius R, shell thickness t and containing a fraction F of liquid filling, can be calculated from Equation 2:

$$\rho = \rho_1 \frac{2t}{R} + \rho_2\left(1-\frac{2t}{R}\right)F \quad (2)$$

where $\rho_1$ is the density of graphene and $\rho_2$ that of the liquid. Equation 2 shows that the density of the nanotube is intrinsically related to its radius and in first approximation is inversely proportional to the radius itself. Thus in principle, the relationship between pure nanotube density and diameter would be sufficient for the discrimination of SWNTs by their diameters in a density gradient. However, the density of SWNTs, at least in the diameter range 0.7-2 nm and calculated from Equation 2, is higher than that of water. This means that when nanotubes are centrifuged in water at high g-force they should pellet at the bottom of the cell. However, surfactant shells around SWNTs provide additional buoyancy that keeps individual nanotubes and small bundles aloft whereas larger bundles sediment out, permitting the separation of SWNTs by their diameter in a density gradient. Moreover, the use of co-surfactants mixtures permitted the metallic vs semiconducting separation and the single chirality enrichment. Contrary to nanotubes, where in principle a separation of bare nanotubes is possible, in the case of graphitic flakes we have to induce a density difference between SLG, BLG, etc. in order to have their spatial separation inside ultracentrifuge cell during isopycnic separation. Indeed, the density of graphite flakes is independent from the number of layers, and SLG, BLG, etc. cannot be separated using isopycnic separation. The density difference is then provided by surfactant covering the flakes. The surfactant, besides stabilizing the repulsion between the hydrophobic surface of graphitic flake and water, provides a variation in buoyant density, according to the flake thickness. Considering a uniform layer of surfactant, the buoyant density of the GSC increases with the number of graphene layers.

Experimental—Sedimentation Based Separation 2 mg graphite powder is added to 10 mL deionized (DI) water with 0.3% w/v SDC (Sigma Aldrich). The graphite powder used (Sigma Aldrich: product number 332461) consists of graphite flakes with average size in the order of few mm². SDC is an amphiphilic molecule, with a hydrophobic and a hydrophilic side, which disperses graphite in aqueous solution by physical adsorption on its surface. SDC molecules are steroids, organic compounds such as cholesterol, composed of seventeen carbon atoms arranged in four rings, the cyclopentenophenanthrene nucleus, and are shaped like a flattened ellipsoid with dissimilar sides. The β-face is hydrophobic due to its methyl groups, while the α-face, where —OH groups are positioned, is hydrophilic. A short aliphatic chain protrudes from one end of the steroid nucleus and terminates in a hydrophilic group. Therefore, SDC molecules have one hydrophobic side (β), one hydrophilic side (α) and a short hydrophilic tail. Due to such molecular structure, SDC shows the highest hydrophobic index (HI), i.e. the surface area ratio between hydrophobic and hydrophilic side, amongst bile salts. High HI indicates stronger hydrophobicity, a key requirement in the adsorption of flat molecules onto the hydrophobic graphitic surface whose structure is composed of carbon atoms.

The resultant dispersion is ultrasonicated for 120 minutes in a low power bath sonicator (Decon, 100 W). During ultrasonication, hydrodynamic shear-forces, associated with cavitation, induce exfoliation. Cavitation is the formation, growth, and collapse of small bubbles or voids in liquids, as a result of pressure fluctuation. The resulting flakes are then surrounded by the SDC molecules, preventing re-aggregation.

The obtained dispersion contains both graphene sheets and thicker graphite flakes. SBS in a centrifugal field is thus requires to remove the thicker graphitic material. The dispersion is ultracentrifuged for 30 min at 5 kRPM (about 2100 g) at 15° C. in a swinging bucket rotor MLS-50 (Beckman-Coulter Optima Max-E).

Experimental—Isopycnic Separation

For isopycnic separation, a dispersion is prepared as follows: 30 mg graphite powder are added to 10 mL deionized (DI) water with 2% w/v SDC. The preliminary step of the graphene sorting is the ultrasonication of graphite powder in a water-surfactant solution as described above followed by a short pre-ultracentrifugation, 10 min at 1000 RPM (Sorvall WX ultra100 ultracentrifuge). The supernatant is then extracted and used for the isopycnic separation.

The DGM choice is fundamental. Salts (such as Caesium Chloride, Lithium Chloride, Sodium Chloride, etc.), Sucrose and Optiprep (60% w/v iodixanol solution in water with $\rho=1.32$ gcm$^{-3}$), a non-ionic iso-osmotic derivative of tri-iodobenzoic acid, are usually used in isopycnic separations. Due to low viscosity of the DGM, density gradients produced by salts are less stable with respect to those produced with Sucrose and Optiprep. Moreover, salts induce strong aggregation on the hydrophobic solutes that may affect the separation process itself.

Additionally, the percentage of sucrose used as DGM can have a significant impact on the separation. Sucrose has high viscosity, exponentially increasing at high concentrations and is mainly used in DGU for ZS rather than for isopycnic separation. It is known to use sucrose as DGM, in ZS, to separate GO sheets by size and surface chemistry obtaining almost monodisperse chemically reduced graphene oxide sheets, with relatively small differences in sheet diameter.

On the other hand, Optiprep is better suited for isopycnic separation due to its higher viscosity, with respect to salts, and to density tunability, with respect to sucrose. Moreover, it has an almost constant viscosity as function of the gradient density.

By diluting Optiprep, the density profile can be shaped in different ways: linear, nonlinear, or step. Step gradients, formed by stacking layers of different density, are most effective for the separation of molecules with large density differences. In nonlinear gradients, the DGM density changes nonlinearly along the cell. In principle, nonlinear gradients are the most sensitive, since a variety of depth-density profiles can be produced according to the density variation, enabling trapping of particles of different densities along the cell length. However, often there is no advantage over a linear gradient in the final separation, since the particles take a long time to reach the equilibrium. However, the initial shape of the gradient is virtually never maintained, because diffusion tends to make it less steep.

The density gradient is formed directly in a cuvette (Seton, ultra clear open-top, 14×89 mm, capacity 13.2 ml) by stacking different layers with decreasing concentration of Optiprep from the bottom to the top. We insert 1.5 ml Optiprep with an extra 2% w/v surfactant, as stopping layer, followed by 2.5 ml Optiprep 50% (diluted with graphene dispersion 1:1 v/v, $\rho$ 1.16 g/cm$^3$) with 2% w/v surfactant. On top of this, we place 1.5 ml graphene dispersion (density adjusted to 1.12 g/cm$^3$ by addition of 100% Optiprep with 2% w/v surfactant). The cuvette is then filled with two more layers: 2.5 ml Optiprep 25% (diluted with graphene dispersion 1:4 v/v, $\rho$ about 1.08 g/cm$^3$) and about 4 ml graphene dispersion. This creates a step gradient. A linear gradient is then produced by diffusion. The cuvette is capped and tilted horizontally for 2 hours and then vertically for another 2 hours.

Graphene separation is carried out via ultracentrifugation (Sorvall WX ultra100 centrifuge) in a TH641 swinging bucket rotor at 30 kRPM for 12 hours at 15° C.

The average and maximum accelerations are about 198,000 g and about 275,000 g, respectively. During the process, GSC move along the cuvette, dragged by the centrifugal force, until they reach their isopycnic points.

The successful separation is indicated by the appearance of grey bands along the cuvette.

After isopycnic separation, the sorted flakes are extracted following the fractionation procedure developed in References Arnold et al (2006) and Crochet et al (2007) for the extraction of SWNTs. We use upward displacement fractionation exploiting a syringe pump. Fluorinert FC-40 ($\rho$ of about 1.85 g/cm$^3$; Sigma-Aldrich) is inserted with a needle at the bottom pushing the gradient up into an inverted collection needle. The distance between the top of the dispersion and the upper enriched band is carefully measured using a slide caliper and the corresponding volume calculated. This is then extracted and discarded by injecting the same volume of Fluorinert at the bottom of the cuvette. Once the bands of interest are at the top, about 150 µL of Fluorinert is injected to extract the same volume of dispersion containing the separated graphene flakes.

Characterization

Graphene dispersions are characterized by optical absorption spectroscopy (OAS), TEM, Micro Raman, and Raman optical tweezers spectroscopy. We use OAS in order to evaluate the concentration, c, of graphitic material in dispersion. The same technique has been used by others to estimate the c of Single Wall Carbon nanotubes (SWNTs) and graphene in dispersions by the Beer-Lambert Law, which is discussed above.

Figure 11:
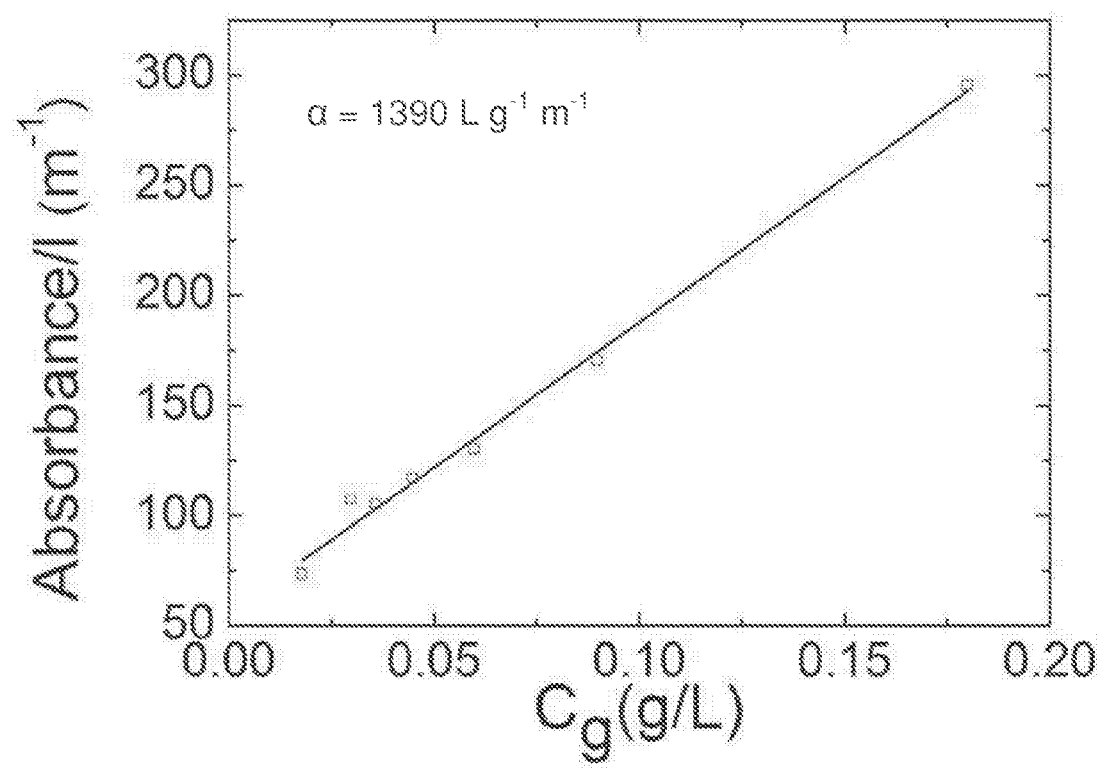
FIG. 11 shows absorbance per unit length (λ=660 nm) as a function of graphite concentration for graphene dispersed in SDC. A straight line fit through these points gives the absorption coefficient α at 660 nm.

To determine the absorption coefficient $\alpha$, a known volume of the dispersion was filtered, via vacuum filtration technique, onto a membrane filter (Membrane Filter Mce Mf-Millipore 25 µm Diameter, 0.1 µm Pore Size) of known mass and then dried overnight at 80° C. The mass of the resulting compact film was then determined using a microbalance (Sartorius SE2-F, 0.1 µg resolution). From thermogravimetric (TGA) analysis of the dried film, we found that about 56% of the film was graphitic; the remainder was attributed to residual surfactant and fibres from the membrane. The presence of residuals is not surprising given a considerably thick film, hindering the complete surfactant removal. The knowledge of graphitic mass in the film allows us to determine the final concentration of the initial stock dispersion. A 0.5 mL of the initial dispersion was then diluted with 0.5 mL pure water, allowing the measurement of the absorbance per unit length (A/l) versus concentration of graphite (after ultracentrifugation, $C_{g:uc}$), as shown in FIG. 11. A linear fit of the absorption values measured at 660 nm for each diluted dispersion gives a of about 1390 Lg$^{-1}$ m$^{-1}$.

A Perkin-Elmer Lambda 950 UV-Vis-NIR spectrometer is used to measure the absorbance of dispersions with 1.3 nm resolution. A reference solution containing only solvent and surfactant is used for background correction. After OAS, the dispersions are diluted 1:10 with SDC-water solution for TEM, Micro Raman and Raman tweezer measurements.

For the former, the dispersions are drop cast onto holey carbon TEM grids (400 mesh) and rinsed with DI water. Images are taken with a JEOL JEM2200MCOFEGTEM/STEM, fitted with two CEOS Cs aberration correctors, operated at 80 kV. The number of graphene layers in a flake can be identified by analyzing the electron diffraction patterns as explained above. All the graphitic objects with AB stacking display $I_{10\bar{1}0}/I_{2\bar{1}\bar{1}0}$ ratio<1, whereas monolayers display $I_{10\bar{1}0}/I_{2\bar{1}\bar{1}0}$ ratio>1. We again use this criterion to identify and distinguish SLG from multilayers. Note that, despite being one of the very few techniques able to reliably prove the existence of SLGs, electron diffraction is time consuming. It requires careful sample tilt series (for both X and Y directions) in order to achieve perfect normal-incidence of the electron beam. Off-axis deviations result on diffraction spot intensities that cannot be interpreted directly. As an alternative, although the thickness cannot be determined with 100% certainty from TEM, the nature of the edges can give an estimation, and can be used to obtain reliable statistical analysis of a larger number of flakes, much quicker than the diffraction analysis outlined above. The number of layers can often be counted from zoomed-in high resolution images of the edges. If a straight edge is observed, it is a slightly folded SLG or a FLG flake. Often true SLG edges, produced from sheared interatomic bonds, can be recognized by their more random trajectories. If a FLG folds on itself, a scroll is observed along that edge. In many cases SLGs, folded SLGs, BLGs and FLGs can be easily distinguished by HRTEM or HRTEM combined with diffraction. If a SLG folds on itself, usually electron diffraction patterns will show a random restacking. Selected area diffraction can then be used as a final proof to distinguish contentious cases.

In the case of micro Raman measurements the diluted dispersion is deposited, at room temperature, on Si/SiO$_2$ substrate (with typical oxide thickness of 300 nm) by drop casting. The deposited samples are then rinsed with DI water in order to remove the excess of surfactant and DGM. Raman spectra are collected with a Renishaw 1000 spectrometer at 514 nm excitation by focusing the laser spot on the boundary region of the evaporated drop, using a 100× objective, and about 1 mW power.

Results and Discussion—Sedimentation Based Separation I

Figure 12:
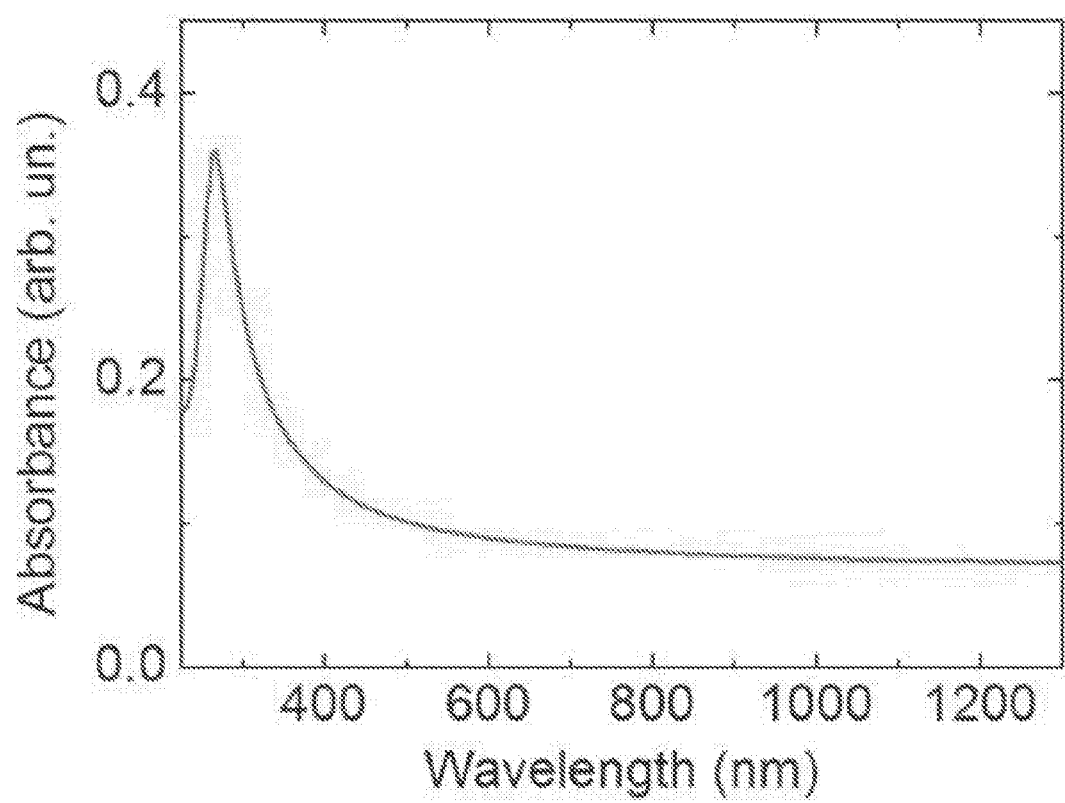
FIG. 12 shows an absorption spectrum for a sedimentation based separation (SBS) graphene dispersion.

FIG. 12 plots the OAS of the dispersion prepared via SBS. The UV absorption peak at 266 nm is attributed to inter-band electronic transitions from the unoccupied π* states at the M point of the Brillouin zone. The asymmetry of the UV peak, with a high-wavelength tail, is attributed to excitonic effects. Using the experimentally derived absorption coefficient of 1390 Lg$^{-1}$ m$^{-1}$ at 660 nm we estimate the concentration of graphitic material to be about 8 mg/l.

Figure 13:
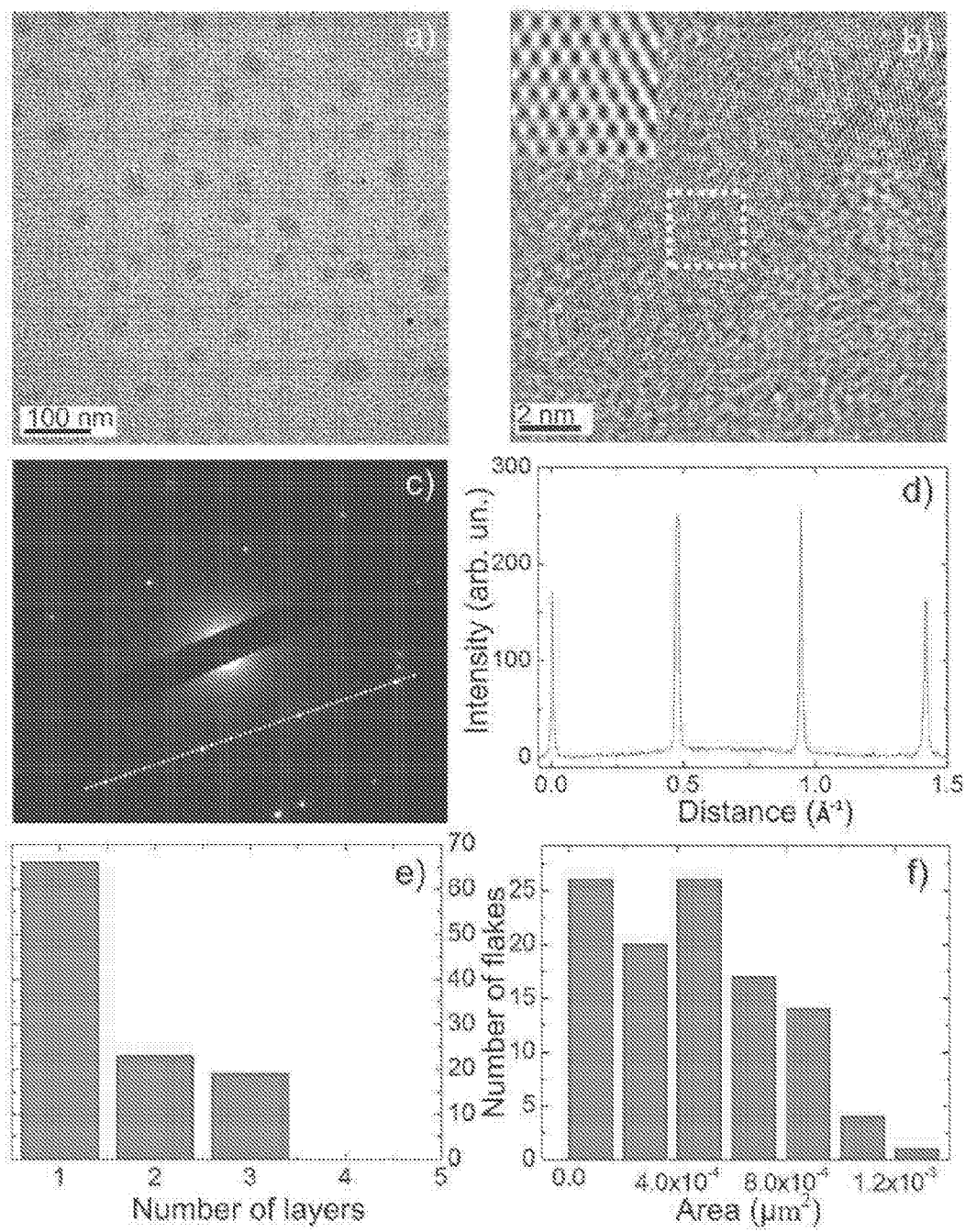
FIG. 13 shows: a) Low resolution phase contrast image showing numerous carbon flakes on the amorphous carbon of the TEM grid. b) Zoomed-in high resolution phase contrast image of a representative flake, showing the typical graphene honeycomb structure. Inset: filtered image of the region in the white dotted square (filtering details: Fourier mask filtering, twin-oval patter, edge smoothed by 25 pixels). c) Electro diffraction pattern from the same sheet shown in b. This pattern shows the typical sixfold symmetry expected for graphite/graphene. The inner peaks, (0-110) and (-1010), are about 1.4 times more intense than the outer ones, (1-210) and (-2110), indicating that the flake is one layer thick. d) Diffracted intensity taken along the 1-210 to -2110 axis for the patterns shown in c. e) Histogram of the number of visual observations of flakes as a function of the number of layers per flake. (f) Histogram of the number of visual observations of flakes as a function of flakes surface area.

The graphene dispersion mostly contains 10-40 nm flakes, as shown by the TEM analysis in FIG. 13. FIG. 13a plots a low resolution phase contrast image with a large quantity of carbon flakes deposited on the TEM grid. FIG. 13b is a zoomed-in, high resolution phase contrast image of one of the flakes (FIG. 13a) showing the typical graphene honeycomb structure. FIG. 13c shows the normal-incidence electron diffraction pattern of the same flake in FIG. 13b. This pattern is characterized by the typical sixfold symmetry expected for graphite/graphene flakes. This allows us to label the peaks with the Miller-Bravais (hkil) indices. The intensity ratio $I_{10\bar{1}0}/I_{2\bar{1}\bar{1}0}$ is >1.

FIG. 13d shows the diffracted intensity measured along the line section through the (1-210), (0-110), (-1010), (-2110) axis, reported in FIG. 13c. The inner peaks, (0-110) and (-1010), are about 1.4 times more intense than the outer ones, (1-210) and (-2110), indicating that the flake is a monolayer. To have a reliable statistics we measured 110 flakes. We get a very large population of FLG flakes with less than four layers. Statistical analysis, see FIG. 13e, shows that about 65% of the flakes are SLGs. This is considerably higher than previous observation for graphene/solvent dispersions.

The flakes' surface area can be estimated taking into account the approximate geometrical shape of the objects (i.e. polygonal, rectangular, circular) and applying conventional geometrical rules for each case. The flake surface area statistical analysis in FIG. 13f indicates that the average flake size is about $6\times10^{-4}$ μm$^2$, with almost all the flakes having circular or ellipsoidal shape.

Figure 14:
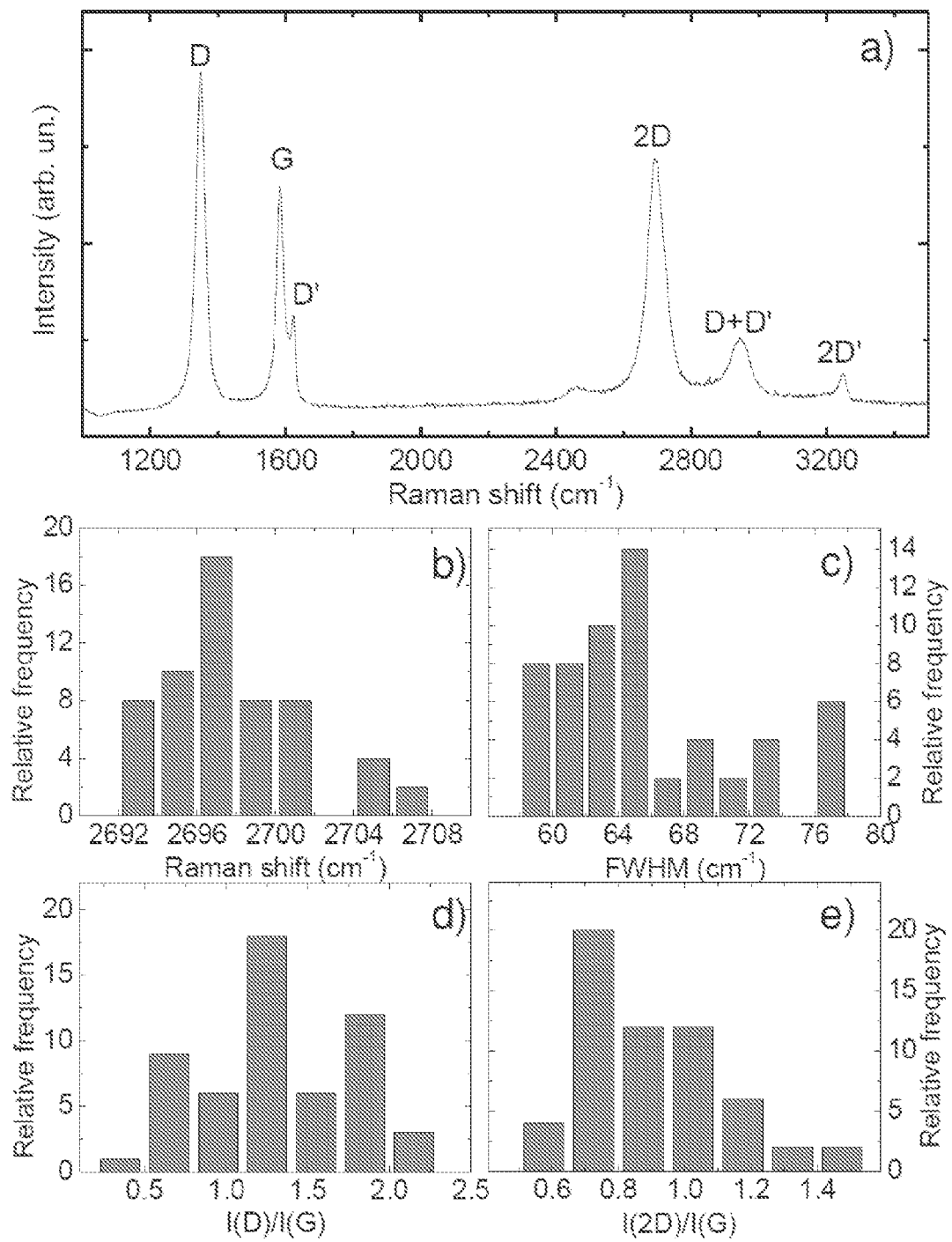
FIG. 14 shows: a) Raman spectrum measured at 514.5 nm excitation wavelength for a representative flake obtained via SBS. b) Histogram of Pos(2D) and c) FWHM(2D). d), e) I(D)/I(G) and I(2D)/I(G) ratio, respectively.

FIG. 14a plots a typical Raman spectrum of the flakes deposited on Si/SiO$_2$ at 514.5 nm excitation.

Statistical analysis of the micro-Raman spectra shows that the 2D peak has, on average, pos(2D) of 2697 cm$^{-1}$ (see FIG. 14b) and FWHM(2D) of 64 cm$^{-1}$ (see FIG. 14c). Although the pos(2D) is upshifted and FWHM(2D) larger with respect to that of graphene flakes produced by micromechanical cleavage, the 2D peak still shows a lorentzian lineshape. This implies that the flakes are mostly monolayers or that they are electronically almost decoupled in the case of FLG and behave, to a first approximation, like a collection of single layers. I(D)/I(G) is on average 1.3 (see FIG. 14d). The very large intensity of the D peak is not due to the presence of a large amount of structural defects, otherwise it would be much broader, and G, D' would merge in a single band. We rather assign it to edges of our sub-micrometer flakes. FIG. 14d shows that I(2D)/I(G) ranges from 0.5 to 1.5, with average values of about 0.9. The G and 2D peaks have different doping dependence and the 2D/G height ratio changes significantly with doping level. The dependence of the 2D mode is much stronger than that of the G mode, and (I(2D)/I(G)) is maximum for zero doping, and decreases for increasing doping level. Thus, due to possible chemical doping induced by surfactant residual atop graphene flakes, it is the shape of the 2D peak that is the most effective way to identify a SLG.

Figure 15:
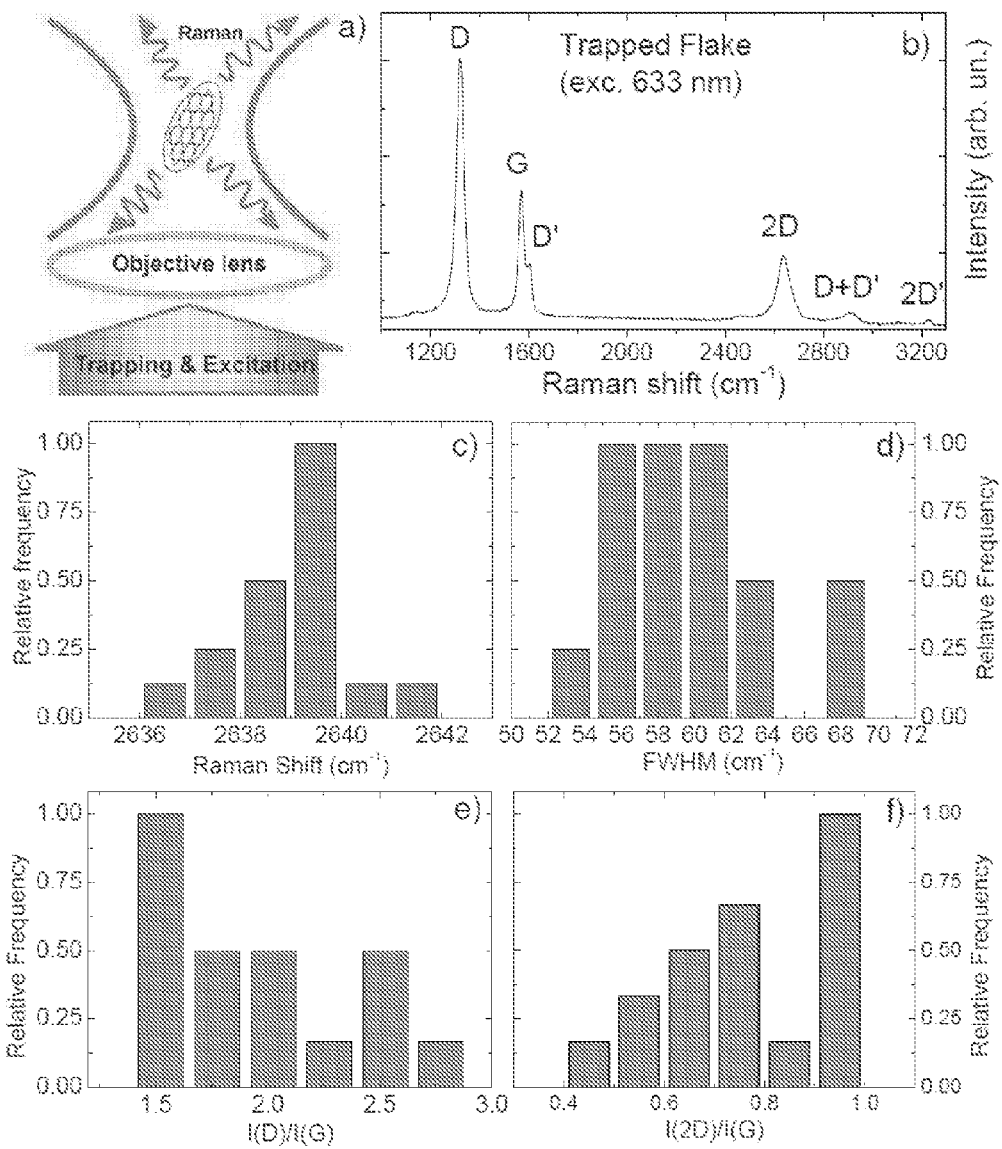
FIG. 15 shows: a) Experimental setup of Raman optical tweezer. A laser beam is expanded to overfill the back aperture of a high numerical aperture objective lens. The same laser beam is used to trap and excite the trapped flakes. b) Raman spectrum of an optically trapped flake for 633 nm trapping and excitation wavelength. c) Histogram of Pos (2D) and d) FWHM(2D). e), f) I(D)/I(G) and I(2D)/I(G) ratio, respectively.

Similar results are obtained when trapping individual flakes in solution with the ROT apparatus. FIG. 15b shows a Raman spectrum of a flake trapped in the ROT at 633 nm. As shown from the statistical analysis of the spectra obtained from individual trapped flakes, the 2D peak has an average position at 2639 cm$^{-1}$ (see FIG. 15c) down-shifted with respect to 514.5 nm excitation because we trap and excite with 633 nm light. The 2D peak average FWHM (see FIG. 15d) is 59 cm$^{-1}$, consistently lower than what is measured with micro-Raman spectroscopy. Indeed the ROT is intrinsically probing individual flakes, while in micro Raman analysis of drop cast samples it is likely to collect the Raman signal from several different flakes in the laser spot. Finally FIGS. 15e and f show the intensity ratio between the D and G peaks and the 2D and G peaks. The I(D)/I(G) ratio has an average value of 2 and ranges from 1.5 to 2.7. These values are, on average, slightly higher with respect to that obtained with microRaman. However, we have to consider the dispersive nature of pos(D) and I(D)/I(G) ratio with photon energy. Statistical analysis shown in FIG. 15f shows that the I(2D)/I(G) ratio average value is 0.8 and it ranges from 0.4 to 1.

Results and Discussion—Exfoliation Mechanism

To predict the aspect ratio of graphene flakes obtained by sonication, we use a similar approached developed by Ahir et al (2008) in order to investigate the mechanical scission of nanotubes. The graphite flakes are considered as a multilayered cylinder composed of N number of stacked, circular graphene layers, with radius r. The height of the cylinder is thus h=Nt (t being the interlayer distance). During sonication, the bubble implosion imposes an inward radial fluid flow, which induces viscous forces on the flakes. Such forces must be sufficiently high for exfoliation, but sufficiently low to avoid in-plane fracture, in order to produce large graphene flakes. The viscous stress $\sigma_\eta$ created by the fluid is proportional to the square of flake thickness and to the number of layers. Thus, in the case of bilayer, $\sigma_\eta$ is almost half the value found for a trilayer and the exfoliation becomes therefore more difficult. The condition to obtain a SLG of a given size r corresponds to the viscous stress required to exfoliate a BLG. However, this condition should balance the condition that takes into account the intrinsic fracture of the graphene layer in order to avoid the in plane fracture.

To estimate the exfoliation strength $\sigma_e$, i.e. the stress (in GPa) required to exfoliate the graphene flake, we exploit the Hamaker model (Hamaker (1937)). This model estimated the van der Waals force between two parallel surfaces by using the Hamaker constant H, a parameter resulting from the theory of the pair-wise summation of the London dispersion energies between atoms. In general, the van der Waals interactions include the force between two permanent dipoles (Keesom force), the force between a permanent dipole and a corresponding induced dipole (Debye force), and the force between two instantaneously induced dipoles (London dispersion force). Carbon atoms are non-polar materials and therefore London dispersion force and van der Waals force are equivalent. The force between two parallel graphene layers, averaged over different relative orientations, is estimated as Eq. B1:

$$F_{vdW} = \frac{H \cdot A}{6\pi \cdot t^3} \qquad \text{B1}$$

where H is a parameter resulting from the theory of the pair-wise summation of the London dispersion energies between atoms, and A is the surface area of the graphene layers. From the force between two parallel surfaces we get:

$$\sigma_e = \frac{F_{vdW}}{A} = \frac{H}{6\pi \cdot t^3} \qquad \text{B2}$$

Using Eq. B2, the average statistical distribution of graphite flakes composed of different layers can be estimated.

The graphite exfoliation via sonication produces on average flakes with lateral sizes that increase with the number of layers. Thus the exploitation of SBS permits to obtain a separation based on the number of layers other than on their mass. However, the separation process will be more effective for SLG with a decrease in efficiency for flakes with a higher number of graphene layers.

Results and Discussion—Isopycnic Separation

Even SLG or FLG having higher mass tend to deposit on the bottom of the ultracentrifuge cuvette as pellet in the SBS. In order not to lose such flakes and maintain a high SLG percentage, a sorting mechanism which selects also the larger flakes is necessary. Thus, we demonstrate that isopycnic separation can overcome the drawback of SBS, because it separates flakes by density instead of mass, as explained above.

Figure 16:
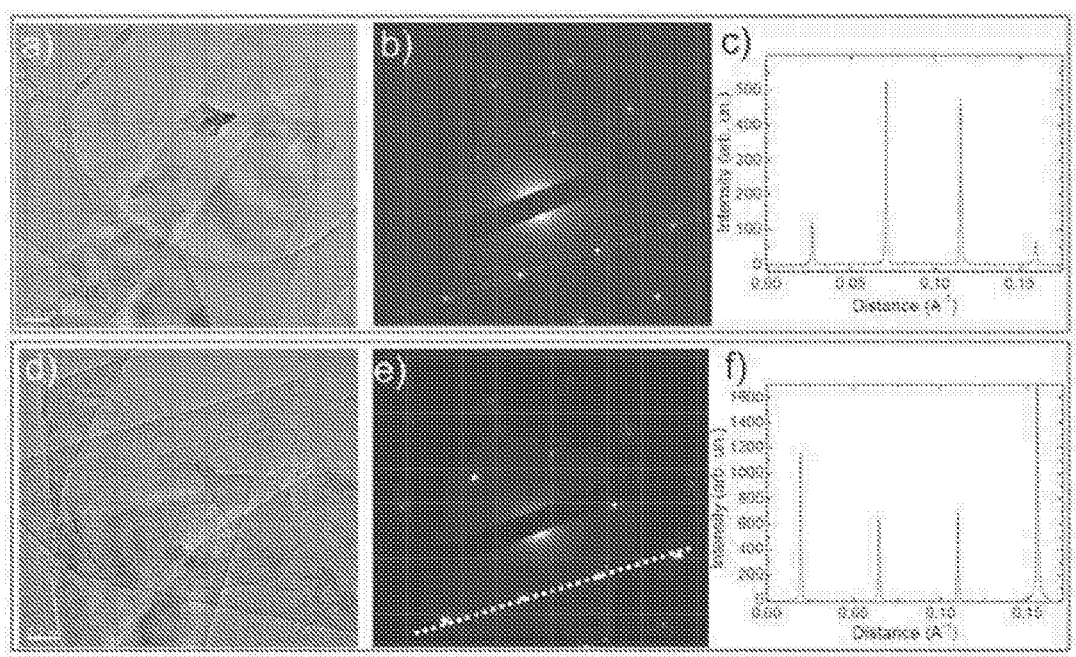
FIG. 16 shows (top) Flakes in fraction f1, (bottom) flakes in fraction f23. a) Phase contrast image of a representative flake. The flake is a monolayer partially folded, presumably, after the deposition on the TEM grid. We found that the majority of the flakes were folded over the TEM grid. b) Electron diffraction patterns taken from the area indicated by arrow shown in b. These measurements show that the flake is a SLG. c) Diffracted intensity taken along the 1-210 to -2110 axis for the pattern shown in (b). d) Phase contrast image of a flake extracted from fraction f23. e) Electron diffraction patterns taken from the area indicated by the arrow in (d). This pattern shows that the flake is a multilayer. f) Diffracted intensity taken along the 1-210 to -2110 axis for the pattern shown in (e). The outer peaks, (1-210) and (-2110), are more intense than the inner ones, (0-110) and (-1010), indicating that the flake is multilayer.

TEM analysis provides evidence of effective sorting of graphite flakes by number of layers. HRTEM microscopy reveals graphene sheets with dimensions of several hundred nanometers. FIG. 16a is a HRTEM micrograph of a folded SLG evaluated by edge analysis. A more definitive identification of graphene can be made by analysing the electron diffraction patterns. FIG. 16b shows the normal-incidence electron diffraction pattern measured in the area indicated by the arrow, confirming the flake is a folded SLG.

FIG. 16c displays the diffracted intensity along the line section through the (1-210), (0-110), (-1010), (-2110). The inner peaks, (0-110) and (-1010), are about 5 times more intense than the outer ones, (1-210) and (-2110), indicating that the flake is SLG. On the other hand, flakes extracted at higher buoyant density (fraction 12) are composed of a higher number of layers with respect to those extracted in fraction 1. FIG. 16d shows a high resolution phase contrast image of a multilayer flake. The fact that the flake is multilayer is also demonstrated by the diffraction pattern (FIG. 16e) measured in the area indicated by the arrow in FIG. 16d. In this case, the outer peaks, (1-210) and (-2110), are more intense than the inner ones, (0-110) and (-1010), indicating that the flake is multilayer (see FIG. 16f). At even higher buoyant densities, we find flakes with a higher number of layers with respect to fractions 1 and 12.

Figure 17:
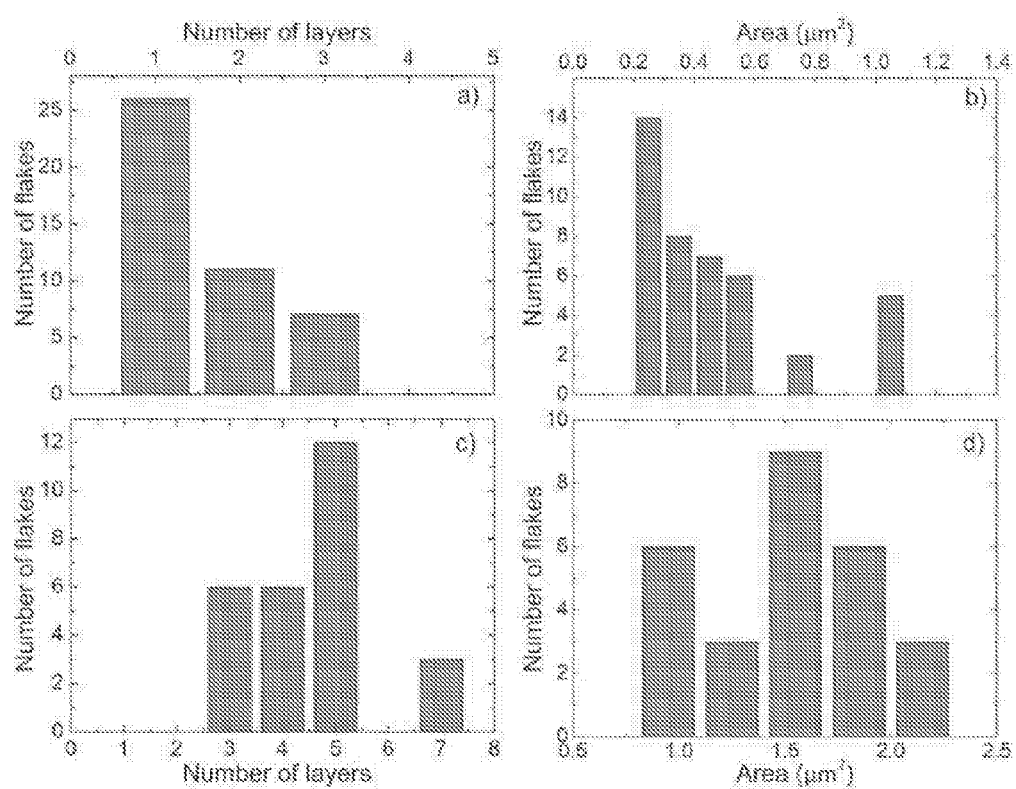
FIG. 17 shows: a) TEM statistics for fraction f1 showing about 60% SLG. b) The average size of flakes in fraction f1 ranges from 0.2 $\mu m^2$ to about 1.1 $\mu m^2$. c) TEM statistics for fraction f12 showing that about 90% of flakes are composed from 3 to 5 layers. d) The average size of flakes in fraction f12 is about 1.5 $\mu m^2$.

FIG. 17 presents the statistics calculated from TEM analysis (number of layers and area of the sorted graphene flakes) on 50 flakes per each fraction. Following DGU, about 60% of the flakes in fraction f1 are SLG (see FIG. 17a). The statistical analysis of the flake surface area reported in FIG. 17b shows that the average size in fraction 1 ranges from 0.2 µm² to about 1.1 µm². These graphene flakes show a surface area at least two orders of magnitude larger with respect to those reported by Reference Green and Hersam (2009). Flakes in fraction 12 are composed of a higher number of layers in comparison with that in fraction 1, with neither SLGs nor BLGs. FIG. 17c shows a distribution of flakes from 3 to 5 layers. In particular the average surface area is about 2 times larger than that of fraction 1. In fraction 12 the flakes have an average area of 1.5 µm², with some (12%) flakes larger than 2 µm².

Figure 18:
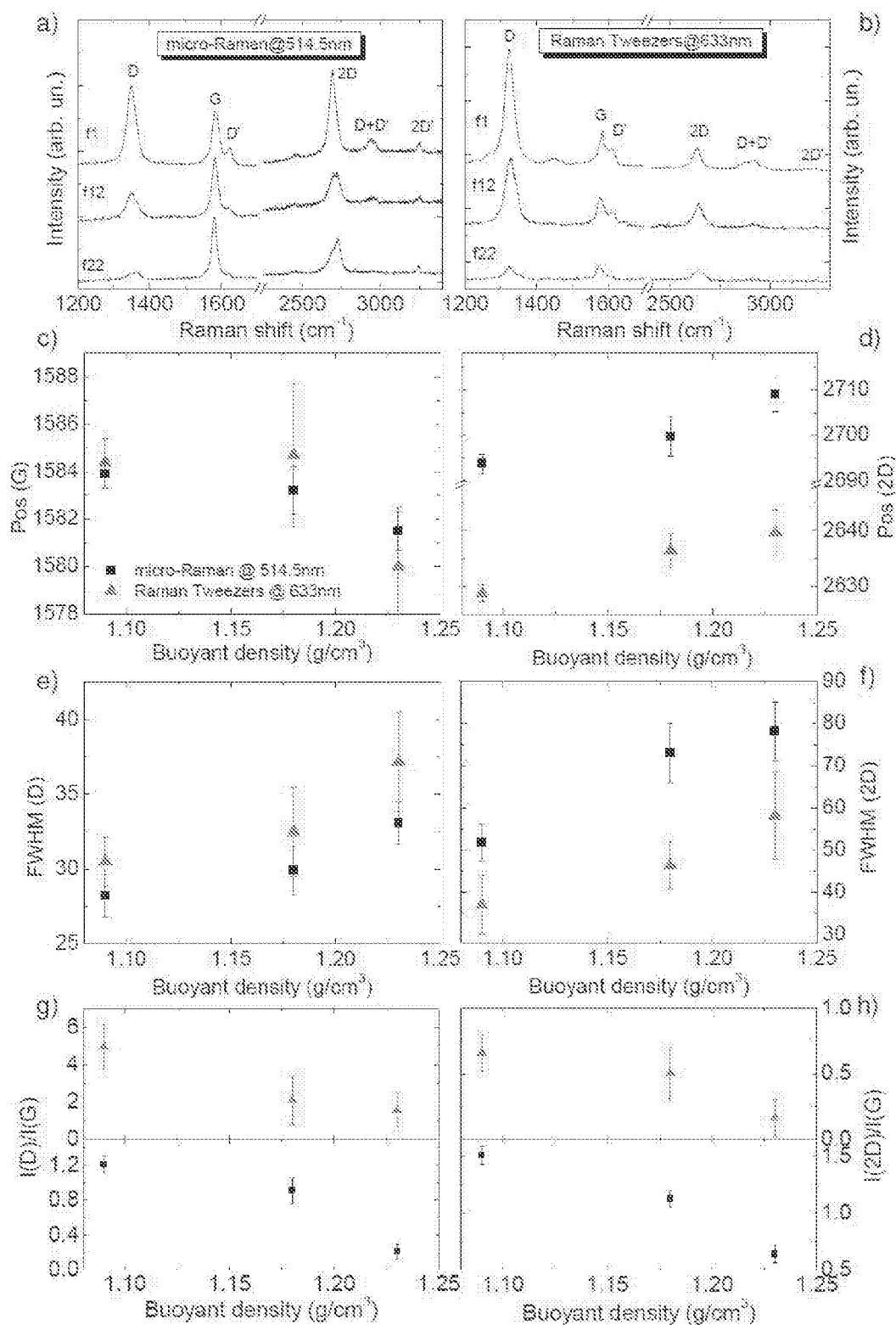
FIG. 18 shows: (a) Representative Raman spectra of sorted graphite flakes from fractions f1, f12, and f22 deposited on $SiO_2$ and b) from optically trapped flakes. c) Pos(G), d) Pos(2D), e) FWHM(D), and f) FWHM(2D) as function of buoyant density of the extracted fractions. Ratio of height of the D (g) and 2D (h) peaks with respect to G peak measured as function of buoyant density of the extracted fractions. In all plots the squares represent data obtained with micro-Raman spectroscopy on samples deposited on a substrate, while triangles represent data obtained from individual flakes optically trapped is the ROT setup. Error bars are the standard deviation over about 30 measurements.

FIGS. 18a and b report the Raman spectra of flakes extracted in fractions 1, 12 and 22 obtained from micro-Raman analysis. These spectra show systematic changes both in shape and intensity of the D, G, D' and 2D peaks. In order to quantify these variations, in FIGS. 18c-h we present statistics from about 30 different micro-Raman measurements per fraction and extract the mean and standard deviation information of these data. FIGS. 18c,d present Pos(G) and Pos(2D) as function of buoyant density of the extracted fractions. We note a softening of Pos(G) and a stiffening of Pos(2D) going from fraction 1 to fraction 22. FIGS. 18e and f show that both FWHM(D) and FWHM(2D) increase for the dispersions extracted at higher buoyant density. FWHM (D) only increases from 28 cm$^{-1}$ for fraction 1 to 33 cm$^{-1}$ for fraction 22 (17%), as measured with micro-Raman spectroscopy. In contrast, FWHM(2D) has a much higher increment (60%) for the same fractions. Indeed, fraction 1 has, in average, a FWHM(2D) of 50 cm$^{-1}$, while, on the other hand, FWHM(2D) of fraction 22 is almost 80 cm$^{-1}$ when measured with micro-Raman analysis. The intensity ratios I(D)/I(G) and I(2D)/I(G), shown in FIGS. 18g,h decrease monotonically with buoyant density. G and 2D peaks have different doping dependence, however, in this case all the fractions are extracted from the same dispersion having the same surfactant and DGM, which means that the starting material has been subjected to the same possible unintentional doping process. Thus, the variation of I(2D)/I(G) with fractions extracted at different buoyant density should not depend on doping, and is another indication of the effectiveness of graphite flakes separation by number of layers, in agreement with the TEM data shown in FIGS. 16 and 17.

Results and Discussion—Isopycnic Separation—Separation Mechanism

The buoyant density ρ of the GSC can be modelled by the following relation:

$$\rho(N, R_g) = \frac{n_g M_g N + 2 c_s n_s M_s (1+\lambda)}{n_g V_g N + 2 c_s n_s V_s (1+\lambda)} \quad \text{B3}$$

where $\lambda(N;R_g)=tN/r$, $M_g=12u$ (atomic unit mass of carbon), $n_g V_g=t=0:356$ nm, $n_g=38:2$ nm$^{-2}$ is the number of carbon atoms per unit area, $\rho_g=M_g n_g=7:612\times10^{-8}$ g/nm$^2$ is the density per unit area of graphene, $M_s=414:55u$ is the molecular unit mass of SDC, $n_s=0:52$ nm$^{-2}$ is the number of surfactant molecules per unit area, and $c_s$ is the aggregation number of the surfactant molecules.

The aggregation properties of the surfactant molecules atop the flake surface depend on the surfactant type and concentration.

Isopycnic separation permits to separate selectively flakes of a given surface to volume ratio. Thus, flakes with $S_g=V_g$ (N; r)=const are expected to have the same buoyant density. We use Eq. B3 to calculate the variation of buoyant density of GSCs composed of a different number of layers for different surfactants or different $c_s$.

Figure 19:
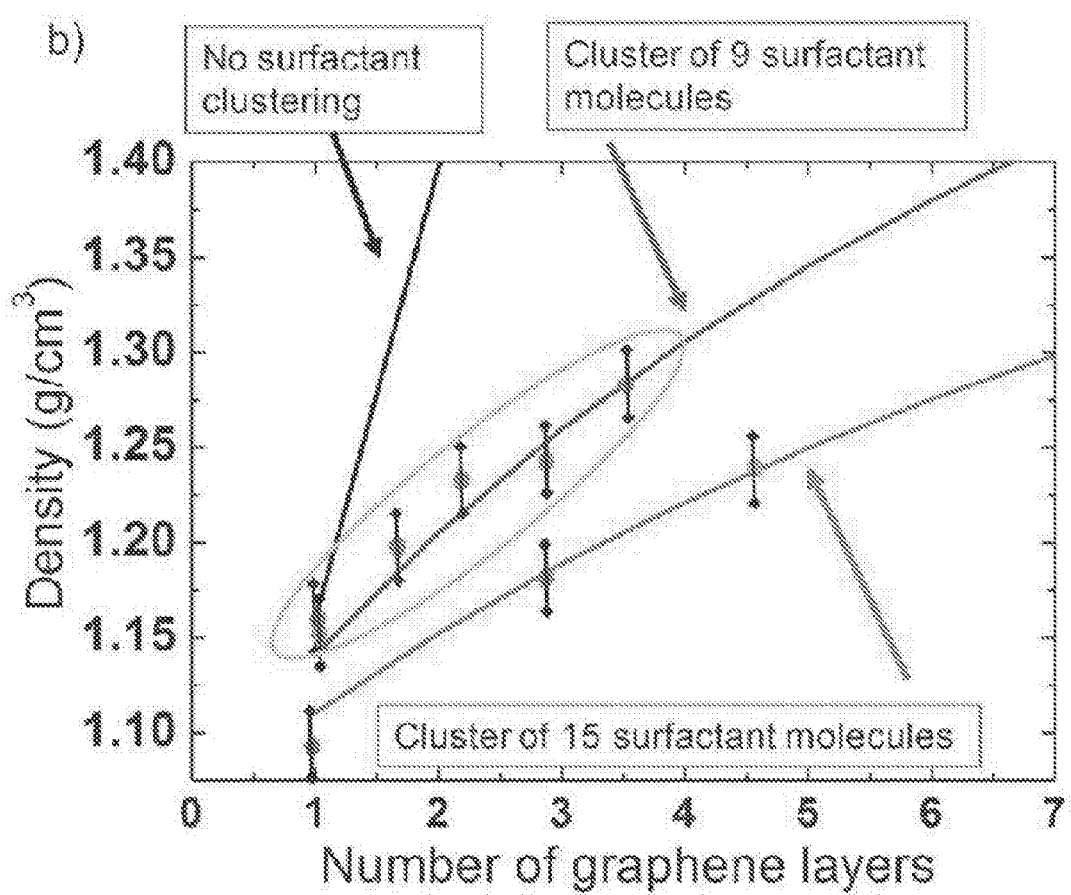
FIG. 19 shows a fit of the geometrical density model to the experimental data with an average number of 9 (SC, middle curve) and 16 surfactant molecules (SDC, lower curve). The upper curve reports the expected trend for no cluster formation. The experimental data for SC are taken from Reference Green and Hersam (2009).

FIG. 19 shows that using $c_s=15$ we reproduce the data obtained from the dispersion in 2% w/v SDC. We also plot the data from Reference Green and Hersam (2009) where isopycnic separation in a linear density gradient was performed with 2% w/v SC as surfactant.

Our model fits well the data of Reference Green and Hersam (2009) using the value determined by Reference Sasaki et al (1995) of $V_s=0:64$ nm$^3$ and ns=0:38 nm$^{-2}$ for the adsorption of SC molecules on graphite. FIG. 19 proves that the aggregation of surfactant molecules adsorbed atop the graphite flakes determines their buoyant density.

FIG. 19 implies that, when SDC forms clusters of about 15 molecules, the density medium can support GSC with up to 7 layers of graphene, while SC, as in Reference Green and Hersam (2009), does not support graphene surfactant assembly with more than 4 layers. Considering SDC dispersions with $c_s=1$, the corresponding plot (upper curve) in FIG. 19 would imply that only SLG can be supported by the density gradient (1.32 g/cm$^{-3}$), while multilayer GSC are too dense pelleting to the bottom of the ultracentrifuge cuvette.

The graphene-SDC complex has a lower buoyant density and a higher ability to separate graphite flakes that differ by number of layers with respect to SC. This relies in the different aggregation properties of the two bile salts. Indeed, SDC and SC differ only in the number of —OH groups, which was demonstrated by others to be a key parameter for the efficient sorting of SWNTs, due to a different aggregation property of the two surfactant molecules.

Contrary to nanotubes, where many chiralities show a small difference in buoyant density, in the case of GSCs, the buoyant density differences between SLG, BLG and TLG is larger. Thus, while in nanotubes the formation of bigger surfactant clusters around the sidewalls is a drawback for the effectiveness of the separation, in the case of graphitic flakes this is an advantage. Indeed, large surfactant aggregate tend to reduce the buoyant density of the GSC, thus permitting the separation of flakes with a higher number of layers with respect to the same process carried out with SC.

This difference relies on the micellization behaviour of the two bile salts. SC forms much smaller micelles (hydrodynamic radii, $R_h=1:0-1:5$ nm) compared to SDC (Rh=1:5-6:0 nm). Moreover, dihydroxy (SDC) and trihydroxy (SC) bile salts form micelles of different shapes. While dihydroxy bile salts have elongated structures, the trihydroxy ones form highly hydrated globular micelles. This has been attributed to the total number of —OH groups and to their position on the steroid backbone, which changes the hydrocarbon-water contact area. Bile salt micelles form in two stages: the primary micelle appears first. Subsequently the interaction between the hydrophilic surfaces of the salt molecules forms bigger aggregates, called secondary micelles. The lack of the —OH group in position α7 of the SDC backbone increases the hydrophobic area, initiating the formation of secondary micelles.

On the contrary, the presence of the third —OH group in SC reduces the formation of secondary micelles. In SC, the —OH group in position α7 on the hydrophilic part reduces the hydrocarbon-water contact area by 30-40%, compared to dihydroxy species. Because the driving force for secondary micelle formation is the hydrophobic interaction between water molecules and the surface of the monomer or dimer, the —OH group in position α7 on the hydrophilic part of SC reduces the hydrocarbon-water contact area in comparison with SDC. Thus, SDC forms bigger micelles with respect to SC. This results in an overall reduction of the buoyant density of the GSC after isopycnic separation, permitting the separation of flakes with a higher number of graphene layers, compared to other surfactants.

In conclusion of this section, we demonstrated a scalable and efficient process to prepare graphene dispersions produced by low power sonication of graphite in aqueous solution. A fracture mechanics model was developed to demonstrate that the maximum aspect ratio of a graphene flake (radius over thickness) obtained by sonication is related to the balancing between the condition for exfoliation and that for fracture of the graphene flake. We achieved high percentage of SLGs after separation in preparative ultracentrifugation. We found that about 65% of the graphene sheets separated via SBS were SLG, with the remaining about 35% constituted of BLG and TLG. The average size of flakes is about $6\times10^{-4}$ μm$^2$. We have also shown that isopycnic separation, in addition to separate graphene by number of layers, produces flakes of micrometer size that are orders of magnitude larger with respect to the ones produced by SBS. Tuning the type and concentration of surfactant used for the separation, it is possible to improve the control on the number of layers of the sorted graphene flakes. As for nanotubes, the surfactant clustering is thus a key factor for graphene separation.

Smart Window Manufactured Using a Graphene-Based Hybrid Conductor

In the following, we demonstrate a polymer dispersed liquid crystal (PDLC) flexible smart window using transparent conductors realized by wire wound rod coating of graphene and carbon nanotubes on polyethylene terephthalate (PET). In the ON state, the PDLC device exhibits about 60% transmittance across about a 120 cm$^2$ area. In the OFF state, the device transmits <0.25%, with a >230 contrast ratio. Our simple, up-scalable transparent conductive film coating strategy is highly promising for direct integration into roll-to-roll processing, paving the way for integration into flexible electronics, and in particular, flexible smart windows and re-configurable display boards.

The term 'smart window' (SW) broadly defines devices resembling windows with one or multiple functionalities that are not seen in typical glass pane or plexiglass windows. In addition to being a standard window, these functionalities can, for example, offer controllable change in wavelength dependent/independent light transmission/reflection, direct/indirect energy saving feature (e.g. blocking sunlight upon heating and hence, lowering air-conditioning related energy consumption in residences or offices) and can even have energy generation capability (e.g. integrated photovoltaic module). However, in general, SW represent a narrower category of 'switchable light modulators'. Depending on the types, SWs can change the light intensity or the spectral composition passing through the device while preserving its transparency, or can completely switch from transparent to milky white translucent i.e. 'frosted' state. These SWs can further be classified as non-electrically and electrically switchable devices, the former including thermochromic (activate i.e. change light transmittance upon heating), photochromic (activate upon UV illumination) and gasochromic (activate upon gas exposure, e.g. highly diluted hydrogen on $WO_3$) windows. In particular, thermochromic SWs are attractive due to their inherent energy saving capability. A new prototype SW, dubbed as 'sun valve' was also recently proposed due to its energy saving feature. A sun valve switches between a retroreflective mode (i.e. reflecting light back to the source with minimum scattering, the reflected wavefront being in parallel but opposite direction to the incident wavefront) and a transparent mode, by filling a transparent liquid between two parallel retroreflectors separated by an air gap. However, wide adoption of such devices is hindered by their control mechanism. From this perspective, electrically switchable SWs (ESSWs) are straightforward to use. Currently available ESSW technologies include electrochromic (EC) suspended particle (SPD), polymer dispersed liquid crystal (PDLC) devices and microblinds. In EC devices using transition metal oxides like $WO_3$, (which are large band gap semiconductors and hence, visibly transparent) injection of electrons or protons induces strong absorption band in the visible spectrum, resulting in a color change. The main drawback of EC devices is their relatively slow response (can be up to several minutes). SPDs currently use rod-shaped particles suspended in an organic liquid or gel, bound between a pair of transparent conducting electrodes (TCEs). The particles change their orientation under applied electric field, allowing control of light transmittance. SPDs, in theory, allow gradual control of transmittance, an attractive feature for ESSWs. Microblinds rely on large-scale soft lithography or patterning for the fabrication of a large array of anchored, rolled microscopic metal foils. These foils unroll and block light when electric field is applied using an underlying TCE. Such large scale fabrication of mechanically fragile blinds makes this technology less attractive. PDLCs employ liquid crystal (LC) droplets embedded in a polymer, sandwiched between two TCEs. Applied electric field in the electrodes controls the overall alignment direction of LC molecules, allowing light modulation through the device. Though PDLCs are not usually used for gradual control of light transmission through them, it is strongly preferable for many applications due to its relatively fast switching speed (typically in tens of ms). Regardless of the operating mechanism, all the ESSWs feature transparent conductive electrodes to apply electric field (or inject current) across an active layer while keeping the device optically transparent. The TCE requirements for typical ESSWs are high transmittance (>80%) and moderate to low sheet resistance $R_s$, typically in the range of about 1 k$\Omega$/square or smaller.

The ESSWs discussed above, albeit differing in underlying technologies but offering similar performances on light modulation, have gradually started to find a variety of applications that do not require fast (<10 ms) switching speed. For example, EC windows are being used in luxury cars and very recently, in commercial airliners. SPD and PDLC devices are used for privacy purposes in residential and business settings, showcasing displays and architectural windows as well as in automotive industries. In most of the commercial and prototype ESSWs as well as their derivatives (e.g. PDLC based displays, tunable focus microlens arrays) on glass and polymeric substrates, Indium Tin Oxide (ITO) and to some extent, Fluorine-doped Tin Oxide (FTO) and aluminum-doped zinc oxide (AZO) are used as TCEs. However, for large area applications, fabrication and cost of ESSWs remain a significant constraint for their widespread commercialization partly due to the fabrication and cost issues associated with the large area TCEs required. In addition, ITO (as well as other metal oxide and nitride TCEs) suffer from mechanical failures under tensile or compressive strains, restricting potential applications for ESSWs and other related devices when flexibility is envisaged.

The use of indium is not preferred due to its increasing scarcity and the processing limitations of ITO. This has impeded the development of fully flexible (bendable in three dimensions simultaneously, i.e. conformable) device applications. Therefore there is a need for alternative TCEs that are more suitable for fully flexible devices.

As suitable alternatives, it is possible to consider a range of metal oxides and nanostructured materials such as metal nanowires (NWs), carbon nanotubes, reduced graphene oxide, graphene or even metal mesh-graphene hybrid. However, other metal oxides and nitrides only address the problem of indium scarcity and are not usually suitable for flexible devices. Metal NWs, e.g. silver NWs, have been demonstrated as TCEs on polymeric substrates using different solution processable methods such as vacuum filtration, rod coating, transfer printing and spray deposition. However, they suffer from stability and adhesion issues. Both doped graphene and carbon CNTs offer transmittance and sheet resistance combination comparable to ITO on flexible substrates. CNTs, graphene and graphene oxide are thus being intensively investigated as flexible TCEs using a variety of deposition techniques. Both functionalized CNTs and graphene have featureless absorption spectra and hence, neutral color, compared to the faint yellow color of ITO, and the often seen bluish tint in many conducting polymers. Compared to CVD growth of graphene and subsequent transfer on flexible substrates, solution processable deposition is significantly more economic and can be readily integrated into roll to roll (R2R) processing for flexible and printable electronics. This is particularly true for nanomaterial coating or printing since solution processability of nanomaterials is one of the most flexible, versatile and economic industrial processes available at present. Solution processed graphene TCEs, however, suffer from poor percolation which strongly depends on the flake size and deposited film thickness. The performance of SWNT networks as TCEs, on the other hand, is limited by intertube junction resistance between semiconducting and metallic types which can be reduced by interspersed graphene flakes on a SWNT network. A solution processable hybrid SWNT-graphene conducting film is therefore, an attractive option for R2R manufacturability of electronic devices requiring flexible TCEs, including ESSWs.

Here, we demonstrate a PDLC-ESSW with SWNT-graphene based TCEs on polyethylene terephthalate (PET) substrate; NGC-PET. We use aqueous dispersions of functionalized SWNTs and graphene coating (NGC) on PET to fabricate the NGC-PETs using a wire-wound rod-coating strategy. The NGC-PET has Rs of about 1 kΩ/square and transmittance (T), $T_{NGC-PET}$ of about 81% at 550 nm. The uncoated PET has $T_{PET}$ of about 86%, indicating $T_{NGC}$>94%. The NGC-PETs show remarkable optical uniformity, with <2% standard deviation in $T_{NGC-PET}$. The NGC-PETs exhibit about 15% change in resistance when undergoing from flat state to a bending radius of about 3.5 mm in 10 cycles as opposed to about 25000% increase in a 60 Ω/square ITO layer on 125 μm PET (Sheldahl, Accentia 430300 ITO Coated Films). A 120 cm² SW is then fabricated by laminating a PDLC layer consisting YM55 nematic LC and Norland ultraviolet-curable Optical Adhesive 65 (NOA65) between two NGC-PETs. In addition to flexibility (about 3.5 cm bending radius) during operation, the PDLC device exhibits excellent transmittance (about 60%) and high (>230) contrast ratio.

Smart Window—Results and Discussion

ESSW-PDLC smart windows were disclosed in U.S. Pat. No. 4,435,047. They consist of quasi-spherical liquid crystal (LC) droplets dispersed or phase-separated in polymers. In the absence of an external electric field, the LC director distribution (the average direction of the long molecular axis for uniaxial LC molecules) inside PDLC droplets causes a refractive index mismatch between LC and polymer matrix, resulting in strong forward scattering with a milky white or 'frosted' appearance and very low optical transmittance. Application of electric field across the PDLC film using TCEs aligns the LC director distribution parallel to the field, making it transparent.

R2R fabrication processes for flexible substrates are widely used continuous industrial processes. A typical R2R process may include evaporation, plasma etching, screen and inkjet printing, laser writing etc. R2R has significant advantage over conventional batch process in terms of through-put, high level of automation and higher yields. Indeed, R2R processing is widely used in printing electronic devices and solar cells as well as for deposition on PET. In many R2R processes, for example, in inkjet printing, solution processability is required. This particularly applies to polymer solutions or nanomaterials that cannot always be evaporated at low temperatures. When coating of liquids with dispersed particles or polymers on large flexible substrates a wide variety of coating methods may be used, particularly where patterning is not required. For example, suitable coating methods include the use of a solid wire-wound rod (also known as 'Mayer bar' or applicator rod), a flat blade (also known as 'doctor blade') and a slot coater (consisting of an ink reservoir and coating blade). The specific setup in each case may vary in terms of the substrate, the coating liquid (for example, how the coating liquid is transferred on the substrate and how the excess coating is removed), the coating speed and the processing temperature. Among the patternless coating options, Mayer bar offers one of the most economic and simplest coating options for low viscosity fluids (between about 1-50 cP). Mayer bar is thus ideal for the SWNT and graphene aqueous dispersions we use here.

The aqueous dispersions of SWNTs and graphene are prepared by sonication. 0.08 wt % of functionalized SWNTs (P3, Carbon Solutions, Inc., 500 nm-1.5 μm in length, 3-6% carboxylic acid groups in the sidewalls and endcaps, 5-8% catalyst metal content) are ultrasonically dispersed by a tip sonicator (Branson 450A, with 40 W power at 20 kHz, in ice bath) for 2 hr in 10 ml of deionized (DI) water with 0.5 wt % of Triton X-100, a nonionic linear chain surfactant. After the sonication, the SWNT dispersion is centrifuged at 40 krpm (about 270,000 g) for 20 minutes, and the top 70% is decanted. The P3 SWNTs are used here as their carboxylic acid group functionalization helps them prevent re-aggregation when isopropyl alcohol (IPA) is added to their surfactant assisted aqueous dispersions. This reduces the surface tension of the aqueous SWNT dispersions further, and helps attaining a uniform deposition of the sparse nanotube networks on the PET substrate.

Surfactant assisted aqueous dispersions of graphene, enriched with mono- and bi-layers is prepared with sonication as discussed above.

The absorption spectra were measured in the visible range for the SWNT and graphene aqueous dispersions, both diluted by 15 times. The spectrum for graphene is as discussed above. The absorption spectrum for the SWNTs, unlike unfunctionalized SWNT dispersions in aqueous and non-aqueous medium, shows only weak absorption features from the van Hove singularities due to covalent functionalization and consequent disruption of the π network. The Beer-Lambert law A=α lc may be used to deduce the concentration of both SWNTs and graphene in dispersions where A is the optical absorption of the material at wavelength λ, α is the absorption coefficient at λ, l is the optical path length through the dispersion during the absorption measurement and c is the concentration of the material in the dispersion. Using an absorption coefficient $\alpha_{660}$ of about 1390 Lg$^{-1}$ m$^{-1}$, for graphene[71] and $\alpha_{660}$ of about 1911 Lg$^{-1}$ m$^{-1}$ for P3 SWNTs, both experimentally derived using a method similar to the one described in Reference Hasan et al (2007) we get 0.2 gL$^{-1}$ and 0.4 gL$^{-1}$ concentrations for graphene and SWNTs, respectively.

As confirmed by TEM statistics as discussed above, the dispersion contains about 65% SLG and BLG and FLG(<8) flakes. TEM analysis showed that the typical lateral dimensions of typical mono and bi-layer graphene flakes are about 300-600 nm.

Raman measurements of the graphene dispersion confirmed FWHM(G) about 18 cm$^{-1}$, FWHM(2D) about 47 cm$^{-1}$ and position of 2D peak Pos(2D) about 2693 cm$^{-1}$ which are consistent with spectra of SLGs.

Figure 20:
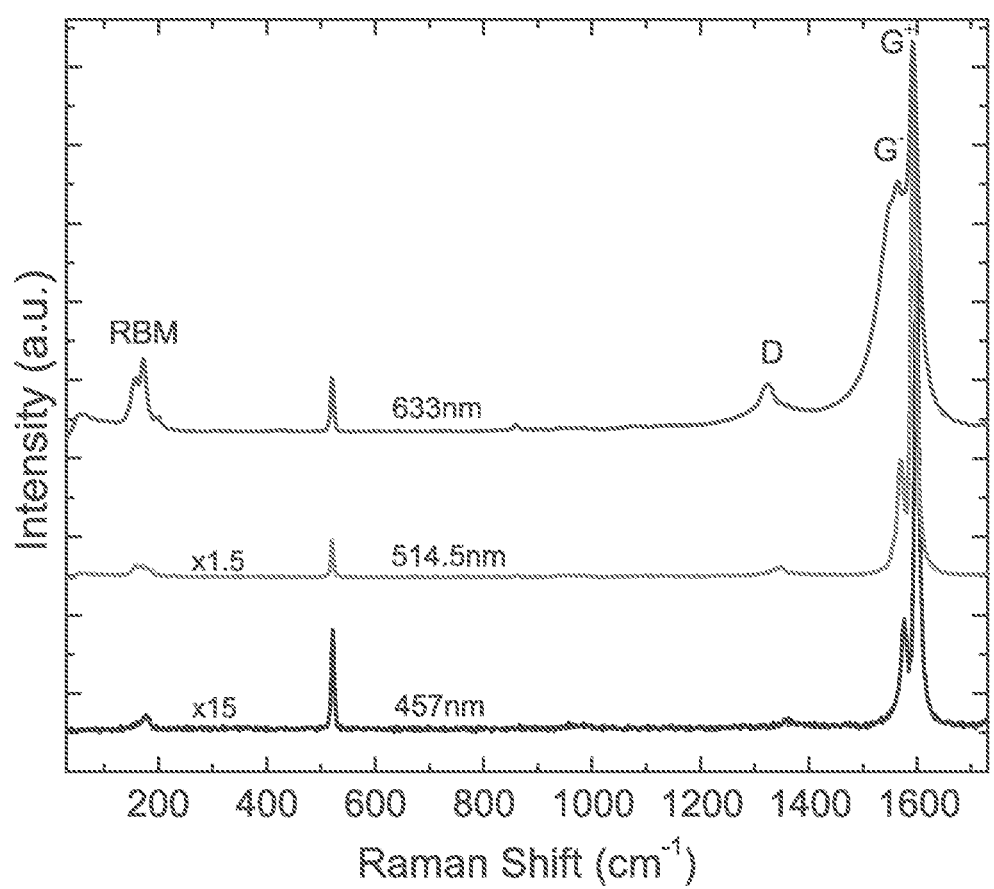
FIG. 20 shows Raman spectrum of SWNTs at 457, 514.5 and 633 nm excitation wavelength.

Raman spectroscopy can be also used to probe the SWNTs we use in this work. FIG. 20 shows typical Raman spectra (acquired at 457, 514.5 and 633 nm laser wavelength and a 100× objective) of our SWNTs dispersion dispensed on Si/SiO$_2$, gently washed with DI water and ethyl alcohol, and annealed at 70° C. to remove DI water and surfactant. In the low frequency region, the Radial Breathing Modes (RBMs) are observed; see FIG. 20. Their position Pos (RBM), is inversely related to nanotube diameter (d) by Pos(RBM)=(C1/d)+C2. A variety of C1 and C2 were proposed for this relation. Here we use the C1=214.4 cm$^{-1}$ nm and C2=18.7 cm$^{-1}$, from the literature. These were derived by plotting the resonance energy as a function of inverse RBM frequency without any additional assumptions. The RBM region in FIG. 20 shows peaks at about 176 cm$^{-1}$ at 457 nm, while three peaks at about 157.5 cm$^{-1}$, about 170 cm$^{-1}$, about 181 cm$^{-1}$ and about 156.5 cm$^{-1}$, about 172 cm$^{-1}$, about 200 cm$^{-1}$ are observed at 514.5 nm and 633 nm. These gives an estimated diameter range of about 1.2-1.55 nm. Besides the RBMs, the typical Raman spectrum of SWNTs in the 1000-1600 cm$^{-1}$ region consists of the D band and the G$^+$ and G$^-$ bands. In semiconducting SWNTs, the G$^+$ and G$^-$ originate from the longitudinal (LO) and tangential (TO) modes, respectively, derived from the splitting of the $E_{2g}$ phonon of graphene. The positions of the G$^+$ and G$^-$ peaks, Pos(G$^+$) and Pos(G$^-$), are diameter dependent and the separation between them increases with decreasing diameter. In metallic SWNTs, the assignment of the G$^+$ and G$^-$ bands is the opposite, the FWHM of the G⁻ peak, FWHM (G), is larger and Pos(G⁻) downshifted with respect to the semiconducting counterpart. In the G peak region, the spectra show the typical G⁺ and G⁻ peaks. Pos(G⁺) is about 1599 cm⁻¹ with FWHM(G+) about 10 cm⁻¹ at 457 nm, while it downshifts to Pos(G⁺) about 1592 cm⁻¹ at 514.5 and 633 nm with FWHM(G⁺) about 12 cm⁻¹ and about 19 cm⁻¹, respectively. Pos(G⁻) about 1576.5 cm⁻¹ (FWHM(G⁻) about 13 cm⁻¹), about 1570 cm⁻¹ (FWHM(G⁻) about 13 cm⁻¹) and about 1564.5 cm⁻¹ (FWHM(G⁻) about 37 cm⁻¹) for 457, 514.5 and 633 nm are observed, respectively. The SWNT dispersion is also composed of a mixture of metallic and semiconducting nanotubes, as can be seen both from the RBM positions and the typical metallic shape of the G⁻ peak for 633 nm and semiconducting shape at 514.5 nm. A D peak at about 1362 cm⁻¹, about 1348 cm⁻¹ and about 1325 cm⁻¹ is detected for 457, 514.5 and 633 nm, respectively. The I(D)/I(G) ratio for our samples is consistent with the functionalized SWNTs used here.

Figure 21:
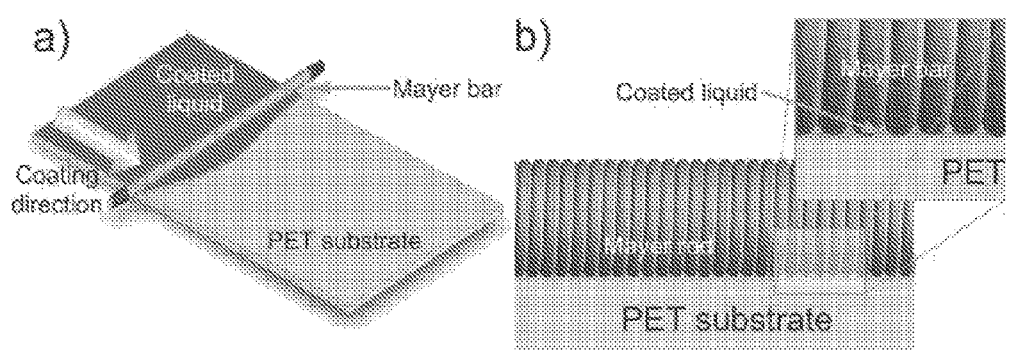
FIG. 21 shows a) Schematic of a wire wound rod-coating of graphene dispersion on PET. b) Close up cross section views.

FIG. 21 shows a schematic of our wire-wound rod-coating approach. The thickness of the coated liquid depends on the cross sectional area of the grooves between the wire coils, which in turn depends on the wire diameter. In practice, for coating any liquid, a 10:1 ratio between the wire diameter and intended wet film thickness is chosen. In our coating experiment, we use a bar with 10 μm diameter. To avoid de-wetting of the coated liquid on PET during the drying process, we add 50/50 v/v % IPA with the SWNT dispersion to reduce its surface tension. After IPA addition, we coat the aqueous nanotube dispersion on the PET. After every coating and drying at room temperature, we wash the samples in 50/50 v/v % ethyl alcohol (EtOH) in water at 60° C. to remove the excess surfactant. After repeating this procedure, SDC assisted aqueous dispersion of graphene is coated several times on the SWNT layer and subsequently washed. This gives >90% optical transparency of the coating, ensuring >80% transparency of the TCEs required for ESSWs. We find that the SWNT base layer prevents dew-etting of the graphene dispersion coating and facilitates the deposition of graphene flakes. The general structure of our coating thus consists of a SWNT layer, with sparsely distributed graphene flakes on top. Each graphene layer absorbs 2.3% of light across the visible spectrum. Considering that we have, about 2-3 graphene layers per flake, they cover 15-20% of the SWNT base layer, improving the junction resistance between the metallic and semiconducting type of SWNTs. Reference King et al (2010) reported a 20% decrease in $R_s$ by addition of graphene flakes on a vacuum filtered SWNT network. We achieved about a 10% reduction in average $R_s$, from about 1.1 kΩ to about 1 kΩ with <1% T reduction when graphene is coated on the base SWNT layer. The root mean squared surface roughness ($R_q$) of NGC, measured by tapping mode AFM, is about 4 nm, comparable to 1-3 nm and 1-5 nm for sputter deposited ITO with varying deposition conditions on Corning glass and on PET substrate, respectively.

Figure 22:
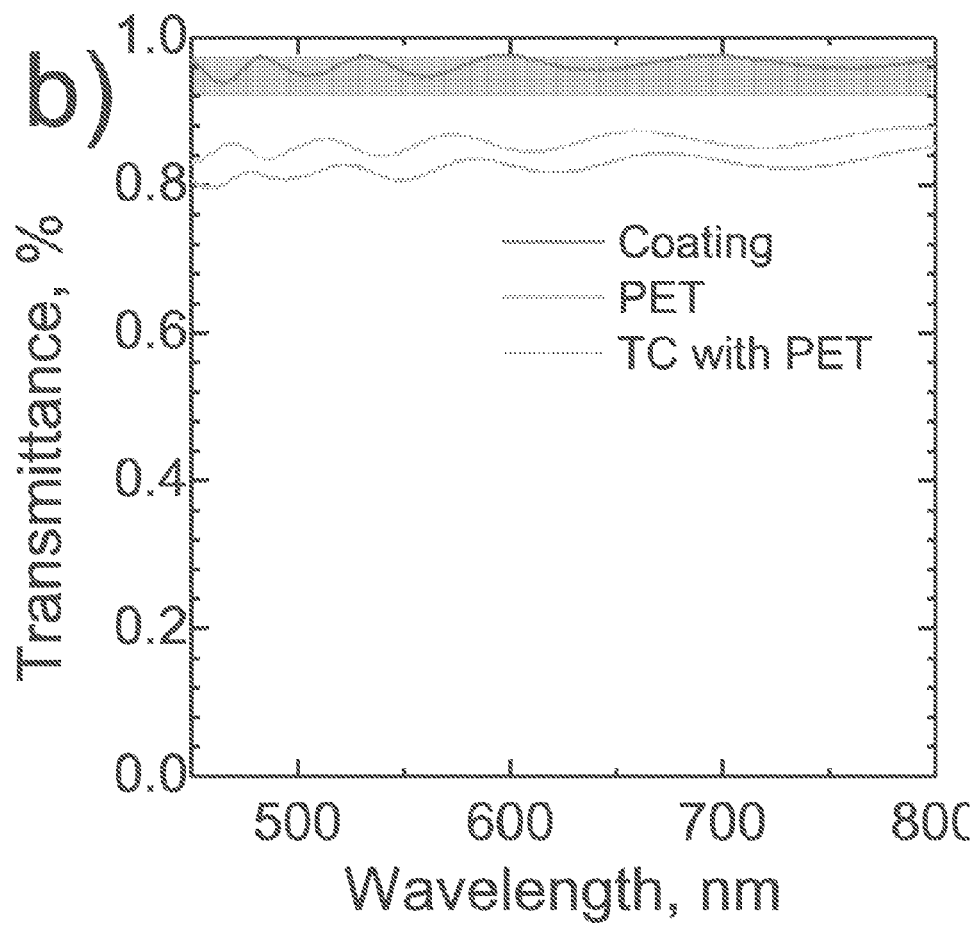
FIG. 22 shows measured transmittance of PET substrate and of an about 200 $cm^2$ transparent conductor (NGC) on PET substrate; the latter showing no strong absorption peaks from functionalized SWNTs. The calculated $T_{NGC}$ in the same plot shows 92-96% transmittance across the visible spectrum.

The fabricated TCEs, measuring about 120 cm², are optically uniform. Coating uniformity is crucial for large scale applications. To verify the uniformity, we perform T measurements across a 120 cm² NGC-PET with about 5 mm spatial resolution. We use a 543 nm, 0.5 mW, non-polarized laser with about 0.65 mm beam diameter. We focus on this wavelength, commonly used for T measurements of TCEs as the human eye is most sensitive at about 550 nm. FIG. 22 shows the spatial transmittance profile in a contour plot with a mean transmittance TNGC-PET of about 81%. The standard deviation across the entire NGC-PET is <2%, confirming the optical uniformity of the NGC. We note that this is an important performance parameter for TCEs when large scale applications are envisaged.

$T_{PET}$ and $T_{NGC-PET}$ were measured for the whole sample, covering the entire visible spectral range. No strong absorption peaks from the nanotubes are observed in TNGC-PET due to the ultrathin, sparse network of functionalized nanotubes. Oscillations in the transmittance spectra are considered to be due to the antistatic coating on both sides of the PET substrate. Ignoring reflections at the film interfaces, we can roughly estimate $T_{NGC}$ from $T_{NGC}=T_{NGC-PET}/T_{PET}$. This gives $T_{NGC}$ of about 92-96% across the visible spectrum. The overall T for the NGC-PET at 550 nm $T_{NGC-PET@550nm}$ 81%. The $T_{PET@550nm}$ of about 85.5% gives $T_{NGC@550nm}$ of about 95%. Considering the device structure, the maximum ON state T ($T_{max}$) of our PDLC layer sandwiched between two NGC-PETs can be approximated to:

$$T_{max}=T^2_{NGC-PET} \times T_{PDLC}=T^2_{PET} \times T^2_{NGC} \times T_{PDLC} \tag{C1}$$

where $T_{PDLC}$ is the maximum achievable transmittance of the PDLC layer itself i.e. when the LC director distribution inside the droplets is uniformly aligned along the applied electric field. In general, high T of TCEs is particularly important for PDLC-based smart windows since two TCEs are needed for a single device, giving a maximum transmittance of only T×T. Further, considering $T_{PET}$ and $T_{PDLC}$ to be constant for a particular device wavelength λ, we get $T_{max} \propto T^2_{NGC}$. For example, with $T_{PET}=86\%$ and $T_{PDLC}=90\%$ for a 20 μm thin PDLC film, $T_{NGC}=95\%$ allows a $T_{max}$ of about 60%, in comparison to only $T_{max}$ of about 43% with $T_{NGC}=80\%$ at the same wavelength. This underlines the critical importance of $T_{NGC}$ for PDLC devices.

Like optical homogeneity, uniformity in electrical conductivity is also of critical importance for large scale device applications. This can be studied by spatial $R_s$ measurements. We carry out this study using a four point probe technique. For a $R_s$ measurement at a single point, this method uses four probes arranged in a straight line. Current (I) is passed through the outer probes, inducing a voltage drop (V) between the two inner probes. When the probe spacings are equal and small compared to the lateral dimensions of the sample being measured, the voltage difference between the inner probes may be defined as:

$$V = \frac{IR_s}{\pi}\ln(2) \tag{C2}$$

Giving $$R_s = \frac{V}{I}\frac{\pi}{\ln(2)} \approx \frac{V}{I}4.53 \tag{C3}$$

Here, we use a Keithley 2100 multimeter with a Jandel four probe head with 100 μm titanium tips arranged in a straight line 1 mm apart. The sample used for $R_s$ measurement is the same about 120 cm² NGC-PET. The measurement accuracy is verified against a 12.93 Ω/square ITO on glass reference (Jandel Engineering Ltd., tested against a NIST traceable sample). We carry out spatial measurement with about 5 mm spacing across the sample. A contour plot of $R_s$ (not shown) shows that the mean $R_s$ is about 1 kΩ/square with a standard deviation of <5% across the sample area. This, coupled with the spatial absorption measurements, further validates the uniformity of the transparent conductive coating.

Figure 23:
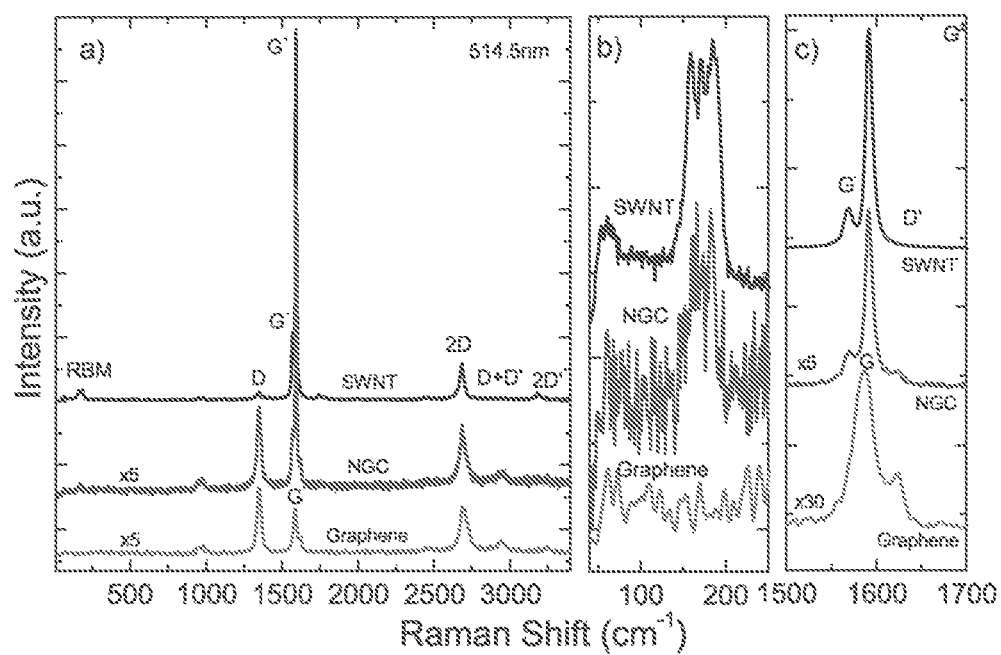
FIG. 23 shows: a) Raman spectrum of SWNT, Graphene and NGC on Si substrate. Expanded views of the b) RBM and c) G region. The excitation wavelength is 514.5 nm.

The NGC is also characterized by Raman spectroscopy at 514.5 nm excitation. FIG. 23(a), (b), and (c) compare a typical Raman spectrum of NGC on Si/SiO$_2$, with typical spectra of SWNTs and graphene on the same substrate. The SWNT spectrum in FIG. 23 (a) shows the typical RBM, G$^+$, G$^-$, 2D and 2D' peaks. In the same figure the graphene spectrum shows D, G, 2D, D+D' and 2D' peaks. The spectrum of NGC combines the features of SWNTs and graphene, showing RBM peaks (see FIG. 23(b)) and G$^+$, G$^-$ peaks (FIG. 23(c)) as well as sharp and intense 2D, D (FIG. 23(a)) and D' (FIG. 23(c)) peaks.

Figure 24:
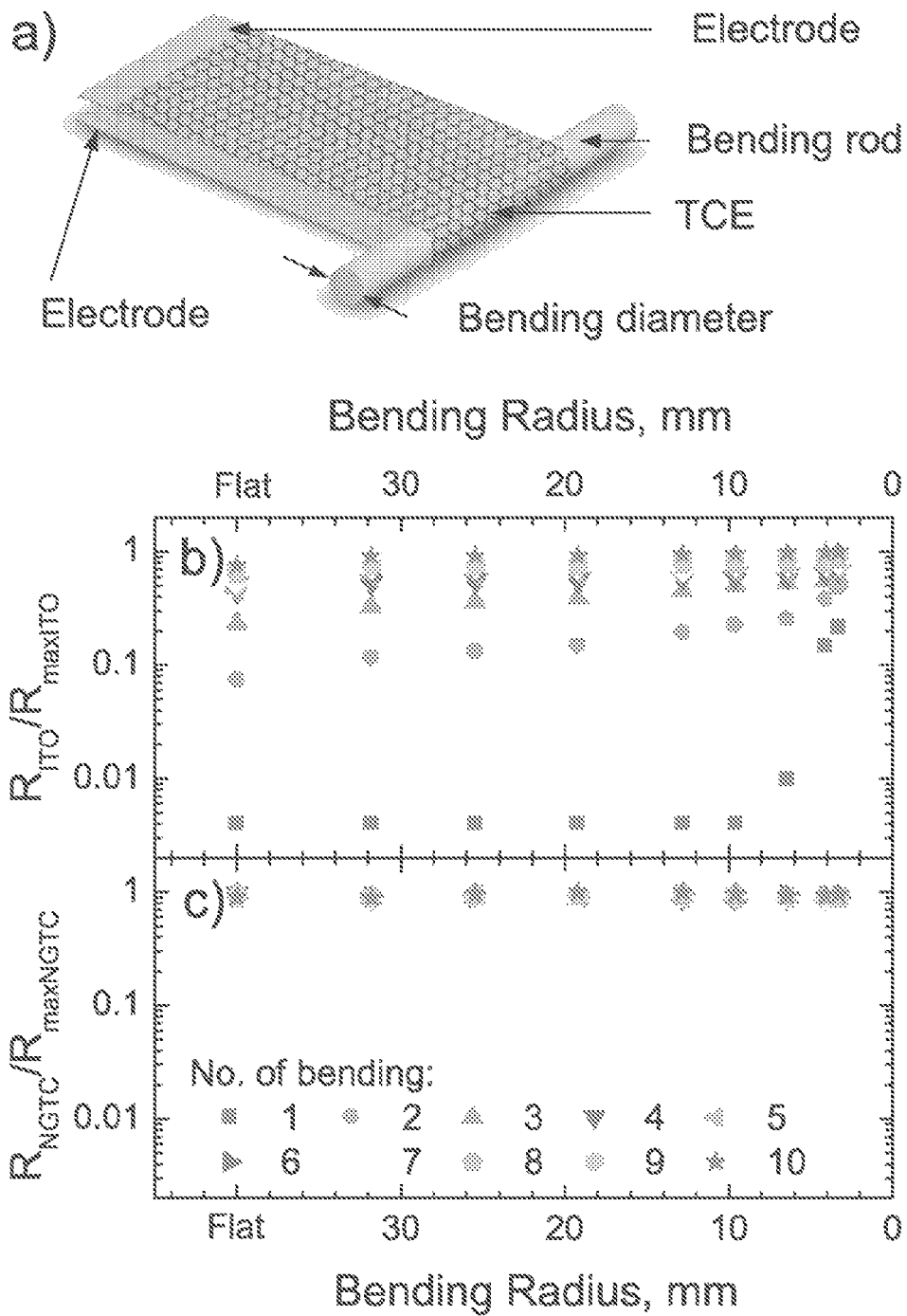
FIG. 24 shows the change in resistance of ITO and NGC on PET with different bending radii. a) Schematic of the measurement setup. Normalized resistance change in b) NGC on PET and in c) 60 Ω/square ITO on PET along the bending direction during 10 bending cycles. The resistance in NGC remains unaffected during and after the bending cycle unlike ITO. Both b) and c) use same symbols in the plot.

We then investigate the performance of the NGC-PETs under mechanical flexion. We study the resistance change along the bending axis of NGC-PETs with different bending radii. For comparison, we use 18 cm×1.8 cm strips of NGC-PETs (NGCs on 125 μm PET) and a 60 Ω/square ITO on PET of same thickness with electrodes at both the ends of the strips. FIG. 24(a) shows a schematic of the setup. The bending radii of the TCEs during this experiment are defined by a series of cylinders with known diameter. For resistance measurements, we deduct the contact resistances between the electrodes and underlying NGC. While measuring the resistance between two contacts, we start with flat substrates, gradually bending it down to a bending radius of 3.3 mm and then make the substrate flat and repeat the procedure. As seen in FIG. 24(b), the resistance change along the bending axis in ITO is >250 times higher over ten cycles and does not recover to the initial values after going through the bending cycles, highlighting the formation of cracks in the ITO layer. Indeed, when returned to flat state, the final resistance of the ITO on PET sample along the bending axis is about 200 times higher than the initial value. On the other hand, the resistance for the NGC-PET change by <20% during bending and recovers to about 10% of the initial values when the substrate is made flat, underscoring the potential of our NGC-PETs for flexible device applications.

Note that our fabricated NGC-PET dimensions are only limited by the size of the wire-wound Mayer bar. Therefore, this process can readily be scaled up for large area applications, and for a variety of polymeric substrates. Indeed, instead of PET, other semi-crystalline or amorphous flexible polymeric substrates, e.g. Polyethylene Naphthalate (PEN), Polyethersulphone (PES) could be used. This would improve the temperature processability of the NGC-PETs (e.g., to up to 180-220° C. for DuPont Teijin Q65A PEN substrates). We use two NGC-PETs for a smart window of area about 120 cm$^2$. Chromium-gold contact lines are first fabricated on one side of each NGC-PETs by thermal evaporation. For the LC-polymer blend, about 43.5/56.5 v/v % YM55 LC in NOA 65 is mixed by magnetic stirring at 50° C. to obtain a homogenous dispersion of LC microdroplets (about 1 μm in diameter under optical microscopy) in NOA65. The droplets size depends on the mixing process, mixing temperature, LC-polymer phase separation and the v/v % of LC and polymer. Very large/small droplets (>19 μm) do not scatter light efficiently. On the other hand, the driving voltage requirement for LC alignment is inversely proportional to droplet diameter. The optimum droplet size for PDLC devices is about 5λ where λ is the intended operation wavelength. Therefore, for the visible spectrum, the optimum droplet size is about 2-3 μm. To maintain uniform thickness of the coated PDLC across the device, 20 μm diameter polymer bead spacers (Sekisui Chemical) are also added to the mixture. Next, the homogeneous mixture is laminated between two NGC-PETs using a roll coater-laminator at 50° C. The host polymer, NOA65, is finally cured under UV irradiation (about 350-380 nm) for 10-15 minutes, producing the PDLC based transparent window.

In the absence of an electric field (OFF state) the LC director distribution inside the PDLC droplets has a bipolar configuration, with LC molecules anchored tangentially with respect to the droplet wall. For a given size and shape, the light-scattering capability of an LC droplet in a PDLC device increases with the index mismatch between the LC (average refractive index $<n> = (n_e + 2n_o)/3$ where $n_o$ and $n_e$ are ordinary and extra-ordinary refractive index of LC, respectively) and that of the polymer ($n_p$).

When an electric filed is applied (ON state), the LC director distribution is aligned along the applied field direction, making the refractive index of the LC $n_o$ along this direction. For high $T_{PDLC}$ (i.e. under the applied field), $n_o \sim n_p$ is required to minimize light scattering. Similarly, for low $T_{PDLC}$ during OFF state, the mismatch between $n_e$ and $n_p$ should be as high as possible to maximize scattering. Therefore, the preferred LC should not only have high birefringence ($\Delta n = n_e - n_o$) but also have an $n_o$ matching $n_p$ of the polymer for high transmittance in the ON state and $n_e$ mismatching the $n_p$ for low transmittance in the OFF state. In practice, due to inter-solubility or polymer and LC, $n_p$ may be chosen slightly lower than $n_o$. The YM55 nematic LC we use here has $n_o$ of about 1.526. This matches well with $n_p \sim 1.524$ of NOA 65 at 656 nm and 20-25° C., ensuring optimum $T_{max}$.

Figure 25:
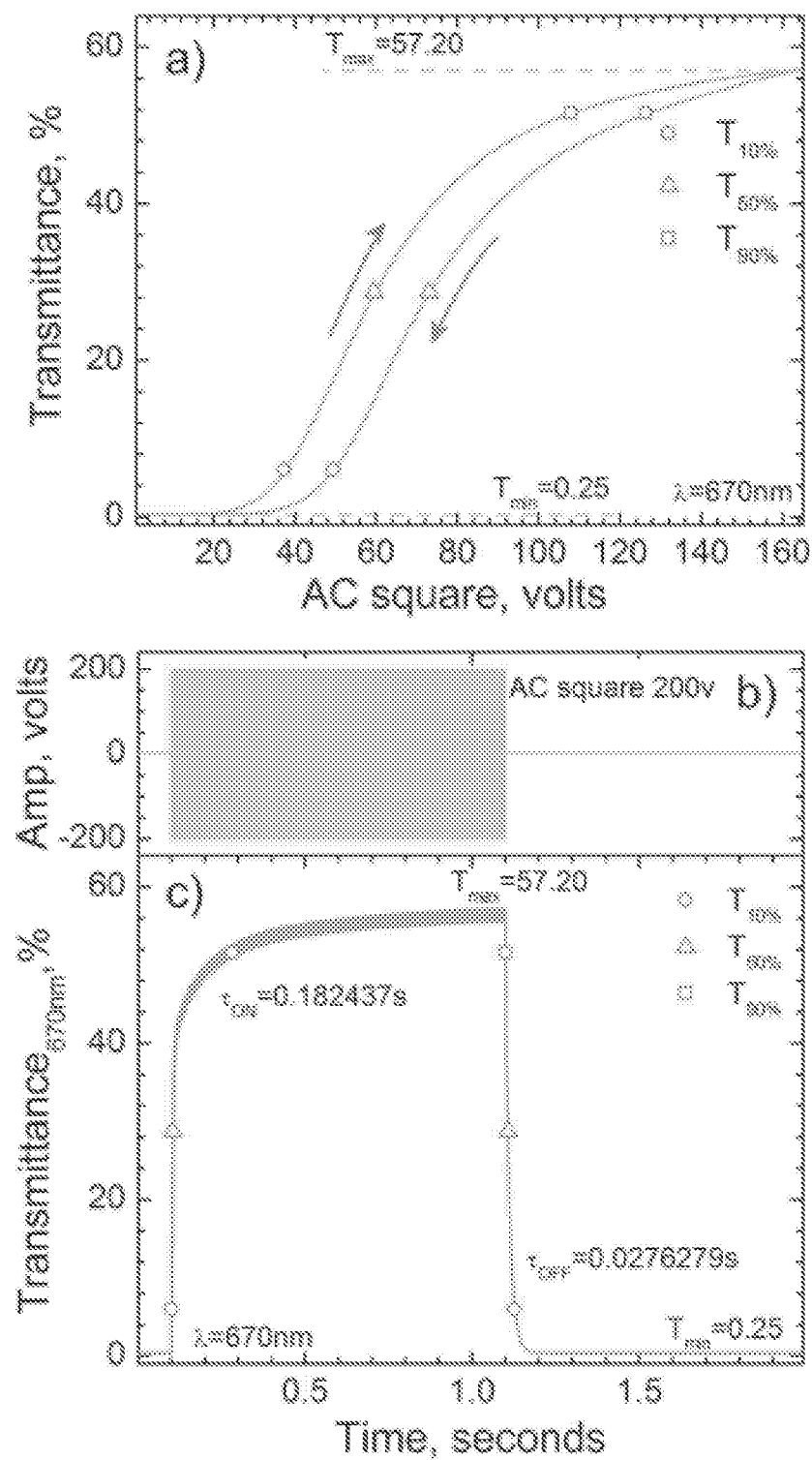
FIG. 25 shows the electro-optical response of the PDLC device: a) Hysteresis response of the PDLC layer when a 1 kHz AC square wave of increasing amplitude is applied. Applied voltage levels required to achieve 10, 50 and 90% of the maximum transmittance when the applied voltage is gradually increased and decreased are marked by symbols. The difference between applied voltage at 50% of maximum transmittance is usually used to characterize hysteresis of a PDLC device. b) Applied voltage (1 kHz AC square, 200V) for switching ON/OFF the device. c) Response of the PDLC device when voltage shown in b) is applied. Time required to reach 10%, 50% and 90% of the maximum transmittance just after the voltage is applied and removed are marked by symbols.

PDLC based smart windows are characterized by maximum transmittance at a certain wavelength, $T_{max@\lambda}$, contrast ratio, driving voltage requirement and device response time (i.e. rise and fall time). The contrast ratio is defined as the ratio between $T_{max@\lambda}$ and minimum transmittance ($T_{min@\lambda}$) of the PDLC device. For a particular pair of TCE, small droplet sizes and thicker PDLC films usually reduce $T_{min}$ due to increased off-state scattering. Increased film thickness, however, reduces $T_{max}$ and linearly increases the driving voltage requirement to attain the maximum transmittance. These parameters are determined by sweeping the applied voltage. FIG. 25(a) shows that T increases gradually when a 1 kHz AC square wave of increasing amplitude is applied, saturating at $T_{max}$ of about 57.2%. The 125 μm PET substrate used here has $T_{PET@670nm}$ of about 86% compared to $T_{NGC-PET@670nm}$ of about 83%, giving $T_{NGC@670nm}$ of about 96%. Considering $T_{PDLC@670nm}$ is about 90% gives $T_{max@670nm}$ of about 62%, close to about 60% we measure experimentally. The contrast ratio, $C.R. = T_{max@670nm}/T_{min@670nm}$ is about 230. We also observe a hysteresis $H_{50} = 13.5$ v at T=50% (see FIG. 25(a)). Hysteresis is typical of PDLC devices and is attributed to the rate of change in applied voltage, viscosity of the LC droplets and a thin layer of LC molecules at the electrode-PDLC interface which orients differently than the LC droplets under the applied field.

The rise time ($\tau_{on}$) defined as the time required to attain 90% of $T_{max}$, depends on applied voltage, film thickness, electrical resistivities (ρ) of LC and polymer, rotational viscosity and dielectric anisotropy ($\Delta \in = \in_\| - \in_\perp$, with $\in_\|$ and $\in_\perp$ dielectric permittivities of LC parallel and perpendicular to the LC director). The decay time $\tau_{off}$, in the absence of an applied electric field, depends on LC viscosity and elasticity, droplet shape and size. It is defined as the time needed for a PDLC device to reach 10% T from $T_{max}$.

FIG. 25(c) shows the change in TPDLC upon application of 200V, 1 kHz AC square wave as indicated in FIG. 25(b). The maximum and minimum transmittance match with the electro-optical response presented in FIG. 25(a). $\tau_{on}$ and $\tau_{off}$ are 182 and 27 ms, respectively. The smaller $\tau_{off}$ compared to $\tau_{on}$ indicates higher aspect ratio of the droplet shapes, as increased surface effects in elongated droplets significantly reduce $\tau_{off}$.

Visual inspection of the PDLC device during operation confirmed the high T and uniformity over the visible spectrum. We also tested the device operation under repeated flexing with about 3.5 mm bending radius. The device remains operational during and after repeated flexing, highlighting the potential our NGC-PETs for flexible applications.

In summary of this section, we fabricated a PDLC based electrically switchable flexible smart window using graphene-SWNT transparent conductors on PET by rod coating. The transparent conductive coatings exhibit 92-96% transmittance across the visible spectrum with about 1 kΩ/square sheet resistance with <2% and <5% standard deviation in transmittance and sheet resistance for an area of about 120 cm². The transparent conductor shows <20% change in resistance when bent down to about 3 mm bending radius and recovers to within 10% of its initial value when the returned to flat state after 10 bending cycles. The PDLC smart window device fabricated using using these conductors show about 60% T at the ON state and about 0.25% at the OFF state, giving a contrast ratio of about 230. Our approach confirms the technological viability of using SWNT-graphene based TCEs for flexible ESSWs and related devices, for example, smart, flexible advertising boards and displays. This makes economic fabrication of PDLC and LC based devices in a single, integrated R2R process economically feasible.

Additional Technical Details and Measurement Methods
Ink Manufacture—Graphene Ink Here, specific details of the manufacture of one example of a suitable graphene ink are set out.

Natural graphite flakes (typical lateral dimensions 4-5 mm and below) are annealed at 150° C. for 30 minutes in an oven in air to remove moisture. The annealed graphite flakes are ultrasonicated (Bath sonicator, 20 W, 20 kHz) in N-methylpyrrolidone, for 9 hours at 14° C. under constant air ventilation. Other solvents e.g, chloroform, benzene, toluene, dichlorobenzene, dimethyl formamide etc may also be used. The dispersion is left to sediment (gravitational sedimentation) for 15 mins after ultrasonication in a controlled Nitrogen environment (glove box with controlled atmosphere). The top fraction (the aliquot of dispersion with no visual evidence of sedimentation) is extracted by micropipette (1000 μl) and transferred in 14 ml (14×89 mm) ultracentrifuge tubes.

The as-prepared dispersion is purified via a sedimentation based-separation in centrifugal field. The dispersion is ultracentrifuged at about 15,000 g for 60 mins at 14° C. (acceleration and deceleration speed 5 g/s). The graphene dispersion can also be purified in a density gradient ultracentrifugation (DGU) process by rate zonal separation (RZS), as explained above. This technique exploits the difference in sedimentation rates of nanoparticle and permits to separate flakes with different lateral size [the larger the size the larger the sedimentation rate]. The density gradient medium is constituted, but not limited to, NMP and Trichlorobenzene at different ratio. The RZS is carried out at about 35,000 g for 15 mins at 14° C. (acceleration and deceleration speed 5 g/s).

In the case of the sedimentation-based separation, the ultracentrifuged dispersion is extracted by micropipette (1000 μl) and transferred in 15 ml sterilized vial. In the case of the RZS it is extracted via upward displacement fractionation as discussed above. High density medium (i.e. Fluorinert) is inserted (via a syringe pump) at the bottom of the ultracentrifuged tubes and the fractions (containing the graphene flakes) are collected from a needle at the top of the tube.

The dispersion after ultracentrifugation is filtered via vacuum filtration (1 μm pore size filters) to remove larger flakes (>1 μm). The dispersion can be mixed with (but not limited to) Ethylene Glycol or Glycerol to adjust viscosity and surface tension to make graphene inks with on demand rheological properties. Suitable example physical properties are:

Example1: viscosity 1.9 mPa s, density 1.05 g/cm³, surface energy 40 mJ/m²
Example2: viscosity 4.2 mPa s, density 1.05 g/cm³, surface energy 42 mJ/m²
Example3: viscosity 18 mPa s, density 1.05 g/cm³, surface energy 46 mJ/m²

The obtained graphene-ink is characterized by Optical Absorption Spectroscopy, Transmission Electron Microscopy and Raman Spectroscopy, as discussed above.

For printing on $Si/SiO_2$, the target substrate is immersed in acetone and ultrasonicated (Bath sonicator, 20 W) for 5 minutes followed by a further ultrasonication in Isopropyl Alcohol (IPA) for 2 minutes. After ultrasonication, a nitrogen flux (100 sccm) cleans the substrate from residual IPA. A layer of Hexamethyldisilazane (HMDS) is spin coated on the target substrate at 1000 rpm for 40 seconds at 21° C. The target substrate is annealed on hot plate for 5 mins at 80° C.

For the case of heat-treated polyethylene terephthalate with antistatic coating (PMX715, hifi industrial film) as the target substrate, it is cleaned by acetone and Isopropyl Alcohol for 2 minutes each at 60° C. For other polymers (such as polyethylene terephthalate without heat treatment and coating), the substrate is cleaned by Isopropyl Alcohol for 1 minute at room temperature and then dried under $N_2$ flux.

The printability of the graphene-ink is tested by inkjet printing, as follows. The nozzle is positioned about 1 mm above the target substrate. The graphene-ink is loaded into the printing column via a syringe pump. Printing operates at 10 kHz. The operating voltage of the piezoelectric material is 75V. The printing nozzle moves at 0.3 m/s. Printed drops/patterns are dried at 80° C. for 5 minutes.

Printed drops/patterns are characterized by Optical Microscopy, Atomic Force Microscopy, Scanning Electron Microscopy, as discussed above. The printed devices are characterized by Raman Spectroscopy and electrical measurements, as discussed above.

The present inventors consider that the temperature during the exfoliation stage and during the sorting (ultracentrifugation) stage is of great importance for obtaining good results. For instance the viscosity of many suitable solvents, including NMP is strongly temperature dependent. The same comment applies to the density of the solvent. The viscosity of NMP at 20° C. is 1.7 cp [0.0017 Pa·s] while it drops to 1.0 cp at 50° C. This has a very large effect on the ultrasonication process, because a lower viscosity allows a better propagation of ultrasound waves. Moreover, the viscosity and density have a strong impact on the separation in centrifugal fields modulating the sedimentation coefficient (the rate at which the graphene flakes, and nanoparticles in general, travel through the medium during the ultracentrifugation). Thus, for example, at 20° C. the graphene flakes will have a sedimentation coefficient 1.7 times larger than at 50° C. Considering flakes of the same thickness, at 20° C. we are able to separate flakes that are 1.7 times larger with respect to the same procedure carried out at 50° C.

As discussed in detail above, unwanted thick flakes can be removed following different strategies based on ultracentrifugation in a uniform medium or DGM. The first is called differential ultracentrifugation (SBS), while the second DGU. SBS separates various particles on the basis of their sedimentation rate in response to a centrifugal force acting on them. In the DGU process, the graphene flakes are ultracentrifuged in a preformed DGM. During the process, they move along the cuvette until they reach the corresponding isopycnic point, i.e., the point where their buoyant density equals that of the surrounding DGM. The buoyant density is defined as the density of the medium at the corresponding isopycnic point. Isopycnic separation has been used successfully to sort nanotubes by diameter, metallic vs semiconducting nature and chirality. However, unlike nanotubes of different diameter, graphitic flakes have the same density, irrespective of the number of layers, so another approach is needed to induce a density difference. This exploits the surfactant coverage, resulting in an increase of buoyant density with the number of layers. Another approach is the rate zonal separation. This technique exploits the difference in sedimentation rates of nanoparticle due to diverse size and mass instead of difference in nanoparticle density, as in the case of the isopycnic separation. This approach was exploited to separate flakes with different lateral size [the larger the size the larger the sedimentation rate].

Ink Manufacture—Hexagonal Boron Nitride Ink:

Although the present invention has particular applicability to the manufacture of graphene-based inks, it is not necessary limited to the use of graphene. Other layered materials may also be used. Therefore he we set out an example of the manufacture of ink based on hexagonal boron nitride.

Hexagonal Boron Nitride (h-BN) flakes (about 100 um lateral dimension) are annealed at 70° C. in an oven in air for 30 minutes to remove moisture. The annealed h-BN flakes are ultrasonicated (Bath sonicator, 20 kHz, 20 W) in a mixture of Ethyl Alcohol and Deionized Water (40-60 vol/vol %) for 5 hours at 14° C. in a fume cupboard. Ethyl alcohol can be replaced by other common alcohols such as (but not limited to) methyl alcohol and isopropyl alcohol. The dispersion is left to sediment (gravitational sedimentation) for 18 hours after ultrasonication in a controlled Nitrogen environment in room temperature. The top fraction (the aliquot of dispersion with no visual evidence of sedimentation) is extracted by micropipette (1000 µl) and transferred in to 14 ml (14×89 mm) ultracentrifuge tubes.

The as-prepared dispersions are then ultracentrifugated at about 3,000 g for 60 mins at 14° C. (acceleration and deceleration speed 2 g/s). The top 60% of the ultracentrifugated dispersion is then extracted by micropipette (1000 µl) and transferred in a sterilized vial.

Figure 30:
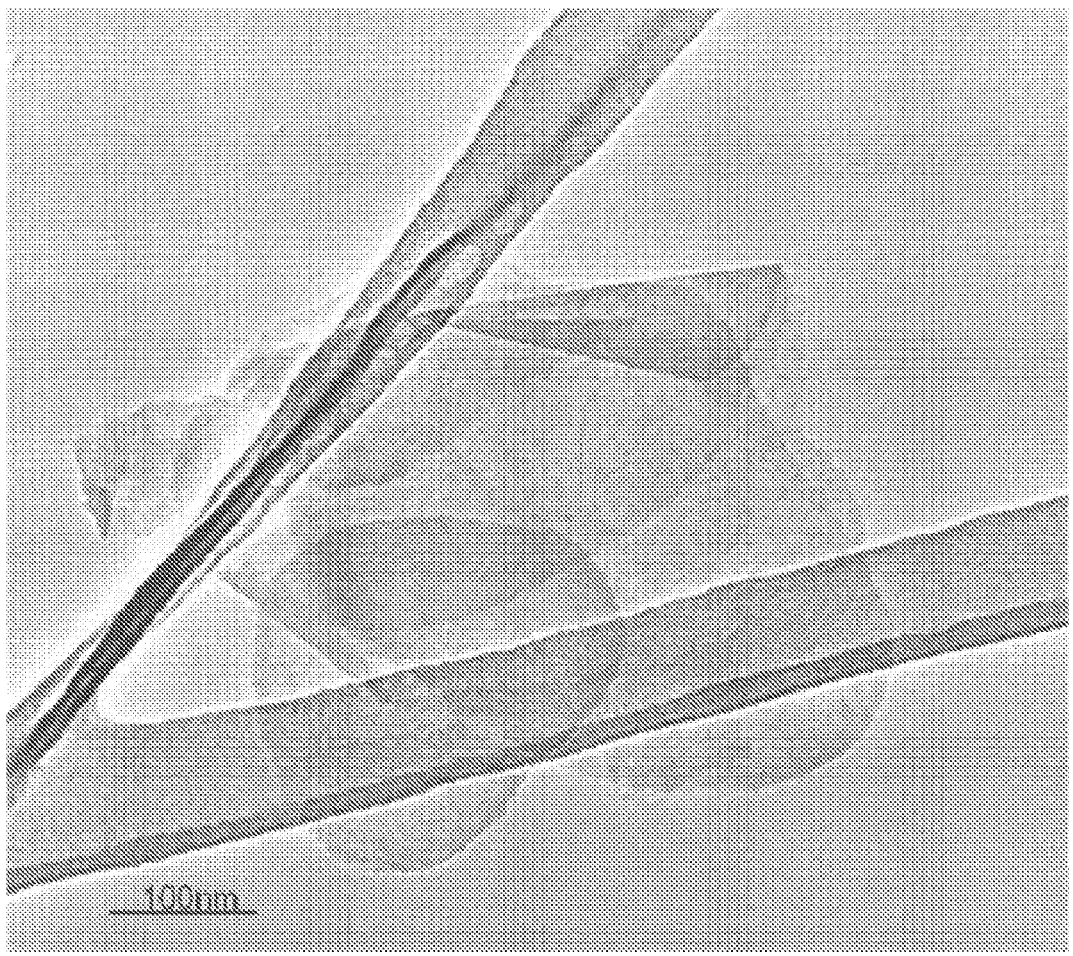
FIG. 30 shows a TEM image of exfoliated boron nitride flakes.

The h-BN dispersion is characterized by Optical Absorption Spectroscopy, Transmission Electron Microscopy and Raman Spectroscopy. FIG. 30 shows a TEM image of exfoliated boron nitride flakes.

The target substrate (standard laboratory grade glass/quartz substrate, Si/SiO$_2$) is immersed in acetone for 5 minutes and in Isopropyl Alcohol for 2 minutes at room temperature. For the case of heat-treated polyethylene terephthalate with antistatic coating (PMX715, hifi industrial film) as the target substrate, it is cleaned by acetone and Isopropyl Alcohol for 2 minutes each at 60° C. For other polymers (such as polyethylene terephthalate without heat treatment and coating), the substrate is cleaned by Isopropyl Alcohol for 1 minute at room temperature and then dried under N$_2$ flux.

2 ml of h-BN ink is dispensed by micropipette (200 µl Fisher) homogeneously on the target polymeric substrate (such as polyethylene terephthalate). A wire-wound Mayer bar (50 µm wire diameter) is used to coat the target polymeric substrate by rolling over the entire substrate. The coating speed is 5 cm/sec. The water-alcohol solvent evaporates quickly at room temperature. The h-BN ink is distributed homogeneously over the target substrate upon evaporation of carrier solvent mixture.

Printed coatings/patterns are characterized by Optical Microscopy, Atomic Force Microscopy, Scanning Electron Microscopy and electrical measurements.

The printed devices are characterized by Raman Spectroscopy and electrical measurements.

Suitable Dispersion Techniques and Suitable Solvents/Carriers

The layered materials are exfoliated in a liquid medium (e.g., water, alcohol, N-methylpyrrolidone, chloroform, benzene, toluene, di-chlorobenzene, Iso-propyl alcohol, Ethanol and/or other organic solvents) to obtain a suspension, or slurry with particles suspended in the liquid medium. Exfoliated layered materials (ELM) can be produced via ultrasonication. Other dispersion techniques can be used, such as bar stirring, shear mixing, milling, grinding, etc. A dispersing agent or surfactant may be used to help uniformly disperse particles in the liquid medium. As an example, 100 mg of ELM flakes are put in a test tube with about 10 ml solvent in a sonicator. The sonication is typically carried out for >4 hours to up to several hundred hours at <100° C., typically at a temperature range 10-50° C.

ELMs are typically not stable in all solvents. Stability is found where the ELM surface energy matches that of the solvent. Further details on the matching of surface energy can be found in References Coleman et al (2011) and Cunningham et al (2012). In other cases, the ELM dispersion should be stabilized by covalent or non-covalent functionalization. As an example, for the case of water, about 100-200 mg dispersants (typically, bile salt surfactants) are used in the 10 ml solvent (water) to aid exfoliation and stabilization of the ELMs derived from the 100 mg ELM flakes.

The resultant dispersions contain a mixture of un-exfoliated flakes and ELMs. The un-exfoliated flakes are sedimented out by centrifugation (about 5,000-10,000 g) and filtration, obtaining ELM dispersions with flakes of about 1 micrometer lateral dimensions. The typical mono and bilayer population is 50-80% with an ELM concentration of 0.01-0.5 g·L$^{-1}$. Alternatively, stronger centrifugation may be used to sediment larger flakes, which can then be re-dispersed to obtain dispersions containing pristine ELMs of about 1-10 µm lateral dimensions (see FIG. 30). These dispersions can have concentration >0.5 g·L$^{-1}$.

Printing Techniques

The discussion above focuses in particular on inkjet printing. However, the present invention is not necessarily limited to inkjet printing Following the disclosure of the present invention, a range of inks can be manufactured that are viable for different printing techniques such as spin coating, Langmuir-Blodgett, spray coating, rod coating, screen printing, roll to roll coating, flexographic, gravure printing and slot-dye coating. Each technique typically requires an ink of different properties in order to be viable.

For inkjet printing, to facilitate the drops drying, inkjet printing may be performed in environments with different atmospheres (e.g. air, nitrogen, argon, mixed gas, etc.) and at controlled temperature (e.g. 25-50° C.).

Before inkjet printing the substrate can be treated by self assembly monolayers (e.g. adhesive promoters such as Hexamethyldisilazane, Octadecyltrichlorosilane, 3-Aminopropyltriethoxysilane, etc.) deposited via spin-coating, drop casting or immersion and successive heating (60-80° C.). Alternative or additional treatment of the substrate can be plasma treatment (e.g. corona discharge in air) to improve the adhesion of the deposited ELMs.

The printed substrates are then passed through a heated region for the evaporation of solvents (80-170° C.), the temperature depending on the substrate and the solvent.

For web coating, the layer thickness (before drying) is about 10-50 μm. The ink typically contains at least 0.1 g/L flakes. For gravure coating, the layer thickness (before drying) is about 10-50 μm. The ink typically contains at least 0.5 g/L flakes. The speed of gravure printing can be very high, e.g. at least 1 m/sec.

Where the ink includes a water-surfactant dispersion, the dried printed layer is typically washed in ethanol/water (e.g. about 50/50 v/v %) at 80° C. followed by diluted hydrobromic acid (e.g. about 5/95 v/v %).

The printing process can be repeated to build up the printed layer thickness. Suitable thicknesses are up to about 100 nm or up to several hundred nm.

Patterning can be accomplished during deposition using inkjet, flexo, gravure or screen printing. Post deposition patterning is also possible and allows greater control, e.g., through laser writing (pulse width, wavelength, peak intensity and energy requirements vary according to the ELM), conventional optical lithography/shadow masks in combination with oxygen plasma/reactive ion etching (about 3-10 minutes, depending on experimental parameters as well as deposited ELM coating thickness). We have confirmed experimentally that a graphene coating can be suitably patterned using optical lithography/reactive ion etching, giving etched lines in the pattern of width 100 μm.

Patterns of ELM can be inkjet printed on plastic flexible substrate. For example, about 30 nm thick printed patterns show uniform network of ELMs and transparency of about 80%.

Variation of Fluid Properties of Ink

A key property of inks for inkjet printing is their ability to generate droplets. During printing, the primary drop may be followed by secondary (satellite) droplets. This needs to be avoided in drop-on-demand printing. Ink viscosity, $\eta$, surface tension, $\gamma$, density, $\rho$, and nozzle diameter, a, influence the spreading of the resulting liquid drops.

By varying $\eta$, $\gamma$, and $\rho$, the ELM ink can be optimised for drop-on-demand inkjet printing. $\gamma$ of the ELM dispersions (at the intended printing temperature, e.g. 20° C.) can be lowered (to about 30-55 mN·m$^{-1}$) by addition of alcohols, such as ethyl alcohol (e.g. 50/50v/v %). This is ideal for homogeneous inkjet printing on polymeric substrates. The viscosity of ELM inks is crucial for drop-on-demand inkjet printing and it is typically in a range 1-10 mPa·s. However it can be further increased (above 100 mPa s) by additives such as polyvinyl alcohol, glycerol, ethylene glycol.

Suitable Layered Materials

Graphite is just one of a range of layered materials that can be exfoliated and used to formulate inks according to the present invention. Other layered crystals may provide very different properties. Suitable materials range from metals (e.g., $NiTe_2$, $VSe_2$), semi-metals (e.g., $WTa_2$, $TcS_2$), semiconductors (e.g., $WS_2$, $WSe_2$, $MoS_2$, $MoTe_2$, $TaS_2$, $RhTe_2$, $PdTe_2$) to insulators (e.g., h-BN, $HfS_2$), superconductors (e.g., $NbS_2$, $NbSe_2$, $NbTe_2$, $TaSe_2$) and also topological insulators and thermo-electrics (e.g., $Bi_2Se_3$, $Bi_2Te_3$).

Composite Materials—General

Using the preferred features of the invention, it is possible to build up composites based on layering individual material layers. Such composite materials can be assembled e.g. via printing or other deposition techniques of the individual material layers in a suitable sequence. The present invention is particularly suited to such an approach in view of the use of layered 2d crystals. Suitable composite materials can be formed by stacking different atomic planes to form heterojunctions between the layers, or by varying the stacking order of homogeneous atomic planes. This provides a rich toolset for the creation of new, customized materials.

Different ELM inks can be inkjet printed in sequence to obtain multi-stacked printed composites. Also, conductive/semiconducting polymer can be sequentially inkjet printed on ELM stripes to make a polymer composite.

Blends of ELM inks and conducting/semiconducting polymers (e.g. Poly(3,3'''-didodecyl quarter thiophene, PQT-12; Poly(2,5-bis(3-tetradecyllthiophen-2-yl)thieno[3,2-b] thiophene, P3HT; poly(dioctyl-bithiophene)/Polystyrene Sulfonate, PDOT/PSS; etc.) can be ink jet printed as printable ELM-polymer composites.

Depending on applications, the inkjet printed ELM patterns from both water and solvent routes can next be modified to enhance certain properties, e.g. sheet resistance. For example, for the case of graphene, metal nanoparticles (e.g. silver), metal nanoparticle precursors (e.g., potassium tetrachloroaurate as gold nanoparticle precursors, 1 wt %), acid (e.g., diluted nitric acid, e.g. 10 v/v %) and be applied. This may be followed by a further wash and drying. Other steps commonly used in printed electronics, such as UV curing, lamination etc. may also be added for specific applications.

Composite Materials—Example of a Graphene-Ag Heterostructure

Multilayered structures or heterostructures can be created for example combining graphene and metal nanoparticles. In this case we show that graphene-Ag nanoparticles printed heterostructures can outperform pure graphene inks in terms of sheet resistance, achieving $R_s$ as low as 50 Ω/sq and transmittance of about 70%.

Figure 26:
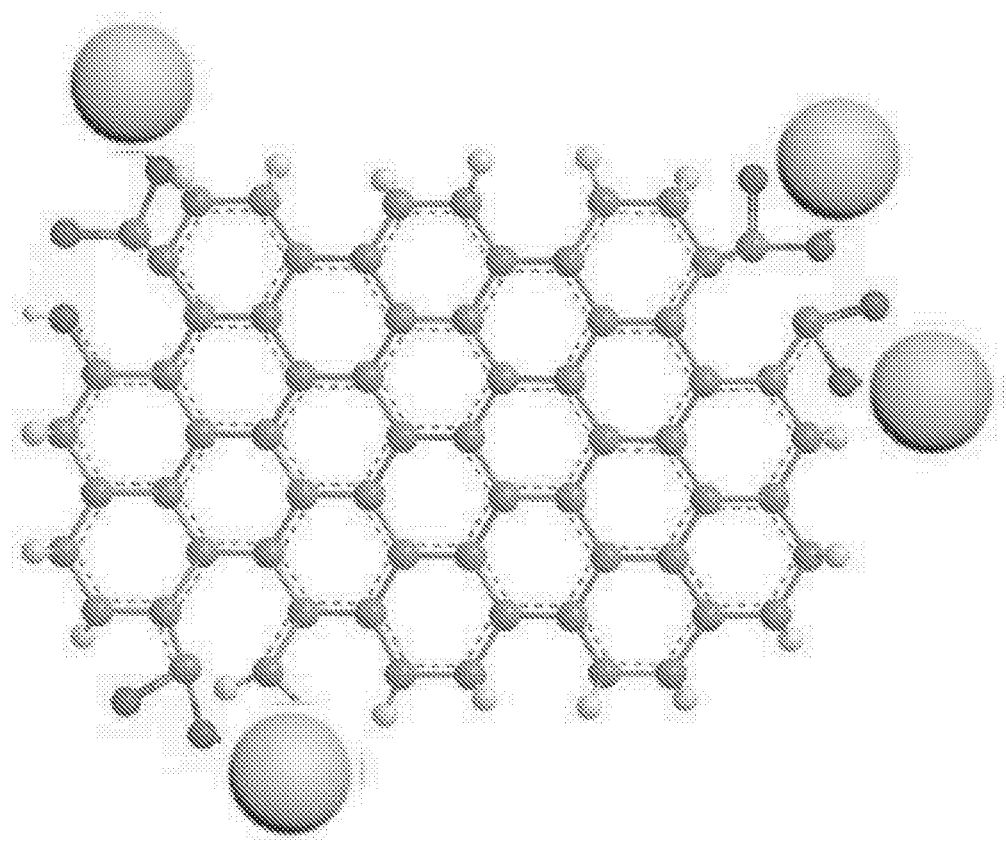
FIG. 26 illustrates a schematic view of a graphene flake decorated with Ag nanoparticles.

Graphene flake are decorated with metal NPs as depicted in FIG. 26. AgNPs/graphene heterostructures are preferable since silver has the highest electrical conductivity of any metal (6.3×10$^7$ S/m).

Figure 27:
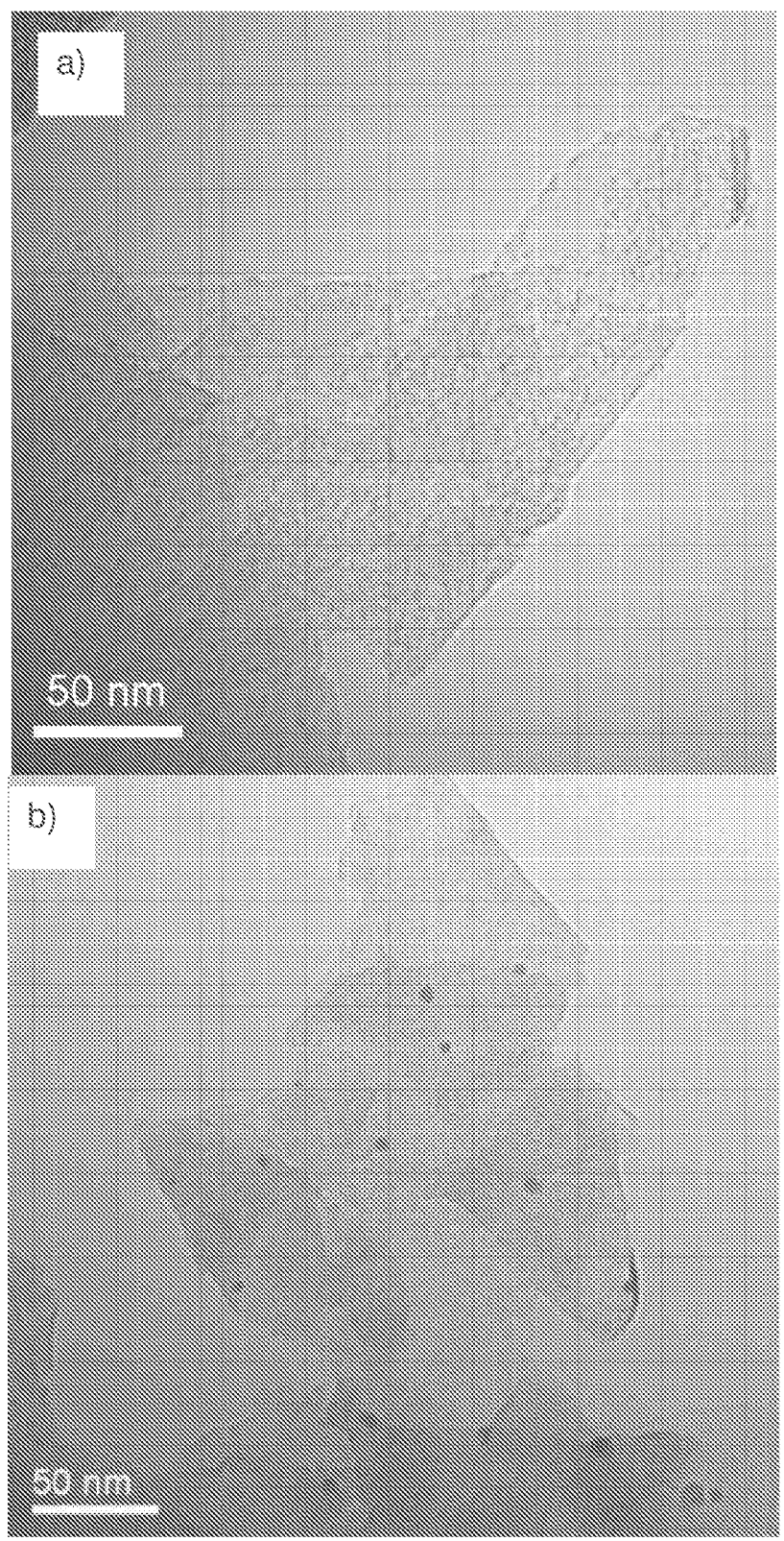
FIG. 27 shows TEM images of (a) pristine graphene flakes, (b) AgNP decorated graphene flakes.

From TEM, the size of the graphene flakes is about 200 nm. TEM imaging also reveals that NPs were exclusively attached onto graphene sheets, and each individual sheet was indeed decorated with NPs (FIGS. 27a and 27b). For the TEM studies, the samples were sonicated in order to form a homogeneous solution; however, it was observed that most of the AgNPs were still attached to the graphene surface indicating a strong binding between the materials. The high resolution TEM image indicates an average size of the AgNPs of 20±2 nm.

Transparent conductors were fabricated with these heterostructures using rod coating. The rod coating process is repeated 5-25 times (to maintain about 10 layers) on a PET substrate. For comparison, films deposited using pristine graphene were also carried out. Visual inspection of the TC film coated on a PET substrate showed that the coated substrate was highly uniform and transparent. Typically, after 2-3 times of coating, the films show sheet resistance of about 50-100 kΩ/☐ and coating transmittance >95% (85% including substrate). The transmission of the PET substrate is about 87% at 550 nm.

Figure 28:
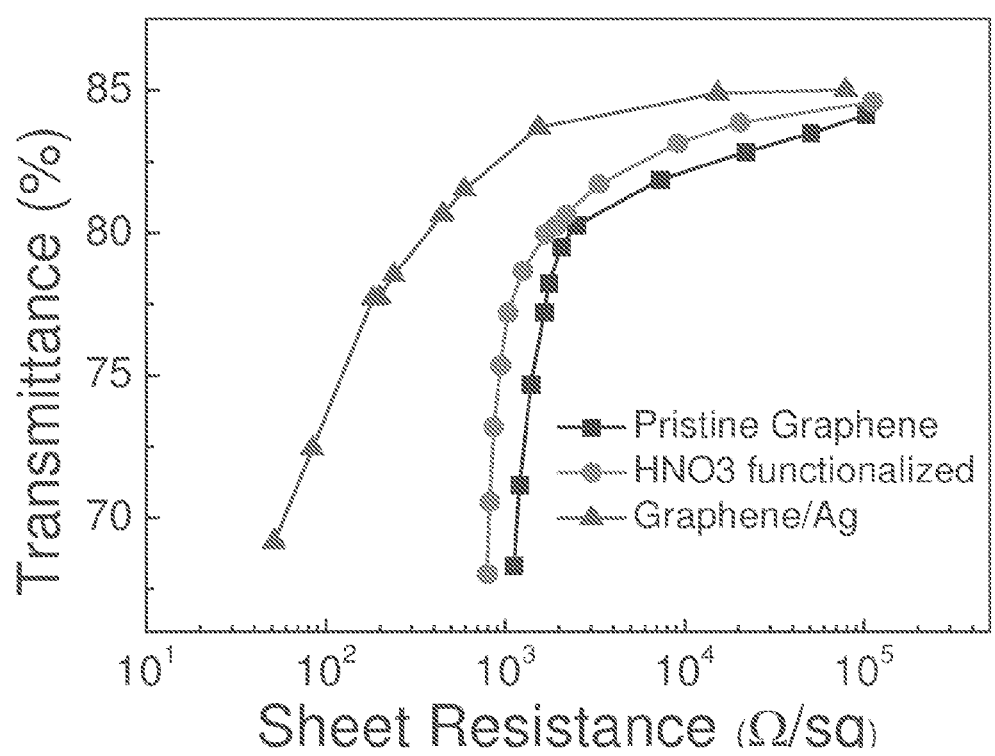
FIG. 28 shows the effect of the AgNP decoration on the transparency and electrical property of GTCFs.

FIG. 28 shows the effect of the AgNP decoration on the transparency and electrical property of the GTCFs. FIG. 28 demonstrates the performance of these various GTCFs in terms of their transparency and sheet resistance. With $HNO_3$ doped graphene, the sheet resistance decreases to 1250Ω/☐ with no change in transmittance (about 90% at 550 nm). The prepared GTCFs with AgNP decorated graphene have sheet resistance as low as 250Ω/☐ for a transmittance >90% (80% including substrate), and 52Ω/☐ for a transmittance>80% (67% including substrate).

Composite Materials—Example of Graphene/Carbon Nanotubes Heterostructures

Hybrid heterostructures of nanotubes and graphene can be created by printing alternated layers of SWNTs-ink and graphene-ink, e.g. to form TCEs on a polyethylene terephthalate (PET) substrate. The SWNTs/graphene printed heterostructure can achieve up to 92% of transmittance and a sheet resistance of about 500 Ω/☐

The SWNTs and graphene inks are prepared by sonication. About 0.08 wt % of functionalized SWNTs (P3, Carbon Solutions, Inc., 500 nm-1.5 μm in length, 3-6% carboxylic acid groups in the sidewalls and endcaps, 5-8% catalyst metal content) are ultrasonically debundled and individualized by a tip sonicator (Branson 450A, with 40 W power at 20 kHz, in ice bath) for 2 hr in 10 ml of deionized (DI) water with 0.5 wt % of Triton X-100, a nonionic linear chain surfactant. After the sonication, the SWNT dispersion is centrifuged at 40 krpm (about 270,000 g) for 20 minutes, and the top 70% is decanted. The P3 SWNTs are used here as their carboxylic acid group functionalization helps them prevent re-aggregation when isopropyl alcohol (IPA) is added to their surfactant assisted aqueous dispersions. This reduces the surface tension of the aqueous SWNT dispersions further, and helps attaining a uniform deposition of the sparse nanotube networks on the PET substrate.

Graphene ink, enriched with mono- and bi-layers is prepared with sonication as discussed above.

Figure 29:
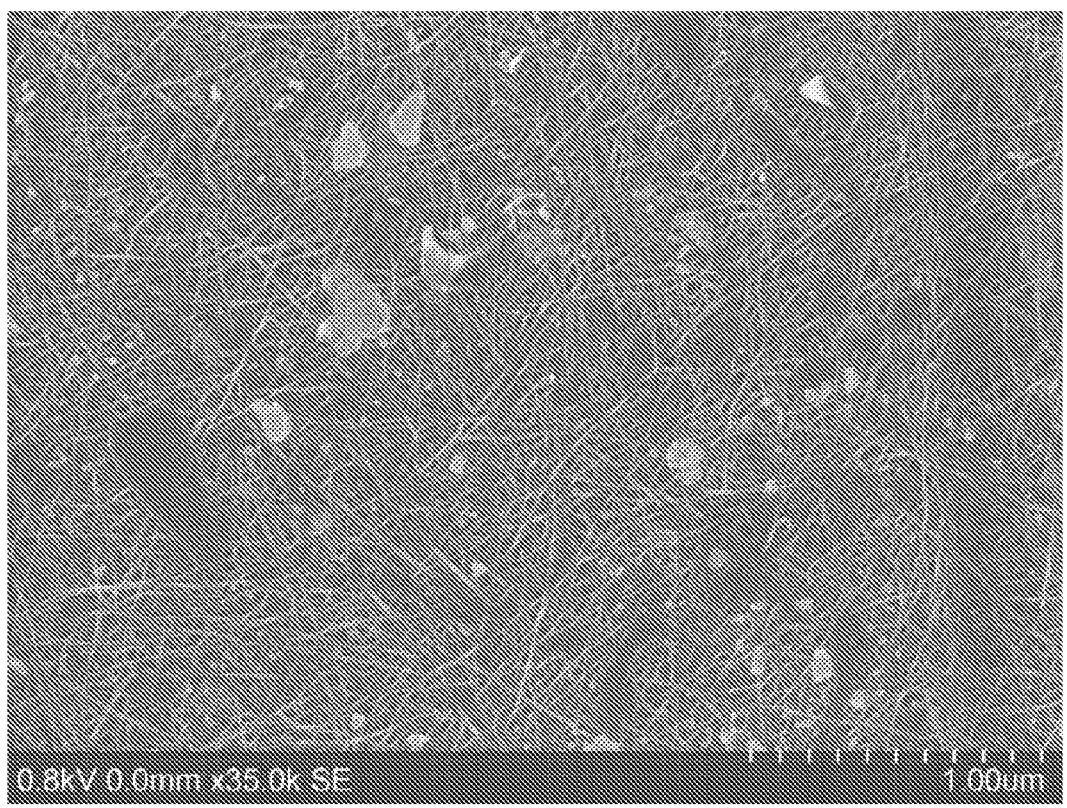
FIG. 29 shows an SEM image of SWNTs & graphene hybrid structures. SLGs, BLGs and FLGs are embedded in a SWNTs network.

FIG. 29 shows an SEM image of SWNTs & graphene hybrid structures. SLGs, BLGs and FLGs are embedded in a SWNTs network.

The SWNTs and graphene inks are coated onto the substrate several times. FIG. 29 shows the coated SWNTs/graphene hybrid film (SGHF). Coating uniformity is important for large scale applications. To verify the uniformity, we performed T measurements across a 120 cm$^2$ NGC-PET with about 5 mm spatial resolution. We use a 543 nm, 0.5 mW, non-polarized laser with about 0.65 mm beam diameter. We focus on this wavelength, commonly used for T measurements of TCEs as the human eye is most sensitive at about 550 nm. A spatial transmittance profile in a contour plot (not shown) indicates uniform transmittance across the area of the film with a mean transmittance SGHF PET of about 81%. The standard deviation across the entire SGHF-PET is <2%, confirming the optical uniformity of the SGHF, with about 1 kΩ/square sheet resistance. We note that this is an important performance parameter for TCEs when large scale applications are envisaged.

Raman Spectroscopy

The ultracentrifuged dispersions are diluted and drop-cast onto a Si wafer with 300 nm thermally grown $SiO_2$. These samples are then used for Raman measurements, collected with a Renishaw 1000 at 457, 514.5, and 633 nm and a 100× objective, with an incident power of about 1 mW. The G peak dispersion is defined as $Disp(G)=\Delta Pos(G)/\Delta\lambda_L$, where $\lambda_L$ is the laser excitation wavelength. Disp(G) is generated from the linear fit of the Pos(G) plot as a function of the laser excitation wavelength.

Contact Angle and Surface Tension Measurements

A KSV CAM200 stage is used. The contact angle is measured by dispensing 1 μL of ultrapure DI water on the substrates and measuring the angle at which the ink interface meets the solid surface. The surface tension is measured by the DuNouy-Padday technique [Reference Padday (1971)]. This consists of using a rod of few millimeters in diameter, immersed in the dispersion and then pulled out. The rod is attached to a scale or balance via a thin metal hook that measures the maximum pull force. This is recorded as the probe is first immersed 1 mm into the solution and then slowly withdrawn.

Optical Transmittance

The transmittance is measured on samples that are inkjet printed on borosilicate glass (Pyrex 7740, Polished Prime grade) followed by annealing at 170° C. for 1 h, by scanning a 514.5 nm laser beam at 100 μm steps. The transmitted beam is measured with a photodiode. An optical microscope equipped with 100× long-distance objective focuses the laser on the sample down to a spot size of about 2 μm (incident power on the sample about 8 mW). The transmitted power intensity is measured by a Ophir Nova II power meter with 0.1 μW resolution.

Electrical Measurements

Electrical measurements are performed using a Cascade AttoGuard probe station equipped with an Agilent 4156C semiconductor parameter analyzer. The integration time is set to 500 μs and the delay time is set to 50 ms to ensure that no transient instabilities in the current occur.

Experimental Data

We demonstrated the viability of our ink to print transparent and conductive inkjet printed interconnections and basic electronic components (resistors, capacitors).

Table 1 summarizes the results for transparent conductive patterns formed by inkjet printing of graphene ink as described above.

TABLE 1

| Printing repetition | Sheet resistance (kΩ/square) | Transmittance (%) | Conductivity (S/m) |
|---|---|---|---|
| 1 | $10^5$ | 92 | $10^{-4}$ |
| 2 | $10^4$ | 87 | $10^{-2}$ |
| 3 | $10^3$ | 80 | 10 |
| 4 | 300 | 77 | 50 |
| 5 | 34 | 70 | $10^2$ |

Table 2 summarizes the results for printed resistors using graphene ink.

TABLE 2

| Thickness (nm) | Sheet resistance (kΩ/square) | Standard deviation of sheet resistance (%) | Conductivity (S/m) |
|---|---|---|---|
| 42 | 150 ± 48 | 32 | 20 |
| 51 | 33 ± 9 | 27 | 250 |
| 62 | 90 ± 18 | 20 | 100 |
| 81 | 150 ± 24 | 16 | 140 |
| 100 | 205 ± 31 | 15 | 180 |

This range can be further extended to conductivity of up to 600 S/m with thickness of 200/500 nm (also below 1 mm).

We demonstrated the viability of graphene-ink for printable transistors. This is of importance, for example, in the manufacture of thin film transistors (TFTs). Table 3 summarizes the results with different channel thickness.

TABLE 3

| Thickness (nm) | Mobility ($cm^2V^{-1}s^{-1}$) | ON/OFF ratio |
| --- | --- | --- |
| 10 | 0.001 | 0.2 |
| 15 | 0.016 | 0.2 |
| 20 | 0.5 | 0.5 |
| 25 | 90 | 7-10 |
| 35 | 62 | 5.5 |
| 50 | 12 | 3 |

Graphene-ink/polymer blends a mixture of polymer matrix and graphene-ink. It can be used to improve the ON/OFF ratio of printed transistors up to mobilities of 10 $cm^2V^{-1}$ $s^{-1}$ and ON/OFF of $10^3$-$10^4$.

We demonstrated the viability of graphene-ink for coatable transparent conductors, as shown in Table 4.

TABLE 4

| Number of coatings | Transparency (%) | Sheet resistance ($k\Omega$/square) |
| --- | --- | --- |
| 5 | 96.2 | 50 |
| 10 | 95 | 32 |
| 15 | 94 | 26 |
| 20 | 93.3 | 8 |
| 25 | 92.4 | 2 |
| 30 | 91 | 0.7 |

Inkjet printed graphene devices can have sheet resistance of 100/square and transparency of 80%. Suitable printing techniques as discussed above allow the manufacture of large area devices with a continuous conductive layer with excellent transparency.

$MoS_2$ ink was printed to form layers as reported in Table 5. This shows that $MoS_2$ ink enables printable transistors with higher ON/OFF ratio up to 100,000 times less power consumption in standby state than traditional Si transistor.

TABLE 5

| Thickness (nm) | Mobility ($cm^2V^{-1}s^{-1}$) | ON/OFF ratio |
| --- | --- | --- |
| 10 | 0.0007 | 10 |
| 15 | 0.002 | 50 |
| 20 | 0.007 | 100 |
| 25 | 0.01 | $10^3$ |
| 35 | 0.1 | $5 \times 10^3$ | h-BN enables the formation of homogeneous insulating layers with insulating properties and with capacitance of 10 nF or higher.

$Bi_2Te_3$ inks have thermoelectric behavior. This enables inkjet printed thermal conductor/barriers with a specific thermal conductivity of 2000 $Ohm^{-1}$ $cm^{-1}$ and a Seebeck coefficient S>−200 uV/K.

ELM based inks can be combined together in order to give new printable inks with superior properties with respect to the single nanomatrial inks. For example, graphene can be combined with $MoS_2$ or h-BN to improve the ON/OFF ratio of graphene/transistor.

Graphene-ink can be blended with conductive (e.g. PEDOT:PSS) or semiconducting (e.g. PQT-12, P3HT) to improve the conducting or semiconducting behavior of the polymer (i.e. sheet resistance as low as 100 $\Omega$/square or mobility of up to 100 $cm^2V^{-1}$ $s^{-1}$.

Graphene/$Bi_3Te_2$ mixed ink can be designed with specific concentration and composition enabling ultrafast thermoelectric conductor barriers.

Graphene/$MoS_2$ or $WS_2$ mixed inks can be exploited for the fabrication of electrodes in printed batteries and energy storage devices. Graphene electrodes can achieve surface area of up to 3000 $m^2$ $g^{-1}$.

Graphene-ink can be blended with conductive polymer binders to fabricate graphene-based transparent and conductive paste and glue. These can achieve conductivity as low as 5 $\Omega$/square and optical transparency up to 90%.

Graphene-ink can be printed on or mixed with a polymer matrix to fabricate fully bendable and streachable transparent electrodes, resistors and thin film transistors, as discussed above. The strain applied can be up to 25% with less than 5% change in resistivity/mobility and an optical transparency of up to 90%.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

ALPHABETICAL LIST OF REFERENCES

Ahir, S. V.; Huang, Y. Y.; Terentjev, E. M. Polymer, 2008, 49, 3841.
Arnold, M. S.; Green, A. A.; Hulvat, J. F.; Stupp, S. I.; Hersam, M. C. Nat. Nano., 2006, 1, 60.
Arnold, M. S.; Stupp, S. I.; Hersam, M. C. Nano Lett. 2005, 5, 713.
Berger, C., et al., J. Phys. Chem. B (2004) 108, 19912.
Bonaccorso, F.; Sun, Z.; Hasan, T.; Ferrari, A. C. Graphene Photonics and Optoelectronics. Nat. Photonics 2010, 4, 611-622.
Coleman, J. N.; Mustafa Lotya, Arlene O'Neill et al, Two-Dimensional Nanosheets Produced by Liquid Exfoliation of Layered Materials, Science 4 Feb. 2011: Vol. 331 no. 6017 pp. 568-571
Crochet, J.; Clemens, M.; Hertel, T. J. Am. Chem. Soc. 2007, 129, 8058.
Cunningham, G.; Mustafa Lotya, Clotilde S. Cucinotta, Stefano Sanvito, Shane D. Bergin, Robert Menzel, Milo S. P. Shaffer, and Jonathan N. Coleman, Solvent Exfoliation of Transition Metal Dichalcogenides: Dispersibility of Exfoliated Nanosheets Varies Only Weakly between Compounds, ACS Nano, 2012, 6 (4), pp 3468-3480
Derby, B.; Reis, N. Inkjet Printing of Highly Loaded Particulate Suspensions. MRS Bull. 2003, 28, 815.
Dua, V.; Surwade, S.; Ammu, S.; Agnihotra, S.; Jain, S.; Roberts, K.; Park, S.; Ruoff, R.; Manohar, S. All-Organic Vapor Sensor Using Inkjet-Printed Reduced Graphene Oxide. Angew. Chem., Int. Ed. 2010, 49, 2154-2157.
Fromm, J. E. Numerical-Calculation of the Fluid-Dynamics of Drop-on-Demand Jets. IBM J. Res. Dev. 1984, 28, 322.
Glendinning, W. B.; Helbert, J. N. Handbook of VLSI Microlithography: Principles, Technology, and Applications; Noyes: Saddle River, N.J., 1991.
Green, A. A.; Hersam, M. C. Solution Phase Production of Graphene with Controlled Thickness via Density Differentiation. Nano Lett. 2009, 9, 4031-4036.
Hamaker, H. C. Physica, 1937, 4, 1058-1072.

Hasan, T.; Scardaci, V.; Tan, P. H.; Rozhin, A. G.; Milne, W. I.; Ferrari, A. C. J. Phys. Chem. C 2007, 111, 12594-12602.

Hasan, T.; Torrisi, F.; Nicolosi, V.; Privitera, G.; Bonaccorso, F.; Ferrari, A. C. Solution-Phase Exfoliation of Graphite for Ultrafast Photonics. Phys. Status Solidi B 2010, 247, 2953.

Hernandez, Y.; Nicolosi, V.; Lotya, M.; Blighe, F. M.; Sun, Z.; De, S.; McGovern, I. T.; Holland, B.; Byrne, M.; Gun'Ko, Y. K.; et al. High-Yield Production of Graphene by Liquid-Phase Exfoliation of Graphite. Nat. Nanotechnol. 2008, 3, 563-568.

Hummers, W. S.; Offeman, R. E. Preparation of Graphitic Oxide. J. Am. Chem. Soc. 1958, 80, 1339-1339.

Jang, D.; Kim, D.; Moon, J. Influence of Fluid Physical Properties on Ink-Jet Printability. Langmuir 2009, 25, 2629-2635.

Khan, U.; O'Neill, A.; Lotya, M.; De, S.; Coleman, J. N. High-Concentration Solvent Exfoliation of Graphene. Small 2010, 6, 864-871.

King, P. J.; Khan, U.; Lotya, M.; De, S.; Coleman, J. N. ACS Nano2010, 4, 4238-4246.

Li, X., et al., Science (2009) 324, 1312.

Lotya, M.; Hernandez, Y.; King, P. J.; Smith, R. J.; Nicolosi, V.; Karlsson, L. S.; Blighe, F. M.; De, S.; Wang, Z.; McGovern, I. T.; et al. Liquid Phase Production of Graphene by Exfoliation of Graphite in Surfactant/Water Solutions. J. Am. Chem. Soc. 2009, 131, 3611-3620.

Luechinger, N.; Athanassiou, A. E. K.; Stark, W. J. Graphene-Stabilized Copper Nanoparticles as an Air-Stable Substitute for Silver and Gold in Low-Cost Ink-Jet Printable Electronics. Nanotechnology 2008, 19, 445201.

Marago, O. M.; Bonaccorso, F.; Saija, R.; Privitera, G.; Gucciardi, P. G.; Lati, M. A.; Calogero, G.; Jones, P. H.; Borghese, F.; Denti, P.; et al. Brownian Motion of Graphene. ACS Nano 2010, 4, 7515-7523.

Mingjing Ha, Yu Xia, Alexander A. Green, Wei Zhang, Mike J. Renn, Chris H. Kim, Mark C. Hersam and C. Daniel Frisbie, Printed, Sub-3V Digital Circuits on Plastic from Aqueous Carbon Nanotube Inks ACS Nano 2010, 4, 4388-4395

Novoselov, K. S.; Jiang, D.; Schedin, F.; Booth, T. J.; Khotkevich, V. V.; Morozov, S. V.; Geim, A. K. Two-Dimensional Atomic Crystals. Proc. Natl. Acad. Sci. U.S.A. 2005, 102, 10451-10453.

O'Connell, M. J.; Boul, P.; Ericson, L. M.; Huffmann, C.; Yuan, Y.; Haroz, E.; Kuper, C.; Tour, J.; Ausman, K. D.; Smalley, R. Chem Phys. Lett, 2001, 342, 265.

Padday, J. F. The Profiles of Axially Symmetric Menisci. Philos. Trans. R. Soc. London A 1971, 269, 265-293.

Sasaki, Y.; Igura, T.; Miyassu, Y. I.; Lee, S.; Nagadome, S.; Takiguchi, H.; Sugihara, G. Colloid Surf. B-Biointerfaces, 1995, 5, 241.

Shafrin, E. G.; Zisman, W. A. Critical Surface Tension for Spreading on a Liquid Substrate. J. Phys. Chem. 1967, 71, 1309-1316.

Shin, P.; Sung, J.; Lee, M. H. Control of Droplet Formation for Low Viscosity Fluid by Double Waveforms Applied to a Piezoelectric Inkjet Nozzle. Microelectron. Reliab. 2011, 51, 797-804.

Singh, M.; Haverinen, H. M.; Dhagat, P.; Jabbour, G. E. Inkjet Printing—Process and Its Applications. Adv. Mater. 2010, 22, 673-685.

Thomas, R. R.; Kaufman, F. B.; Kirleis, J. T.; Belsky, R. A. Wettability of Polished Silicon Oxide Surfaces. J. Electrochem. Soc. 1996, 143, 643-648.

Valles, C.; Drummond, C.; Saadaoui, H.; Furtado, C. A.; He, M.; Roubeau, O.; Ortolani, L.; Monthioux, M.; Penicaud, A. Solutions of Negatively Charged Graphene Sheets and Ribbons. J. Am. Chem. Soc. 2008, 130, 15802-15804.

Van Osch, T. H. J.; Perelaer, J.; deLaat, A. W. M.; Schubert, U. S. Inkjet Printing of Narrow Conductive Tracks on Untreated Polymeric Substrates. Adv. Mater. 2008, 20, 343-345.

Wang, S.; Ang, P. K.; Wang, Z.; Tang, A. L. L.; Thong, J. T. L.; Loh, K. P. High Mobility, Printable, and Solution-Processed Graphene Electronics. Nano Lett. 2009, 10, 92-98.

The invention claimed is:

1. An ink comprising a carrier liquid with a dispersion of flakes derived from a layered material, the ink having a concentration of said flakes at a level of at least 0.01 g/L, wherein the thickness of each flake depends on the number of layers of the layered material in the flake, and wherein the thickness distribution of the flakes includes:
   at least 20% by number of single layer flakes;
   at least 40% by number cumulatively of single, double and triple layer flakes; or
   not more than 40% by number of flakes having ten or more layers.

2. The ink according to claim 1 wherein the thickness distribution of the flakes includes at least 60% by number of single layer flakes.

3. The ink according to claim 1 wherein the thickness distribution of the flakes includes at least 90% by number cumulatively of single, double and triple layer flakes.

4. The ink according to claim 1 wherein the thickness distribution of the flakes includes at least 80% by number cumulatively of single and double layer flakes.

5. The ink according to claim 1 wherein the thickness distribution of the flakes includes not more than 5% by number of flakes having ten or more layers.

6. The ink according to claim 1 wherein the layered material comprises one or more of graphene, a metal, $NiTe_2$, $VSe_2$, a semi-metal, $WTa_2$, $TcS_2$, a semiconductor, $WS_2$, $WSe_2$, $MoS_2$, $MoTe_2$, $TaS_2$, $RhTe_2$, $PdTe_2$, an insulator, h-BN, $HfS_2$, asuperconductor, $NbS_2$, $NbSe_2$, $NbTe_2$, $TaSe_2$, a topological insulator, a thermo-electric, $Bi_2Se_3$ and $Bi_2Te_3$.

7. The ink according to claim 1 wherein the flakes have at least one lateral dimension, assessed as a number average, of at least 200 nm.

8. The ink according to claim 1 wherein the flakes have a footprint area, assessed as a number average, of at least 0.1 $\mu m^2$.

9. The ink according to claim 1 wherein the carrier liquid is selected from one or more of water, alcohol, N-methylpyrrolidone, chloroform, benzene, toluene, di-chlorobenzene, iso-propyl alcohol, ethanol and other organic solvents.

10. The ink according to claim 1 further including one or more modifier to adjust the surface energy (y) of the ink and/or the viscosity ($\eta$) of the ink.

11. The ink according to claim 1 wherein the surface energy of the ink is in the range 30-55 $mN·m^{-1}$ at 20° C.

12. The ink according to claim 1 wherein the viscosity of the ink is in the range 1-100 mPa·s at 20° C.

13. The ink according to claim 1 wherein the ink has a value for Z=1/Oh in the range 1-100, where Oh is the Ohnesorge number and $Oh=(We)^{1/2}/Re$, where Re is the Reynolds number and We is the Weber number, $Re=v\rho a/\eta$ and $We=v^2\rho a/\gamma$, so that $Oh=(we)^{1/2}/Re=-\eta(\gamma\rho a)^{1/2}$
   where v[m/s] is the drop velocity, $\eta$ [mPa s] is the viscosity of the ink, $\gamma$ [mJm$^{-2}$] is the surface energy of the ink, $\rho$ [g cm$^{-3}$] is the density of the ink, and a [μm] is the nozzle diameter of the inkjet printing apparatus.

14. The ink according to claim 13 wherein Z is in the range 1-14.

15. An ink consisting of at least 90 wt %, based on the weight of the ink, of:
- a carrier liquid;
- a dispersion of flakes derived from a layered material;
- optionally, one or more surfactant;
- optionally, one or more surface energy modifier; and
- optionally, one or more viscosity modifier,
- optionally, one or more dopants and nanomaterial additives, the ink having a concentration of said flakes at a level of at least 0.01 g/L, wherein the thickness of each flake depends on the number of layers of the layered material in the flake, and wherein the thickness distribution of the flakes includes:
- at least 20% by number of single layer flakes;
- at least 40% by number cumulatively of single, double and triple layer flakes; or
- not more than 40% by number of flakes having ten or more layers.

16. A printed layer obtained by printing using an ink comprising a carrier liquid with a dispersion of flakes derived from a layered material, the ink having a concentration of said flakes at a level of at least 0.01 g/L, wherein the thickness of each flake depends on the number of layers of the layered material in the flake, and wherein the thickness distribution of the flakes includes:
- at least 20% by number of single layer flakes;
- at least 40% by number cumulatively of single, double and triple layer flakes; or
- not more than 40% by number of flakes having ten or more layers.

17. The printed layer according to claim 16 wherein the printed layer is electrically conductive and/or optically transmissive.

18. The printed layer according to claim 16 wherein the printed layer has a sheet resistance $R_s$ of not more than $10^3$ kΩ/square.

19. The printed layer according to claim 16 wherein the printed layer has an optical transmittance of not less than 80%.

20. The printed layer according to claim 16 wherein the carrier mobility of the layer is at least 10 cm$^2$V$^{-1}$s$^{-1}$.

21. The printed layer according to claim 16 wherein the printed layer is formed on a flexible substrate.

22. A device incorporating at least one printed layer obtained by printing using an ink comprising a carrier liquid with a dispersion of flakes derived from a layered material, the ink having a concentration of said flakes at a level of at least 0.01 g/L, wherein the thickness of each flake depends on the number of layers of the layered material in the flake, and wherein the thickness distribution of the flakes includes:
- at least 20% by number of single layer flakes;
- at least 40% by number cumulatively of single, double and triple layer flakes; or
- not more than 40% by number of flakes having ten or more layers, the device being an electronic device, an optoelectronic device, an optical device, a thermal device, an energy device, and/or a radio frequency device.

* * * * *